(12) United States Patent
Kim et al.

(10) Patent No.: US 12,441,915 B2
(45) Date of Patent: Oct. 14, 2025

(54) OPTICAL FILM AND DISPLAY DEVICE COMPRISING SAME

(71) Applicant: LG CHEM, LTD., Seoul (KR)

(72) Inventors: Bongjun Kim, Daejeon (KR); Ji Hoon Park, Daejeon (KR); Yeon Keun Lee, Daejeon (KR); Mun Kyu Joo, Daejeon (KR); Deok Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 974 days.

(21) Appl. No.: 17/618,972

(22) PCT Filed: Mar. 4, 2021

(86) PCT No.: PCT/KR2021/002678
§ 371 (c)(1),
(2) Date: Dec. 14, 2021

(87) PCT Pub. No.: WO2021/177744
PCT Pub. Date: Sep. 10, 2021

(65) Prior Publication Data
US 2022/0282093 A1 Sep. 8, 2022

(30) Foreign Application Priority Data
Mar. 4, 2020 (KR) .................. 10-2020-0027240

(51) Int. Cl.
C09J 7/10 (2018.01)
C09B 47/00 (2006.01)
(Continued)

(52) U.S. Cl.
CPC ............ C09J 7/10 (2018.01); C09B 47/00 (2013.01); C09B 67/0063 (2013.01);
(Continued)

(58) Field of Classification Search
CPC ........ G02C 7/104; G02C 7/105; G02C 7/108; G02C 2202/16; G02C 7/102; G02C 7/12;
(Continued)

(56) References Cited

U.S. PATENT DOCUMENTS 6,337,536 B1  1/2002  Matsubara et al.
7,332,257 B2  2/2008  Miyako et al.
(Continued)

FOREIGN PATENT DOCUMENTS

CN  109073933 A  12/2018
CN  109991808 A  7/2019
(Continued)

OTHER PUBLICATIONS

International Search Report issued for International Application No. PCT/KR2021/002678 on Jun. 14, 2021, 2 pages.
(Continued)

*Primary Examiner* — Ephrem Z Mebrahtu
(74) *Attorney, Agent, or Firm* — ROTHWELL, FIGG, ERNST & MANBECK, P.C.

(57) ABSTRACT

The present specification relates to an optical film, and a display device including an optical film, comprising a dye or pigment absorbing at least some of a wavelength of 490 nm to 510 nm; having a transmission color of a D65 light source, a CIE standard illuminant, of $-8<a^*<8$ and $-8<b^*<8$, wherein $a^*$ indicates a direction the transmission color is leaned between red and green and $b^*$ indicates a direction the transmission color is leaned between yellow and blue; and satisfying the following Equations 1 and 2:

$T\%(500\text{ nm})<T\%(530\text{ nm})$,  [Equation 1]

$[T\%(500\text{ nm})\times1.8]<[T\%(460\text{ nm})+T\%(610\text{ nm})]$  [Equation 2]

wherein, in Equations 1 and 2,
$T\%$ (A nm) is transmittance at a wavelength of A nm.

16 Claims, 5 Drawing Sheets

(51) Int. Cl.
  *C09B 67/20* (2006.01)
  *C09J 11/06* (2006.01)
  *G02B 5/22* (2006.01)
  *H10K 50/86* (2023.01)
  *H10K 59/80* (2023.01)

(52) U.S. Cl.
  CPC .............. *C09J 11/06* (2013.01); *G02B 5/223* (2013.01); *H10K 50/86* (2023.02); *H10K 59/8791* (2023.02); *C09J 2203/326* (2013.01); *C09J 2301/408* (2020.08)

(58) Field of Classification Search
  CPC ...... G02B 5/223; G02B 5/201; G02B 27/141; G02B 5/208; G02B 26/008; G02B 5/285; G02B 1/111; G02F 1/133514; G02F 2203/01
  See application file for complete search history.

(56) References Cited

U.S. PATENT DOCUMENTS

| | | | |
|---|---|---|---|
| 7,655,306 | B2 | 2/2010 | Lee et al. |
| 7,951,450 | B2 | 5/2011 | Helber et al. |
| 9,250,371 | B2 | 2/2016 | Won et al. |
| 10,247,980 | B2 | 4/2019 | Cho et al. |
| 11,003,017 | B2 | 5/2021 | Lee et al. |
| 2018/0025692 | A1* | 1/2018 | Yata ................. G02F 1/133621 345/694 |
| 2018/0134952 | A1* | 5/2018 | Ichihashi .......... G02F 1/133617 |
| 2018/0244953 | A1* | 8/2018 | Woo ...................... B32B 27/281 |
| 2019/0093008 | A1 | 3/2019 | Shin et al. |
| 2019/0258087 | A1* | 8/2019 | Valentine ............... G02C 7/107 |
| 2020/0363561 | A1* | 11/2020 | Fan ......................... G02B 1/111 |
| 2021/0343803 | A1* | 11/2021 | Cheng ................ H10K 59/8792 |

FOREIGN PATENT DOCUMENTS

| | | |
|---|---|---|
| CN | 110007561 A | 7/2019 |
| JP | 2003-057436 A | 2/2003 |
| JP | 2006-138963 A | 6/2006 |
| JP | 2008-203436 A | 9/2008 |
| JP | 2009-031474 A | 2/2009 |
| KR | 10-2000-0011622 A | 2/2000 |
| KR | 2005-0007153 A | 1/2005 |
| KR | 2007-0113077 A | 11/2007 |
| KR | 10-2009-0089853 A | 8/2009 |
| KR | 10-2014-0058386 A | 5/2014 |
| KR | 10-2016-0050933 A | 5/2016 |
| KR | 10-2016-0114394 A | 10/2016 |
| KR | 10-2017-0032869 A | 3/2017 |
| KR | 2019-0109988 A | 9/2019 |
| WO | 2020-026955 A1 | 2/2020 |

OTHER PUBLICATIONS

Office Action of Japanese Patent Office in Application No. 2021-568845 dated Nov. 15, 2022 with English translation, 12 pages.

\* cited by examiner

[FIG. 1]
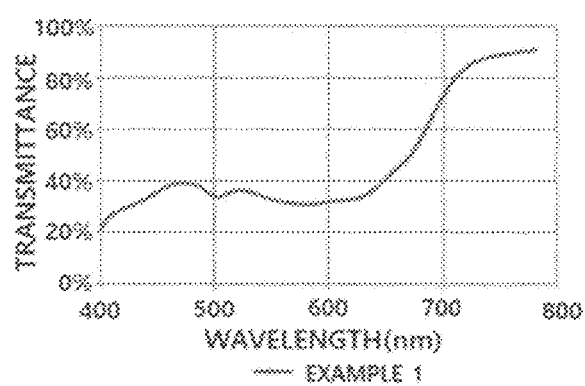
EXAMPLE 1
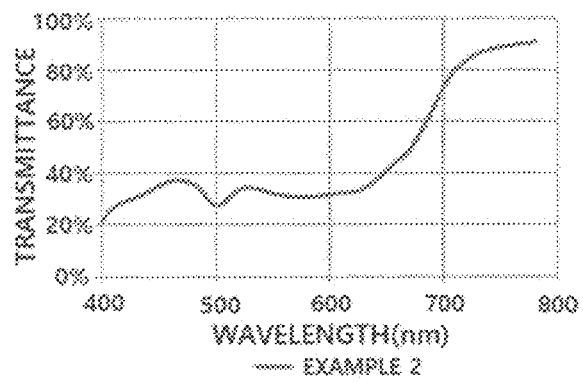
EXAMPLE 2
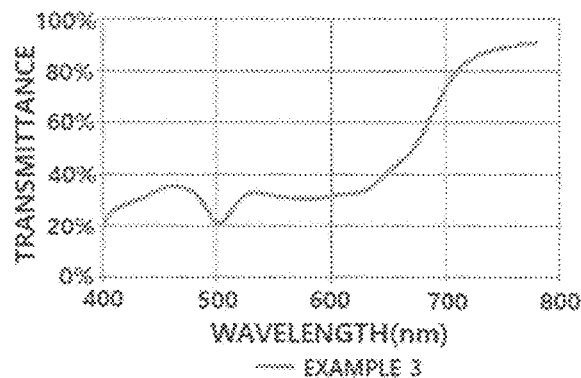
EXAMPLE 3
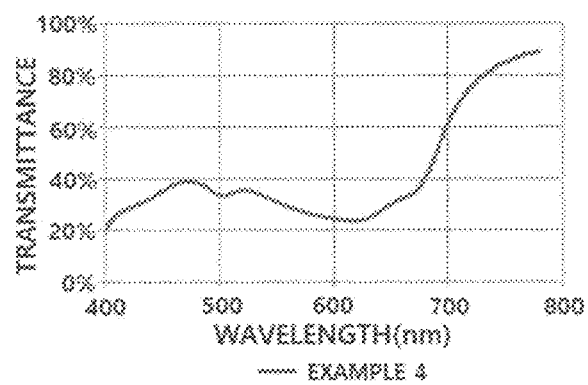
EXAMPLE 4

[FIG. 2]
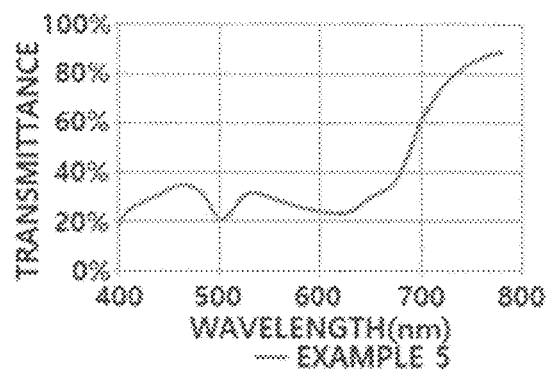
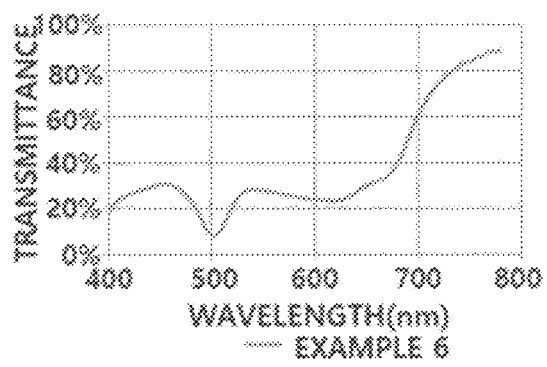
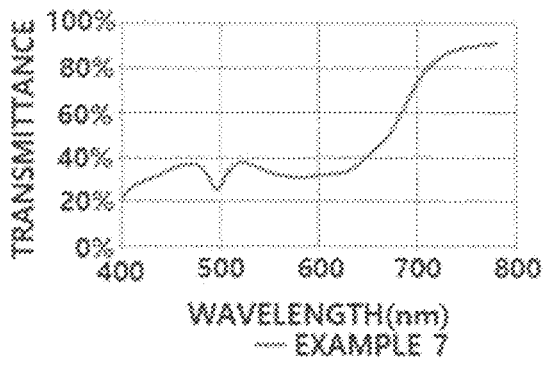
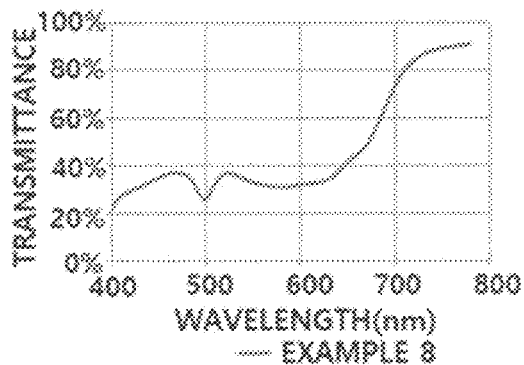
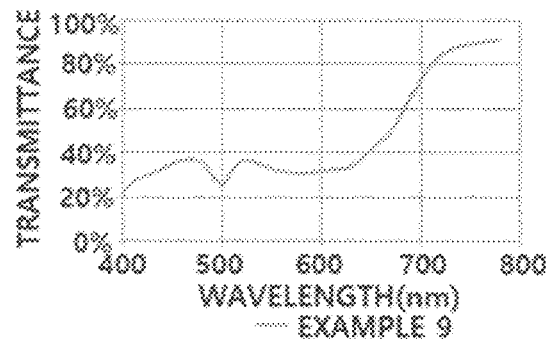

[FIG. 3]
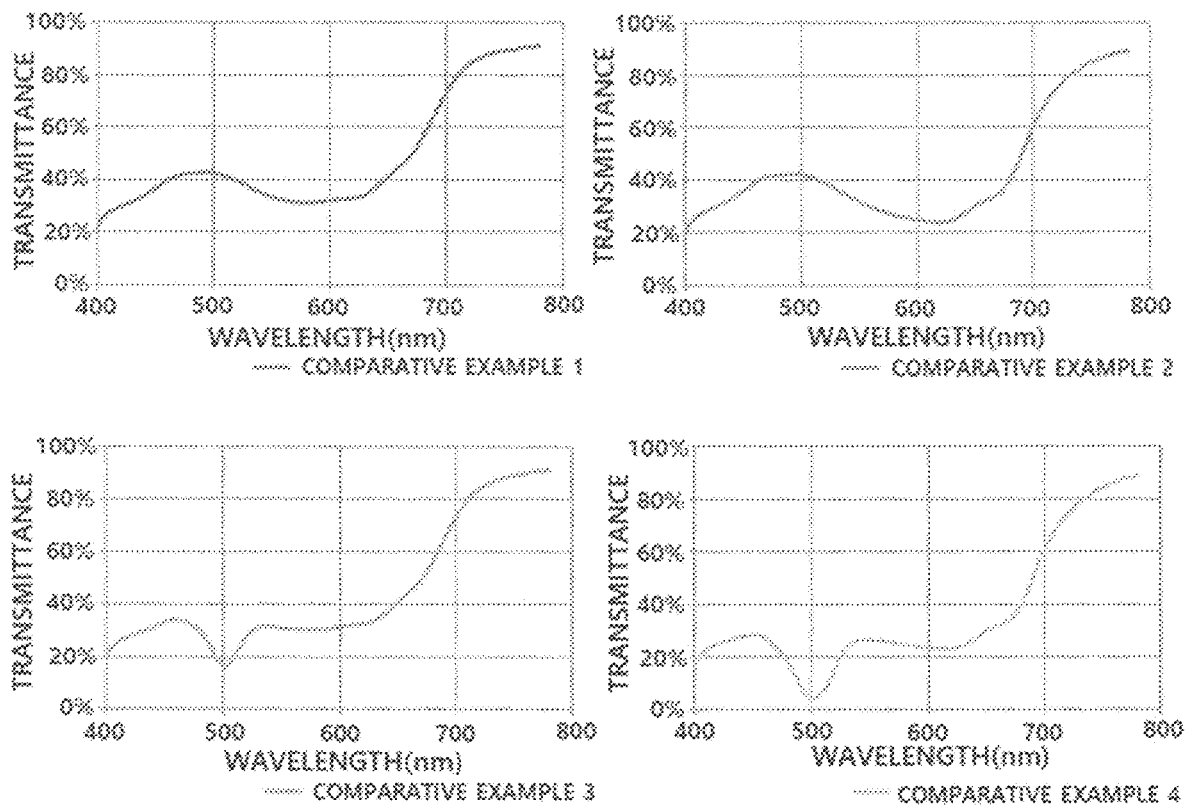
[FIG. 4]
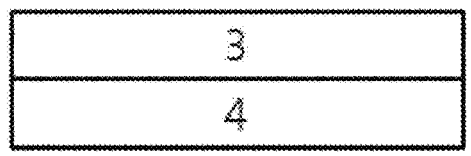
[FIG. 5]
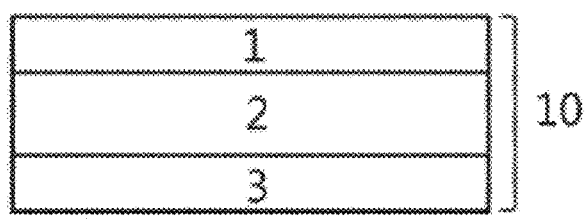

[FIG. 6]
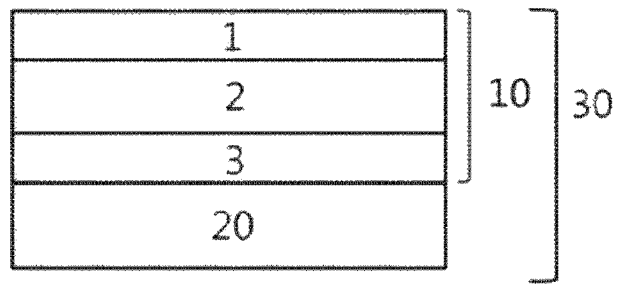
[FIG. 7]
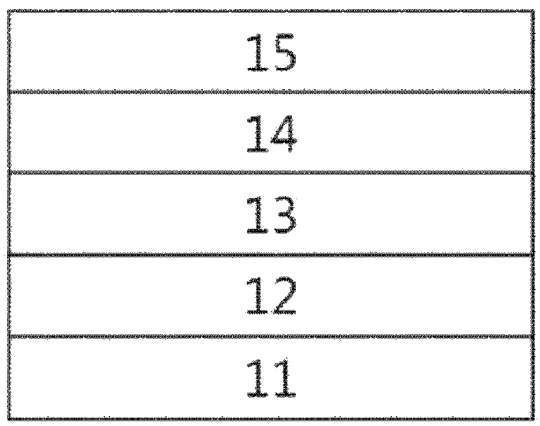
[FIG. 8]
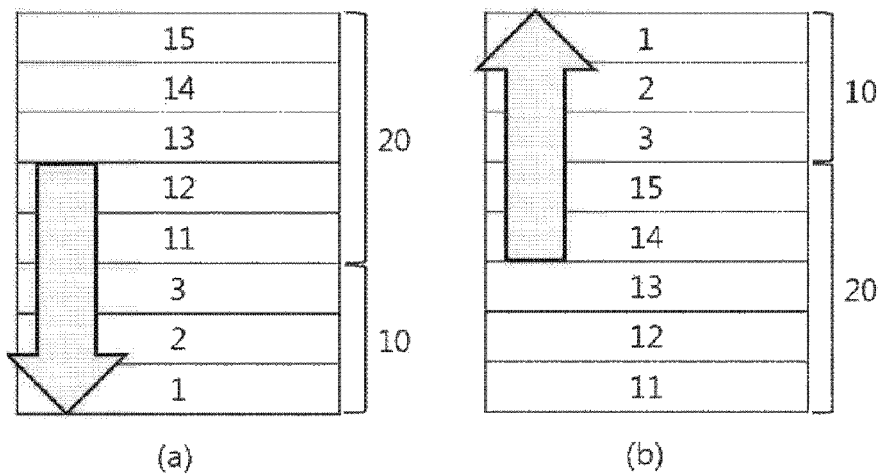
(a)  (b)

[FIG. 9]
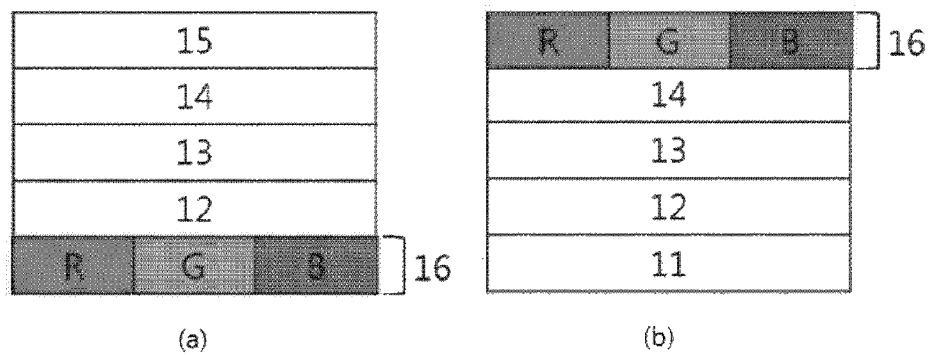
(a)      (b)
[FIG. 10]
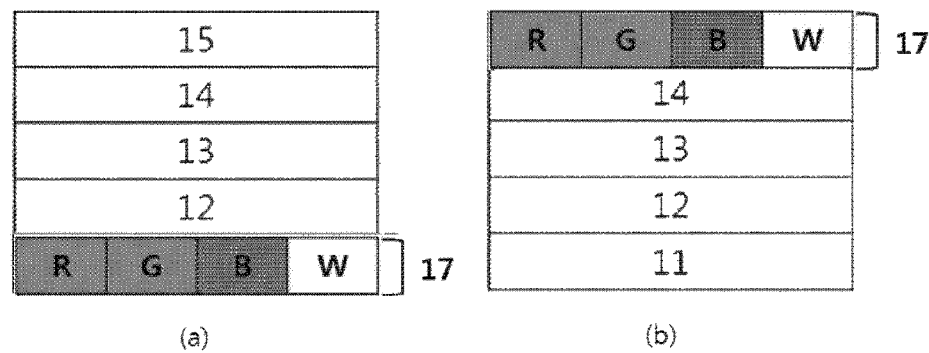
(a)      (b)

OPTICAL FILM AND DISPLAY DEVICE COMPRISING SAME

TECHNICAL FIELD

The present specification relates to an optical film, and a display device including the same.

This application is a 35 U.S.C. § 371 National Phase Entry Application from PCT/KR2021/002678, filed on Mar. 4, 2021 and claims priority to and the benefits of Korean Patent Application No. 10-2020-0027240, filed with the Korean Intellectual Property Office on Mar. 4, 2020, the entire contents of which are incorporated herein by reference.

BACKGROUND OF THE INVENTION

An electrode in an organic light emitting diode (OLED) is made of a metal element, which causes a problem of significantly reducing a contrast ratio of a display due to high external light reflectance. In view of the above, a circular polarizing plate is laminated to suppress external light reflection, however, this method causes disadvantages of increasing material costs and reducing flexibility as well as failing to flexibly adjust color tones of light emitting colors.

With the purpose of replacing this, a low-cost optical film for anti-reflection introducing a dye and a pigment to an adhesive film has been developed. Currently, such an optical film is inferior in viewing angle properties compared to a circular polarizing plate.

DISCLOSURE

The present specification is directed to providing an optical film, and a display device including the same.

One embodiment of the present specification provides an optical film,
(1) including a dye or pigment absorbing at least some of a wavelength of 490 nm to 510 nm,
(2) having a transmission color of a D65 light source, a CIE standard illuminant, of $-8<a^*<8$ and $-8<b^*<8$, and
(3) satisfying the following Equations 1 and 2.

$$T\%(500\ nm) < T\%(530\ nm), \quad [\text{Equation 1}]$$

$$[T\%(500\ nm) \times 1.8] \leq [T\%(460\ nm) + T\%(610\ nm)] \quad [\text{Equation 2}]$$

In Equations 1 and 2,
T % (A nm) means transmittance at a wavelength of A nm.

Another embodiment of the present specification provides an adhesive optical filter including the optical film; and a surface treatment layer.

Another embodiment of the present specification provides a display device including the optical film.

Advantageous Effects

An optical film according to one embodiment of the present specification minimizes viewing angle-dependent color changes by effectively absorbing a wavelength of 500 nm, and minimizes viewing angle-dependent color changes in white, green, yellow and cyan, colors affected by green, when absorbing a wavelength of 500 nm.

DESCRIPTION OF DRAWINGS

FIG. 1 and FIG. 2 are diagrams showing wavelength-dependent absorption spectra of optical films according to examples.

FIG. 3 is a diagram showing wavelength-dependent absorption spectra of optical films according to comparative examples.

FIG. 4 illustrates a structure when a release layer is provided on one surface of an adhesive film according to one embodiment of the present specification.

FIG. 5 illustrates a structure of an adhesive optical filter according to one embodiment of the present specification.

FIG. 6 illustrates a structure of an OLED device, one example of a display device according to one embodiment of the present specification.

FIG. 7 illustrates a structure of an OLED panel according to one embodiment of the present specification.

FIG. 8 illustrates an OLED device having a bottom emission structure and an OLED device having a top emission structure according to the present specification.

FIG. 9 illustrates a structure of an OLED panel provided with a color filter-formed substrate according to the present specification.

FIG. 10 illustrates a structure of a white OLED panel provided with a substrate having a white pixel-including color filter formed therein according to the present specification.

REFERENCE NUMERAL

1: Surface Treatment Layer
2: Binder Resin Film
3: Adhesive Film
4: Release Layer
10: Adhesive Optical Filter
11: Substrate
12: Lower Electrode
13: Organic Material Layer
14: Upper Electrode
15: Encapsulation Substrate
16: Color Filter-Formed Substrate
17: Substrate Having White Pixel-Including Color Filter Formed Therein
20: OLED Panel
30: OLED Device

MODE FOR DISCLOSURE

One embodiment of the present specification provides an optical film,
(1) including a dye or pigment absorbing at least some of a wavelength of 490 nm to 510 nm,
(2) having a transmission color of a D65 light source, a CIE standard illuminant, of $-8<a^*<8$ and $-8<b^*<8$, and
(3) satisfying the following Equations 1 and 2.

$$T\%(500\ nm) < T\%(530\ nm), \quad [\text{Equation 1}]$$

$$[T\%(500\ nm) \times 1.8] \leq [T\%(460\ nm) + T\%(610\ nm)] \quad [\text{Equation 2}]$$

In Equations 1 and 2,
T % (A nm) means transmittance at a wavelength of A nm.

By the optical film satisfying the conditions of (1) to (3) described above, viewing angle-dependent color changes may be minimized.

Specifically, the dye or pigment absorbing at least some of a wavelength of 490 nm to 510 nm according to one embodiment of the present specification may, by specifically absorbing a wavelength of 500 nm, minimize viewing angle-dependent color changes in white, green, yellow and cyan, colors affected by green.

In addition, when using the optical film according to one embodiment of the present specification in an OLED device, external light reflection may be efficiently suppressed without using a circular polarizing plate. Not using a circular polarizing plate in an OLED device has advantages of saving material costs, and properly maintaining flexibility of the OLED device.

External light reflection of an OLED device may be efficiently suppressed as transmittance of an adhesive film decreases. However, when transmittance of an adhesive film excessively decreases, luminance of an OLED panel may decrease as well. However, when using the adhesive composition according to the present specification in an OLED device, transmittance of 30% to 90% is properly maintained while efficiently suppressing external light reflection, and as a result, superior luminance of an OLED panel may be maintained.

In the present specification, external light reflectance (Rc) of an OLED device may be calculated by the following mathematical formula.

$$Rc = Rs + \left(1 - \frac{Rs}{100}\right) \times (Rp - 4) \times \left(\frac{T}{100}\right)^2 \quad \text{[Mathematical Formula]}$$

In the mathematical formula,

Rs is reflectance (%) of a surface treatment layer for light with a wavelength of 550 nm, Rp is reflectance (%) of an OLED panel for light with a wavelength of 550 nm, and T is total transmittance (%) of an adhesive film and the surface treatment layer for light with a wavelength of 550 nm.

The reflectance of the surface treatment layer may be measured using a CM-2600d color difference meter of Konica Minolta, Inc. after conducting blackening treatment or attaching a black tape on a surface opposite to the surface treatment layer to remove an effect of reflection at the interface of the surface opposite to the surface treatment layer. A reflectance value including specular reflectance (SCI) may be obtained under a condition of a measuring diameter radius of 3 mm.

The reflectance of the OLED panel may be measured using the same equipment and under the same condition used to measure reflectance of the surface treatment layer. However, a separate blackening treatment is not conducted on the opposite surface of the emitting surface of the OLED panel.

In addition, the total transmittance of the adhesive film and the surface treatment layer may be measured using a transmittance measuring device (spectrometer) commonly used in the art.

The OLED panel included in the display device according to the present specification is a white OLED panel, and includes a red (R) pixel, a green (G) pixel, a blue (B) pixel and a white pixel.

With an existing RGB OLED panel, using an optical film having a maximum absorption wavelength in a region of 500 nm and 590 nm, a region between emission peaks of R (approximately 620 nm), G (approximately 530 nm) and B (approximately 460 nm) is most preferred for the effect of reducing panel reflectance and minimizing panel luminance loss.

An OLED has properties that an emission spectrum of each pixel shifts to a shorter wavelength as a viewing angle with respect to the front increases, and as a result, color changes. Such a color change caused by the wavelength shift may be minimized by using a dye absorbing a wavelength of 500 nm and 590 nm.

Meanwhile, since a white OLED has a white pixel in addition to R, G and B, panel luminance may decrease by absorbing light of the white pixel when strongly absorbing a wavelength region of 590 nm.

However, the white OLED panel according to the present specification strongly absorbs a wavelength region of 500 nm, and accordingly, effects of improving reflectance and a viewing angle may be obtained while maintaining luminance of the OLED panel.

In the present specification, a unit of the viewing angle is a degree (°).

The color of the optical film may be outside neutral when using a dye absorbing a wavelength of 500 nm in a high concentration, however, by the optical film according to the present specification satisfying the conditions of (1) to (3), a spectrum form capable of favorably retaining the color of the optical film is obtained.

In one embodiment of the present specification, the optical film has a transmission color of $-8<a^*<8$ and $-7<b^*<8$.

In one embodiment of the present specification, the optical film has a transmission color of $-7 \leq a^* \leq 7.9$ and $-6.5 \leq b^* \leq 7$.

In one embodiment of the present specification, the optical film has a transmission color of $-6.5 \leq a^* \leq 7.7$ and $-6.5 \leq b^* \leq 0$.

In one embodiment of the present specification, the optical film has a transmission color of $-6.49 \leq a^* \leq 7.64$ and $-6.41 \leq b^* \leq -0.35$.

By the optical film satisfying the transmission color range described above, an effect of suppressing reddening or bluing of the optical film caused by the absorption at a wavelength of 500 nm is obtained.

In one embodiment of the present specification, a* indicates which direction the transmission color is leaned between red and green, and b* indicates which direction the transmission color is leaned between yellow and blue.

In the present specification, an increase in the a* value means reddening.

In the present specification, an increase in the b* value means yellowing.

In the present specification, the transmission color is based on the CIE 1976 color coordinate.

In one embodiment of the present specification, heat resistance reliability, moisture and heat resistance reliability and light resistance reliability are each $\Delta Y \leq 3\%$ p. The heat resistance reliability expresses changes in the transmission Y value of a D65 light source in a CIE XYZ color space after 500 hours at a wavelength of 380 nm to 780 nm and 80° C. as a percentage, the moisture and heat resistance reliability expresses changes in the transmission Y value of a D65 light source in a CIE XYZ color space after 500 hours at a wavelength of 380 nm to 780 nm, 60° C. and relative humidity of 90% as a percentage, and the light resistance reliability expresses changes in the transmission Y value of a D65 light source in a CIE XYZ color space under a condition of a wavelength of 380 nm to 780 nm and 22,500,000 lux*hr as a percentage.

The transmission Y value means a Y value among the tristimulus X, Y and Z values of the CIE color coordinate.

Changes in the transmission Y value being expressed as a percentage in the heat resistance reliability means subtracting the Y value (%) measured after storing for 500 hours at a wavelength of 380 nm to 780 nm and 80° C. immediately after preparing the optical film from the transmission Y value (%) of the optical film measured immediately after preparing the optical film.

Changes in the transmission Y value being expressed as a percentage in the moisture and heat resistance reliability means subtracting the Y value (%) measured after storing for 500 hours at a wavelength of 380 nm to 780 nm, 60° C. and relative humidity of 90% from the transmission Y value (%) of the optical film measured immediately after preparing the optical film.

Changes in the transmission Y value being expressed as a percentage in the light resistance reliability means subtracting the Y value (%) measured after storing for 48 hours at a wavelength of 380 nm to 780 nm, 50° C. or lower and approximately 470,000 lux from the transmission Y value (%) of the optical film measured immediately after preparing the optical film.

By the heat resistance reliability, the moisture and heat resistance reliability and the light resistance reliability satisfying $\Delta Y \leq 3\%$ p in the optical film according to the present specification, there are no changes in the transmission color and excellent reliability is obtained, and as a result, a long-term use is achieved.

In one embodiment of the present specification, the dye or pigment is azo-based, metal-containing azo-based, quinoline-based, methine-based, coumarin-based, porphyrin-based, azaporphyrin-based, phthalocyanine-based, anthraquinone-based, perylene-based, squarylium-based, benzoazole-based or triazine-based, or a mixture thereof.

Specifically, the dye or pigment is not particularly limited as long as it absorbs at least some of a wavelength of 490 nm to 510 nm.

One embodiment of the present specification provides an optical film, wherein the dye or pigment includes a compound represented by the following Chemical Formula 1.

[Chemical Formula 1]

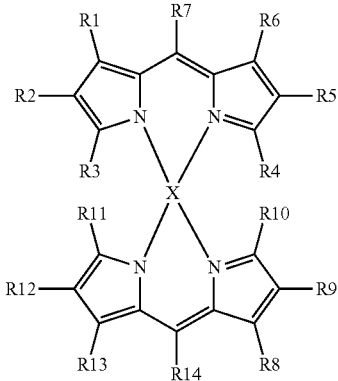

In Chemical Formula 1,
X is Zn; Co; Ni or Pd,
R1 to R6 and R8 to R13 are the same as or different from each other, and each independently hydrogen; deuterium; a halogen group; a nitrile group; a nitro group; —OC(=O)R; —(C=O)NR'R"; —(C=O)OR'"; —(C=O)Rx; a substituted or unsubstituted alkyl group; a substituted or unsubstituted cycloalkyl group; a substituted or unsubstituted aryl group; a substituted or unsubstituted alkoxy group; a substituted or unsubstituted aryloxy group; a substituted or unsubstituted heteroaryloxy group; a substituted or unsubstituted alkylthio group; a substituted or unsubstituted arylthio group; a substituted or unsubstituted heteroarylthio group; or a substituted or unsubstituted heteroaryl group, R7 and R14 are the same as or different from each other, and each independently hydrogen; a substituted or unsubstituted alkyl group; a substituted or unsubstituted aryl group; a substituted or unsubstituted heteroaryl group; a substituted or unsubstituted aryloxy group; a substituted or unsubstituted arylthio group; a substituted or unsubstituted heteroarylthio group; or a substituted or unsubstituted heteroaryloxy group, R, R', R", R'" and Rx are the same as or different from each other, and each independently hydrogen; a substituted or unsubstituted alkyl group; a substituted or unsubstituted cycloalkyl group; a substituted or unsubstituted heterocyclic group; or a substituted or unsubstituted aryl group, or R' and R" bond to each other to form a ring, and when R7 and R14 are hydrogen; a substituted or unsubstituted alkyl group; a substituted or unsubstituted aryl group; or a substituted or unsubstituted heteroaryl group and R2, R5, R9 and R12 are —C(=O)OR'", R'" is a substituted or unsubstituted aryl group; a substituted or unsubstituted cycloalkyl group; a substituted alkyl group; or a branched unsubstituted alkyl group having 3 to 30 carbon atoms.

In the present specification, the term "substituted or unsubstituted" means being substituted with one, two or more substituents selected from the group consisting of a halogen group; an alkyl group; a cycloalkyl group; an aryl group; an alkoxy group; an aryloxy group; an alkylthio group; an arylthio group; and a heterocyclic group, or being substituted with a substituent linking two or more substituents among the substituents illustrated above, or having no substituents.

In the present specification, the halogen group may be fluorine, chlorine, bromine or iodine.

In the present specification, the alkyl group may be linear or branched, and although not particularly limited thereto, the number of carbon atoms is preferably from 1 to 30. Specific examples thereof may include methyl, ethyl, propyl, isopropyl, butyl, heptyl and the like, but are not limited thereto.

In the present specification, the cycloalkyl group is not particularly limited, but preferably has 3 to 30 carbon atoms, and specific examples thereof may include a cyclopropyl group, a cyclobutyl group, a cyclopentyl group, a cycloheptyl group, a cyclooctyl group and the like, but are not limited thereto.

In the present specification, the aryl group may be monocyclic or polycyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a polycyclic aryl group, the number of carbon atoms is not particularly limited, but is preferably from 10 to 30. Specific examples of the polycyclic aryl group may include a naphthyl group, an anthracenyl group, a phenanthryl group, a pyrenyl group, a perylenyl group, a chrysenyl group, a fluorenyl group and the like, but are not limited thereto.

In the present specification, the alkoxy group may be linear, branched or cyclic. The number of carbon atoms of the alkoxy group is not particularly limited, but is preferably from 1 to 20. Specific examples thereof may include methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the aryl group in the aryloxy group and the arylthio group is the same as the examples of the aryl group described above. Specific examples of the aryloxy group may include phenoxy, p-tolyloxy, m-tolyloxy, 3,5-dimethyl-phenoxy, 2,4,6-trimethylphenoxy, p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2-anthryloxy, 9-anthryloxy, 1-phenanthryloxy, 3-phenanthryloxy, 9-phenanthryloxy and the like, and specific examples of the arylthio group may include a phenylthio group, a 2-methylphenylthio group, a 4-tert-butylphenylthio group and the like, however, the aryloxy group and the arylthiol group are not limited thereto.

In the present specification, the heterocyclic group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heterocyclic group may be monocyclic or polycyclic. Examples of the heterocyclic group may include a thiophene group, a pyridyl group, a pyrimidyl group, a triazinyl group, a benzothiophene group, a dibenzothiophene group, a benzofuranyl group, a dibenzofuranyl group and the like, but are not limited thereto.

In the present specification, the heteroaryl group means an aromatic group among the heterocyclic group.

In the present specification, the alkyl group in the alkylthio group is the same as the examples of the alkyl group described above. Specific examples of the alkylthio group may include a methylthio group, an ethylthio group, a tert-butylthio group, a hexylthio group, an octylthio group and the like, but are not limited thereto.

In the present specification, the aryl group in the arylthio group is the same as the examples of the aryl group described above.

In one embodiment of the present specification, the coumarin group and the chromone group are respectively represented by

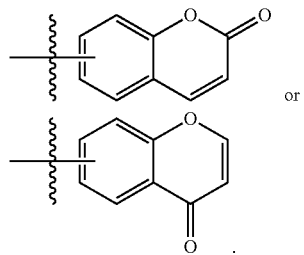

In the present specification, the heteroaryl group in the heteroaryloxy group and the heteroarylthio group is the same as the examples of the heteroaryl group described above.

In one embodiment of the present specification, X is Zn; Co; Ni or Pd.

In one embodiment of the present specification, X is Zn.
In one embodiment of the present specification, X is Co.
In one embodiment of the present specification, X is Pd.
In one embodiment of the present specification, X is Ni.

In one embodiment of the present specification, R1 to R6 and R8 to R13 are the same as or different from each other, and each independently hydrogen; deuterium; a halogen group; a nitrile group; a nitro group; —OC(=O)R; —(C=O)NR'R''; —(C=O)OR'''; —(C=O)Rx; a substituted or unsubstituted alkyl group; a substituted or unsubstituted cycloalkyl group; a substituted or unsubstituted aryl group; a substituted or unsubstituted alkoxy group; a substituted or unsubstituted aryloxy group; a substituted or unsubstituted heteroaryloxy group; a substituted or unsubstituted alkylthio group; a substituted or unsubstituted arylthio group; a substituted or unsubstituted heteroarylthio group; or a substituted or unsubstituted heteroaryl group.

In one embodiment of the present specification, R1 to R6 and R8 to R13 are the same as or different from each other, and each independently hydrogen; deuterium; a halogen group; a nitrile group; a nitro group; —OC(=O)R; —(C=O)NR'R''; —(C=O)OR'''; —(C=O)Rx; a substituted or unsubstituted alkyl group having 1 to 30 carbon atoms; a substituted or unsubstituted cycloalkyl group having 3 to 30 carbon atoms; a substituted or unsubstituted aryl group having 6 to 30 carbon atoms; a substituted or unsubstituted alkoxy group having 1 to 30 carbon atoms; a substituted or unsubstituted aryloxy group having 6 to 30 carbon atoms; a substituted or unsubstituted heteroaryloxy group having 2 to 30 carbon atoms; a substituted or unsubstituted alkylthio group having 1 to 30 carbon atoms; a substituted or unsubstituted arylthio group having 6 to 30 carbon atoms; a substituted or unsubstituted heteroarylthio group having 2 to 30 carbon atoms; or a substituted or unsubstituted heteroaryl group having 2 to 30 carbon atoms.

In one embodiment of the present specification, R1 to R6 and R8 to R13 are the same as or different from each other, and each independently hydrogen; deuterium; a halogen group; a nitrile group; a nitro group; —OC(=O)R; —(C=O)NR'R''; —(C=O)OR'''; —(C=O)Rx; a substituted or unsubstituted alkyl group having 1 to 20 carbon atoms; a substituted or unsubstituted cycloalkyl group having 3 to 20 carbon atoms; a substituted or unsubstituted aryl group having 6 to 20 carbon atoms; a substituted or unsubstituted alkoxy group having 1 to 20 carbon atoms; a substituted or unsubstituted aryloxy group having 6 to 20 carbon atoms; a substituted or unsubstituted heteroaryloxy group having 2 to 20 carbon atoms; a substituted or unsubstituted alkylthio group having 1 to 20 carbon atoms; a substituted or unsubstituted arylthio group having 6 to 20 carbon atoms; a substituted or unsubstituted heteroarylthio group having 2 to 20 carbon atoms; or a substituted or unsubstituted heteroaryl group having 2 to 20 carbon atoms.

In one embodiment of the present specification, R1 to R6 and R8 to R13 are the same as or different from each other, and each independently hydrogen; deuterium; a halogen group; a nitrile group; a nitro group; —OC(=O)R; —(C=O)NR'R''; —(C=O)OR'''; —(C=O)Rx; a substituted or unsubstituted alkyl group having 1 to 10 carbon atoms; a substituted or unsubstituted cycloalkyl group having 3 to 10 carbon atoms; a substituted or unsubstituted aryl group having 6 to 12 carbon atoms; a substituted or unsubstituted alkoxy group having 1 to 10 carbon atoms; a substituted or unsubstituted aryloxy group having 6 to 12 carbon atoms; a substituted or unsubstituted heteroaryloxy group having 2 to 10 carbon atoms; a substituted or unsubstituted alkylthio group having 1 to 10 carbon atoms; a substituted or unsubstituted arylthio group having 6 to 12 carbon atoms; a substituted or unsubstituted heteroarylthio group having 2 to 12 carbon atoms; or a substituted or unsubstituted heteroaryl group having 2 to 12 carbon atoms.

In one embodiment of the present specification, R7 and R14 are the same as or different from each other, and each independently hydrogen; a substituted or unsubstituted alkyl group; a substituted or unsubstituted aryl group; a substituted or unsubstituted heteroaryl group; a substituted or unsubstituted aryloxy group; a substituted or unsubstituted arylthio group; a substituted or unsubstituted heteroarylthio group; or a substituted or unsubstituted heteroaryloxy group.

In one embodiment of the present specification, R7 and R14 are the same as or different from each other, and each independently hydrogen; a substituted or unsubstituted alkyl group having 1 to 30 carbon atoms; a substituted or unsubstituted aryl group having 6 to 30 carbon atoms; a substituted or unsubstituted heteroaryl group having 2 to 30 carbon atoms; a substituted or unsubstituted aryloxy group having 6 to 30 carbon atoms; a substituted or unsubstituted arylthio group having 6 to 30 carbon atoms; a substituted or unsubstituted heteroarylthio group having 2 to 30 carbon atoms; or a substituted or unsubstituted heteroaryloxy group having 2 to 30 carbon atoms.

In one embodiment of the present specification, R7 and R14 are the same as or different from each other, and each independently hydrogen; a substituted or unsubstituted alkyl group having 1 to 20 carbon atoms; a substituted or unsubstituted aryl group having 6 to 20 carbon atoms; a substituted or unsubstituted heteroaryl group having 2 to 20 carbon atoms; a substituted or unsubstituted aryloxy group having 6 to 20 carbon atoms; a substituted or unsubstituted arylthio group having 6 to 20 carbon atoms; a heteroarylthio group having 2 to 20 carbon atoms; or a substituted or unsubstituted heteroaryloxy group having 2 to 20 carbon atoms.

In one embodiment of the present specification, R7 and R14 are the same as or different from each other, and each independently hydrogen; a substituted or unsubstituted alkyl group having 1 to 10 carbon atoms; a substituted or unsubstituted aryl group having 6 to 12 carbon atoms; a substituted or unsubstituted heteroaryl group having 2 to 10 carbon atoms; a substituted or unsubstituted aryloxy group having 6 to 12 carbon atoms; a substituted or unsubstituted arylthio group having 6 to 12 carbon atoms; a heteroarylthio group having 2 to 12 carbon atoms; or a substituted or unsubstituted heteroaryloxy group having 2 to 10 carbon atoms.

In one embodiment of the present specification, R, R', R'', R''' and Rx are the same as or different from each other, and each independently hydrogen; a substituted or unsubstituted alkyl group; a substituted or unsubstituted cycloalkyl group; a substituted or unsubstituted heterocyclic group; or a substituted or unsubstituted aryl group, or R' and R'' bond to each other to form a ring.

In one embodiment of the present specification, R, R', R'', R''' and Rx are the same as or different from each other, and each independently hydrogen; a substituted or unsubstituted alkyl group having 1 to 30 carbon atoms; a substituted or unsubstituted cycloalkyl group having 3 to 30 carbon atoms; a substituted or unsubstituted heteroaryl group having 2 to 30 carbon atoms; or a substituted or unsubstituted aryl group having 6 to 30 carbon atoms, or R' and R'' bond to each other to form an O-including hydrocarbon ring.

In one embodiment of the present specification, R, R', R'', R''' and Rx are the same as or different from each other, and each independently hydrogen; a substituted or unsubstituted alkyl group having 1 to 20 carbon atoms; a substituted or unsubstituted cycloalkyl group having 3 to 20 carbon atoms; a substituted or unsubstituted heteroaryl group having 2 to 20 carbon atoms; or a substituted or unsubstituted aryl group having 6 to 20 carbon atoms, or R' and R'' bond to each other to form an O-including hydrocarbon ring.

In one embodiment of the present specification, R, R', R'', R''' and Rx are the same as or different from each other, and each independently hydrogen; a substituted or unsubstituted alkyl group having 1 to 10 carbon atoms; a substituted or unsubstituted cycloalkyl group having 3 to 10 carbon atoms; a substituted or unsubstituted heteroaryl group having 2 to 10 carbon atoms; or a substituted or unsubstituted aryl group having 6 to 12 carbon atoms, or R' and R'' bond to each other to form an O-including hydrocarbon ring.

In one embodiment of the present specification, R1 to R6, R8 to R13 are the same as or different from each other, and each independently hydrogen; deuterium; fluorine; a nitrile group; a nitro group; —(C=O)NR'R''; —(C=O)OR'''; —(C=O)Rx; a substituted or unsubstituted methyl group; a substituted or unsubstituted isopropyl group; a substituted or unsubstituted cyclopentyl group; a substituted or unsubstituted cyclohexyl group; a substituted or unsubstituted phenyl group; or a substituted or unsubstituted dibenzofuranyl group.

In one embodiment of the present specification, R1 to R6, R8 to R13 are the same as or different from each other, and each independently hydrogen; fluorine; a nitrile group; a nitro group; —(C=O)NR'R''; —(C=O)OR'''; —(C=O)Rx; a methyl group; a trifluoromethyl group; an isopropyl group; a cyclopentyl group substituted with a methyl group; a cyclohexyl group unsubstituted or substituted with a methyl group or an isopropyl group; a phenyl group substituted with a trifluoromethyl group; or a dibenzofuranyl group.

In one embodiment of the present specification, R1, R6, R8 and R13 are the same as or different from each other, and each independently hydrogen; deuterium; a substituted or unsubstituted alkyl group; or a substituted or unsubstituted cycloalkyl group.

In one embodiment of the present specification, R1, R6, R8 and R13 are the same as or different from each other, and each independently hydrogen; deuterium; a substituted or unsubstituted alkyl group having 1 to 30 carbon atoms; or a substituted or unsubstituted cycloalkyl group having 3 to 30 carbon atoms.

In one embodiment of the present specification, R1, R6, R8 and R13 are the same as or different from each other, and each independently hydrogen; deuterium; a substituted or unsubstituted alkyl group having 1 to 20 carbon atoms; or a substituted or unsubstituted cycloalkyl group having 3 to 20 carbon atoms.

In one embodiment of the present specification, R1, R6, R8 and R13 are the same as or different from each other, and each independently hydrogen; deuterium; a substituted or unsubstituted alkyl group having 1 to 10 carbon atoms; or a substituted or unsubstituted cycloalkyl group having 3 to 10 carbon atoms.

In one embodiment of the present specification, R1, R6, R8 and R13 are the same as or different from each other, and each independently hydrogen; a substituted or unsubstituted methyl group; or a substituted or unsubstituted cyclohexyl group.

In one embodiment of the present specification, R1, R6, R8 and R13 are the same as or different from each other, and each independently hydrogen; a methyl group; or a cyclohexyl group unsubstituted or substituted with a methyl group or an isopropyl group.

In one embodiment of the present specification, at least one of R2, R5, R9 and R12 is a halogen group; a nitrile group; a nitro group; —(C=O)NR'R''; —(C=O)OR'''; —(C=O)Rx; a substituted or unsubstituted aryl group; a substituted or unsubstituted heteroaryl group; or an alkyl group substituted with fluorine.

In one embodiment of the present specification, at least one of R2, R5, R9 and R12 is chlorine; fluorine; bromine; iodine; a nitrile group; a nitro group; —(C═O)NR'R"; —(C═O)OR'"; —(C═O)Rx; a substituted or unsubstituted aryl group having 6 to 30 carbon atoms; a substituted or unsubstituted heteroaryl group having 3 to 30 carbon atoms; or an alkyl group having 1 to 30 carbon atoms substituted with fluorine.

In one embodiment of the present specification, at least one of R2, R5, R9 and R12 is chlorine; fluorine; bromine; iodine; a nitrile group; a nitro group; —(C═O)NR'R"; —(C═O)OR'"; —(C═O)Rx; a substituted or unsubstituted aryl group having 6 to 20 carbon atoms; a substituted or unsubstituted heteroaryl group having 3 to 20 carbon atoms; or an alkyl group having 1 to 20 carbon atoms substituted with fluorine.

In one embodiment of the present specification, at least one of R2, R5, R9 and R12 is chlorine; fluorine; bromine; iodine; a nitrile group; a nitro group; —(C═O)NR'R"; —(C═O)OR'"; —(C═O)Rx; a substituted or unsubstituted aryl group having 6 to 12 carbon atoms; a substituted or unsubstituted heteroaryl group having 3 to 12 carbon atoms; or an alkyl group having 1 to 10 carbon atoms substituted with fluorine.

In one embodiment of the present specification, at least one of R2, R5, R9 and R12 is chlorine; fluorine; bromine; iodine; a nitrile group; a nitro group; —(C═O)NR'R"; —(C═O)OR'"; —(C═O)Rx; a phenyl group substituted with a trifluoromethyl group; or a methyl group substituted with fluorine.

In one embodiment of the present specification, at least one of R2, R5, R9 and R12 is chlorine; fluorine; bromine; iodine; a nitrile group; a phenyl group substituted with a trifluoromethyl group; —(C═O)OR'"; or —CONR'R".

In one embodiment of the present specification, R, R', R", R'" and Rx are the same as or different from each other, and each independently hydrogen; a substituted or unsubstituted methyl group; a substituted or unsubstituted ethyl group; a substituted or unsubstituted cyclohexyl group; or a substituted or unsubstituted phenyl group, or R' and R" bond to each other to form a morpholinyl group.

In one embodiment of the present specification, R, R', R", R'" and Rx are the same as or different from each other, and each independently hydrogen; a methyl group; an ethyl group; a methyl group substituted with an alkoxy group; a methyl group substituted with a phenyl group substituted with a nitro group; a phenyl group; a phenyl group substituted with a nitro group; a phenyl group substituted with a tert-butyl group; or a phenyl group substituted with a nitrile group, or R' and R" bond to each other to form a morpholinyl group.

In one embodiment of the present specification, R'" is a methyl group; an ethyl group; a methyl group substituted with an alkoxy group; a methyl group substituted with a phenyl group substituted with a nitro group; a phenyl group substituted with a nitro group; a phenyl group substituted with a tert-butyl group; or a phenyl group substituted with a nitrile group.

The methyl group substituted with an alkoxy group may be represented by any one of the following chemical formulae.

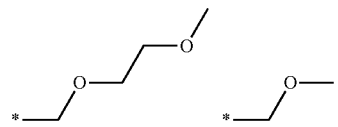

In the chemical formulae,

*—— means a site linked to other substituents or linking sites.

The methyl group substituted with an alkoxy group may be further substituted with a methoxy group.

In one embodiment of the present specification, R' and R" are the same as or different from each other, and each independently hydrogen; a methyl group; a methyl group substituted with a phenyl group substituted with a nitro group; a methyl group substituted with a methoxy group; an ethyl group; a cyclohexyl group; a phenyl group substituted with a nitro group; or a phenyl group, or bond to each other to form a morpholinyl group.

In one embodiment of the present specification, Rx is hydrogen.

In one embodiment of the present specification, R3, R4, R10 and R11 are the same as or different from each other, and each independently hydrogen; a substituted or unsubstituted alkyl group having 1 to 30 carbon atoms; or a substituted or unsubstituted cycloalkyl group having 3 to 30 carbon atoms.

In one embodiment of the present specification, R3, R4, R10 and R11 are the same as or different from each other, and each independently hydrogen; a substituted or unsubstituted alkyl group having 1 to 20 carbon atoms; or a substituted or unsubstituted cycloalkyl group having 3 to 20 carbon atoms.

In one embodiment of the present specification, R3, R4, R10 and R11 are the same as or different from each other, and each independently hydrogen; a substituted or unsubstituted alkyl group having 1 to 10 carbon atoms; or a substituted or unsubstituted cycloalkyl group having 3 to 10 carbon atoms.

In one embodiment of the present specification, R3, R4, R10 and R11 are the same as or different from each other, and each independently hydrogen; a substituted or unsubstituted methyl group; a substituted or unsubstituted isopropyl group; a substituted or unsubstituted cyclopentyl group; or a substituted or unsubstituted cyclohexyl group.

In one embodiment of the present specification, R3, R4, R10 and R11 are the same as or different from each other, and each independently hydrogen; a methyl group; an isopropyl group; a cyclopentyl group substituted with a methyl group; or a cyclohexyl group unsubstituted or substituted with a methyl group or an isopropyl group.

In one embodiment of the present specification, R7 and R14 are the same as or different from each other, and each independently hydrogen; a substituted or unsubstituted phenyl group; a substituted or unsubstituted biphenyl group; a substituted or unsubstituted naphthyl group; a substituted or unsubstituted pyridinyl group; or a substituted or unsubstituted dibenzofuranyl group.

In one embodiment of the present specification, R7 and R14 are the same as or different from each other, and each independently hydrogen; a phenyl group unsubstituted or substituted with fluorine, a nitrile group, a methyl group, a trifluoromethyl group, a tert-butyl group or a methoxy group; a substituted or unsubstituted biphenyl group; a substituted or unsubstituted naphthyl group; a substituted or unsubstituted pyridinyl group; or a substituted or unsubstituted dibenzofuranyl group.

In one embodiment of the present specification, R7 and R14 are the same as or different from each other, and each independently hydrogen; a phenyl group unsubstituted or substituted with fluorine, a nitrile group, a methyl group, a trifluoromethyl group, a tert-butyl group or a methoxy group; a biphenyl group substituted with a methyl group; a naphthyl group; a pyridinyl group; or a dibenzofuranyl group.

In one embodiment of the present specification, at least one of R3, R4, R10 and R11 is a substituted or unsubstituted alkoxy group; a substituted or unsubstituted aryloxy group; a substituted or unsubstituted heteroaryloxy group; a substituted or unsubstituted arylthio group; a substituted or unsubstituted heteroarylthio group; or a substituted or unsubstituted alkylthio group.

In one embodiment of the present specification, at least one of R3, R4, R10 and R11 is a substituted or unsubstituted alkoxy group having 1 to 30 carbon atoms; a substituted or unsubstituted aryloxy group having 6 to 30 carbon atoms; a substituted or unsubstituted heteroaryloxy group having 2 to 30 carbon atoms; a substituted or unsubstituted arylthio group having 6 to 30 carbon atoms; a substituted or unsubstituted heteroarylthio group having 2 to 30 carbon atoms; or a substituted or unsubstituted alkylthio group having 1 to 30 carbon atoms.

In one embodiment of the present specification, at least one of R3, R4, R10 and R11 is a substituted or unsubstituted alkoxy group having 1 to 20 carbon atoms; a substituted or unsubstituted aryloxy group having 6 to 20 carbon atoms; a substituted or unsubstituted heteroaryloxy group having 2 to 20 carbon atoms; a substituted or unsubstituted arylthio group having 6 to 20 carbon atoms; a substituted or unsubstituted heteroarylthio group having 2 to 20 carbon atoms; or a substituted or unsubstituted alkylthio group having 1 to 20 carbon atoms.

In one embodiment of the present specification, at least one of R3, R4, R10 and R11 is a substituted or unsubstituted alkoxy group having 1 to 10 carbon atoms; a substituted or unsubstituted aryloxy group having 6 to 12 carbon atoms; a substituted or unsubstituted heteroaryloxy group having 2 to 10 carbon atoms; a substituted or unsubstituted arylthio group having 6 to 12 carbon atoms; a substituted or unsubstituted heteroarylthio group having 2 to 10 carbon atoms; or a substituted or unsubstituted alkylthio group having 1 to 10 carbon atoms.

In one embodiment of the present specification, at least one of R3, R4, R10 and R11 is a substituted or unsubstituted phenyloxy group; a substituted or unsubstituted isopropoxy group; a substituted or unsubstituted ethoxy group; a substituted or unsubstituted phenylthio group; a substituted or unsubstituted pyridinethio group; a substituted or unsubstituted isopropylthio group; or a substituted or unsubstituted pyridinoxy group.

In one embodiment of the present specification, at least one of R3, R4, R10 and R11 is a phenyloxy group unsubstituted or substituted with an ethyl group, a tert-butyl group, a methoxy group, fluorine, a nitrile group, a nitro group or a trifluoromethyl group; an isopropoxy group substituted with fluorine; an ethoxy group substituted with fluorine; a phenylthio group substituted with chlorine; a pyridinethio group; an isopropylthio group; or a pyridinoxy group.

In one embodiment of the present specification, R1, R6, R8 and R13 are the same as or different from each other, and each independently hydrogen; a methyl group; a cyclopentyl group; a cyclohexyl group; an isopropylthio group; a phenyloxy group substituted with a nitrile group; or a phenylthio group substituted with chlorine.

In one embodiment of the present specification, R2, R5, R9 and R12 are the same as or different from each other, and each independently hydrogen; a halogen group; a nitrile group; a substituted or unsubstituted phenyl group; —(C=O)NR'R"; or —(C=O)OR'".

In one embodiment of the present specification, R2, R5, R9 and R12 are the same as or different from each other, and each independently hydrogen; chlorine; fluorine; bromine; iodine; a nitrile group; a substituted or unsubstituted phenyl group; —(C=O)NR'R"; or —(C=O)OR'".

In one embodiment of the present specification, R2, R5, R9 and R12 are the same as or different from each other, and each independently hydrogen; chlorine; fluorine; bromine; iodine; a nitrile group; a phenyl group substituted with a trifluoromethyl group; —(C=O)NR'R"; or —(C=O)OR'".

In one embodiment of the present specification, R', R" and R'" are the same as or different from each other, and each independently a substituted or unsubstituted alkyl group; or a substituted or unsubstituted heteroaryl group.

In one embodiment of the present specification, R', R" and R'" are the same as or different from each other, and each independently a substituted or unsubstituted alkyl group having 1 to 30 carbon atoms; or a substituted or unsubstituted heteroaryl group having 3 to 30 carbon atoms.

In one embodiment of the present specification, R', R" and R'" are the same as or different from each other, and each independently a substituted or unsubstituted alkyl group having 1 to 20 carbon atoms; or a substituted or unsubstituted heteroaryl group having 3 to 20 carbon atoms.

In one embodiment of the present specification, R', R" and R'" are the same as or different from each other, and each independently a substituted or unsubstituted alkyl group having 1 to 10 carbon atoms; or a substituted or unsubstituted heteroaryl group having 3 to 10 carbon atoms.

In one embodiment of the present specification, R', R" and R'" are the same as or different from each other, and each independently a substituted or unsubstituted methyl group; a substituted or unsubstituted ethyl group; or a substituted or unsubstituted coumarin group.

In one embodiment of the present specification, R', R" and R'" are the same as or different from each other, and each independently a methyl group; a methyl group substituted with a phenyl group substituted with a nitro group; an ethyl group; or a coumarin group.

In one embodiment of the present specification, R is a methyl group substituted with a phenyl group substituted with a nitro group; an ethyl group; or a coumarin group.

In one embodiment of the present specification, R' and R" are a methyl group.

In one embodiment of the present specification, R7 and R14 are the same as or different from each other, and each independently hydrogen; deuterium; a substituted or unsubstituted alkyl group; a substituted or unsubstituted aryl group; or a substituted or unsubstituted heteroaryl group.

In one embodiment of the present specification, R7 and R14 are the same as or different from each other, and each independently hydrogen; deuterium; a substituted or unsubstituted alkyl group having 1 to 30 carbon atoms; a substituted or unsubstituted aryl group having 6 to 30 carbon atoms; or a substituted or unsubstituted heteroaryl group having 3 to 30 carbon atoms.

In one embodiment of the present specification, R7 and R14 are the same as or different from each other, and each independently hydrogen; deuterium; a substituted or unsubstituted alkyl group having 1 to 20 carbon atoms; a substituted or unsubstituted aryl group having 6 to 20 carbon atoms; or a substituted or unsubstituted heteroaryl group having 3 to 20 carbon atoms.

In one embodiment of the present specification, R7 and R14 are the same as or different from each other, and each independently hydrogen; deuterium; a substituted or unsubstituted alkyl group having 1 to 10 carbon atoms; a substituted or unsubstituted aryl group having 6 to 12 carbon atoms; or a substituted or unsubstituted heteroaryl group having 3 to 10 carbon atoms.

In one embodiment of the present specification, R7 and R14 are the same as or different from each other, and each independently hydrogen; a substituted or unsubstituted methyl group; a substituted or unsubstituted phenyl group; a substituted or unsubstituted pyridinyl group; a substituted or unsubstituted dibenzofuranyl group; a substituted or unsubstituted quinolinyl group; a substituted or unsubstituted furanyl group; a substituted or unsubstituted thiophenyl group; or a substituted or unsubstituted benzofuranyl group.

In one embodiment of the present specification, R7 and R14 are the same as or different from each other, and each independently hydrogen; a methyl group; a trifluoromethyl group; a phenyl group unsubstituted or substituted with fluorine, a methyl group, a trifluoromethyl group, a tert-butyl group or a methoxy group; a pyridinyl group; a dibenzofuranyl group; a quinolinyl group; a furanyl group; a thiophenyl group; or a benzofuranyl group.

In one embodiment of the present specification, R7 and R14 are the same as or different from each other, and each independently hydrogen; a methyl group; a trifluoromethyl group; a phenyl group; a phenyl group substituted with fluorine; a phenyl group substituted with a methyl group; a phenyl group substituted with a trifluoromethyl group; a phenyl group substituted with a tert-butyl group; a phenyl group substituted with a methyl group and a methoxy group; a phenyl group substituted with a methyl group and a tert-butyl group; a pyridinyl group; a dibenzofuranyl group; a quinolinyl group; a furanyl group; a thiophenyl group; or a benzofuranyl group.

In one embodiment of the present specification, when R7 and R14 are hydrogen; a substituted or unsubstituted alkyl group; a substituted or unsubstituted aryl group; or a substituted or unsubstituted heteroaryl group and R2, R5, R9 and R12 are —C(=O)OR''', R''' is a substituted or unsubstituted aryl group; a substituted or unsubstituted cycloalkyl group; a substituted alkyl group; or a branched unsubstituted alkyl group having 3 to 30 carbon atoms.

In one embodiment of the present specification, when R2, R5, R9 and R12 are —C(=O)OR''' and R''' is a substituted alkyl group, it means an alkyl group substituted with at least one substituent other than an alkyl group.

In one embodiment of the present specification, when R2, R5, R9 and R12 are —C(=O)OR''' and R''' is a substituted alkyl group, it is an alkyl group substituted with a halogen group, a nitrile group, a nitro group, an alkyl group substituted with a halogen group, an alkyl group substituted with an alkoxy group, —C(=O)OR, —(C=O)NR'R" or —CHO, and R, R' and R" are the same as described above.

In one embodiment of the present specification, when R2, R5, R9 and R12 are —C(=O)OR''' and R''' is a substituted alkyl group, it is an alkyl group having 1 to 30 carbon atoms substituted with an ethoxy group substituted with a methoxy group, a methyl group substituted with a methoxy group, a phenyl group substituted with a nitro group, a methoxy group, a trifluoromethyl group or a nitrile group.

In one embodiment of the present specification, when R2, R5, R9 and R12 are —C(=O)OR''' and R''' is a substituted alkyl group, it is an alkyl group having 1 to 20 carbon atoms substituted with an ethoxy group substituted with a methoxy group, a methyl group substituted with a methoxy group, a phenyl group substituted with a nitro group, a methoxy group, a trifluoromethyl group or a nitrile group.

In one embodiment of the present specification, when R2, R5, R9 and R12 are —C(=O)OR''' and R''' is a substituted alkyl group, it is an alkyl group having 1 to 10 carbon atoms substituted with an ethoxy group substituted with a methoxy group, a methyl group substituted with a methoxy group, a phenyl group substituted with a nitro group, a methoxy group, a trifluoromethyl group or a nitrile group.

In one embodiment of the present specification, when R2, R5, R9 and R12 are —C(=O)OR''' and R''' is a substituted alkyl group, it is an alkyl group having 1 to 5 carbon atoms substituted with an ethoxy group substituted with a methoxy group, a methyl group substituted with a methoxy group, a phenyl group substituted with a nitro group, a methoxy group, a trifluoromethyl group or a nitrile group.

In one embodiment of the present specification, when R2, R5, R9 and R12 are —C(=O)OR''' and R''' is a substituted alkyl group, it is a methyl group substituted with an ethoxy group substituted with a methoxy group, a phenyl group substituted with a nitro group, a methoxy group, a trifluoromethyl group or a nitrile group; or an n-propyl group substituted with a methyl group substituted with a methoxy group.

In one embodiment of the present specification, when R2, R5, R9 and R12 are —C(=O)OR''' and R''' is a branched unsubstituted alkyl group having 3 to 30 carbon atoms, R is preferably a 1-ethylpropyl group; or a 2-ethylhexyl group.

In one embodiment of the present specification, when R2, R5, R9 and R12 are —C(=O)OR''', R''' is a substituted or unsubstituted aryl group having 6 to 30 carbon atoms; a substituted or unsubstituted cycloalkyl group having 3 to 30 carbon atoms; a substituted alkyl group having 1 to 30 carbon atoms; or a branched unsubstituted alkyl group having 3 to 30 carbon atoms.

In one embodiment of the present specification, when R2, R5, R9 and R12 are —C(=O)OR''', R''' is a substituted or unsubstituted aryl group having 6 to 20 carbon atoms; a substituted or unsubstituted cycloalkyl group having 3 to 20 carbon atoms; a substituted alkyl group having 1 to 20 carbon atoms; or a branched unsubstituted alkyl group having 3 to 20 carbon atoms.

In one embodiment of the present specification, when R2, R5, R9 and R12 are —C(=O)OR''', R''' is a substituted or unsubstituted aryl group having 6 to 12 carbon atoms; a substituted or unsubstituted cycloalkyl group having 3 to 10 carbon atoms; a substituted alkyl group having 1 to 10 carbon atoms; or a branched unsubstituted alkyl group having 3 to 10 carbon atoms.

In one embodiment of the present specification, when R2, R5, R9 and R12 are —C(=O)OR''', R''' is a substituted or unsubstituted phenyl group; a substituted or unsubstituted cyclohexyl group; a substituted methyl group; a substituted ethyl group; a substituted n-propyl group; a 1-ethylpropyl group; or a 2-ethylhexyl group.

In one embodiment of the present specification, when R2, R5, R9 and R12 are —C(=O)OR''', R''' is a substituted or unsubstituted phenyl group; a substituted or unsubstituted cyclohexyl group; a substituted methyl group; a 1-ethylpropyl group; or a 2-ethylhexyl group.

In one embodiment of the present specification, when R2, R5, R9 and R12 are —C(=O)OR''', R''' is a phenyl group substituted with fluorine or a trifluoromethyl group; a cyclohexyl group substituted with one or more selected from the group consisting of a methyl group and an isopropyl group; a methyl group substituted with a nitrile group; an ethyl group substituted with fluorine; an isopropyl group substituted with fluorine; an n-propyl group substituted with a methyl group substituted with a methoxy group; a 1-ethylpropyl group; or a 2-ethylhexyl group.

In one embodiment of the present specification, Chemical Formula 1 may be represented by the following Chemical Formula 1-1.

[Chemical Formula 1-1]

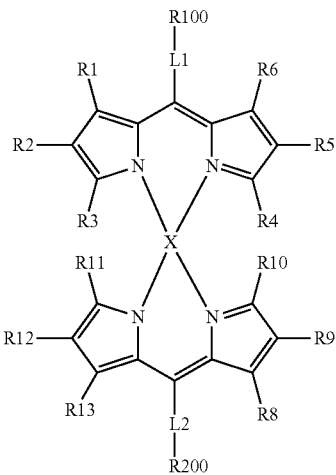

In Chemical Formula 1-1,

R1, R2, R5, R6, R8, R9, R12 and R13 are the same as or different from each other, and each independently hydrogen; a halogen group; an aldehyde group; a nitrile group; a nitro group; a substituted or unsubstituted ester group; a substituted or unsubstituted amide group; a substituted or unsubstituted alkyl group; a substituted or unsubstituted cycloalkyl group; a substituted or unsubstituted aryl group; a substituted or unsubstituted aryloxy group; a substituted or unsubstituted arylthio group; or a substituted or unsubstituted heteroaryl group, R3, R4, R10 and R11 are each independently hydrogen; a substituted or unsubstituted alkyl group; or a substituted or unsubstituted cycloalkyl group, L1 and L2 are the same as or different from each other, and each independently O or S, R100 and R200 are the same as or different from each other, and each independently a substituted or unsubstituted aryl group; or a substituted or unsubstituted heteroaryl group, and X is Zn, Co, Ni or Pd.

In one embodiment of the present specification, R1, R2, R5, R6, R8, R9, R12 and R13 are the same as or different from each other, and each independently hydrogen; a halogen group; a nitrile group; a nitro group; —CHO; —COOR; —(C=O)NR'R''; a linear or branched alkyl group; a fluoroalkyl group; a cycloalkyl group unsubstituted or substituted with an alkyl group; an aryl group unsubstituted or substituted with one or more substituents selected from among a nitrile group, a halogen group, an alkyl group and a fluoroalkyl group; a polycyclic heterocyclic group; an aryloxy group unsubstituted or substituted with one or more substituents selected from among a halogen group and an alkyl group; or an arylthio group unsubstituted or substituted with one or more substituents selected from among a halogen group and an alkyl group, and R, R' and R'' are the same as or different from each other and each independently a substituted or unsubstituted alkyl group; a substituted or unsubstituted aryl group; or a substituted or unsubstituted heteroaryl group, and R' and R'' may bond to each other to form a ring.

In one embodiment of the present specification, R1, R2, R5, R6, R8, R9, R12 and R13 are each hydrogen; a halogen group; a nitrile group; a nitro group; —CHO; —COOR; —(C=O)NR'R''; a $C_1$-$C_{10}$ alkyl group; a $C_1$-$C_{10}$ fluoroalkyl group; a $C_3$-$C_{12}$ cycloalkyl group; a $C_5$-$C_{15}$ alkylcycloalkyl group; an aryl group unsubstituted or substituted with one or more substituents selected from among a nitrile group, a halogen group, a $C_1$-$C_{10}$ alkyl group and a fluoroalkyl group; a $C_6$-$C_{10}$ aryloxy group unsubstituted or substituted with one or more substituents selected from among an alkyl group and a halogen group; a $C_6$-$C_{10}$ arylthio group unsubstituted or substituted with one or more substituents selected from among an alkyl group and a halogen group; or an O-including heteroaryl group, and R, R' and R'' are each a $C_1$-$C_{10}$ alkyl group; a $C_5$-$C_{15}$ alkylaryl group; or a $C_5$-$C_{15}$ nitroaryl group.

In one embodiment of the present specification, R1, R2, R5, R6, R8, R9, R12 and R13 are each hydrogen; fluorine; chlorine; bromine; —CN; —NO$_2$; —CHO; —COOR; —(C=O)NR'R''; a $C_1$-$C_5$ alkyl group; a $C_1$-$C_5$ fluoroalkyl group; a $C_3$-$C_8$ cycloalkyl group; a $C_5$-$C_{10}$ alkylcycloalkyl group; a phenyl group unsubstituted or substituted with one or more substituents selected from among —CN, fluorine, a $C_1$-$C_5$ alkyl group and a trifluoroalkyl group; a phenoxy group unsubstituted or substituted with one or more substituents selected from among a $C_1$-$C_5$ alkyl group, fluorine, chlorine and bromine; a phenylthio group unsubstituted or substituted with one or more substituents selected from among a $C_1$-$C_5$ alkyl group, fluorine, chlorine and bromine; or an O-including polycyclic heteroaryl group, and R, R' and R'' are each a $C_1$-$C_5$ alkyl group; a $C_8$-$C_{12}$ alkylaryl group; or a $C_8$-$C_{12}$ nitroaryl group.

In one embodiment of the present specification, R1, R2, R5, R6, R8, R9, R12 and R13 are each hydrogen; fluorine; chlorine; bromine; —CN; —NO$_2$; —CHO; —COOR; —(C=O)NR'R''; a methyl group; an ethyl group; a propyl group; a t-butyl group; —CF$_3$; a cyclopropyl group; a cyclobutyl group; a cyclopentyl group; a cyclohexyl group; a methylcyclohexyl group; a propylcyclohexyl group; a phenyl group unsubstituted or substituted with —CN, fluorine, a methyl group, an ethyl group, a propyl group, a t-butyl group or —CF$_3$; a phenoxy group substituted with a t-butyl group or fluorine; a phenylthio group substituted with chlorine; or a dibenzofuranyl group, and R, R' and R'' are each a methyl group; an ethyl group; a t-butylphenyl group; or a nitrophenyl group.

In one embodiment of the present specification, Chemical Formula 1-1 is any one of the following Chemical Formulae 1-1-1 to 1-1-8.

[Chemical Formula 1-1-1]
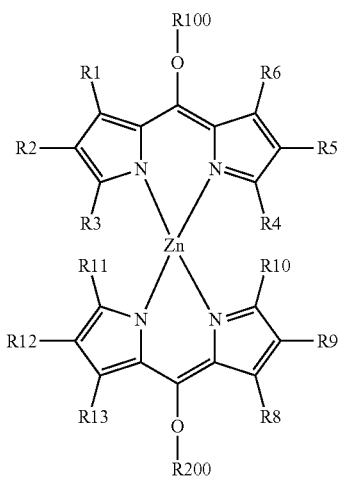
[Chemical Formula 1-1-2]
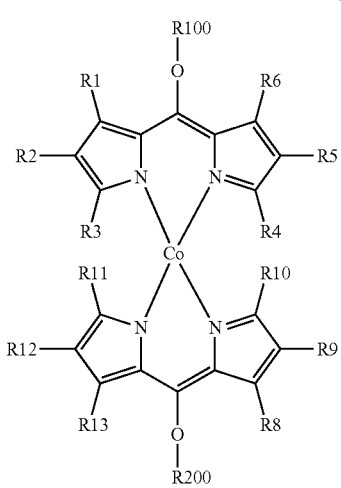
[Chemical Formula 1-1-3]
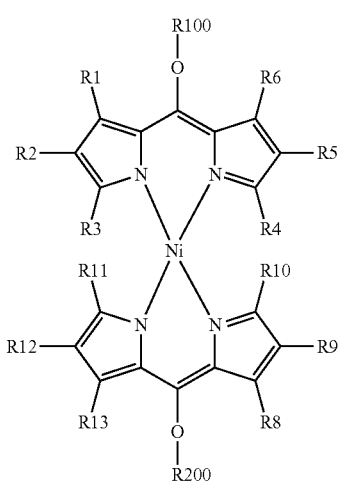
[Chemical Formula 1-1-4]
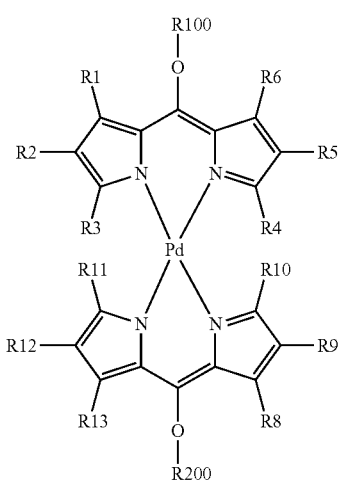
[Chemical Formula 1-1-5]
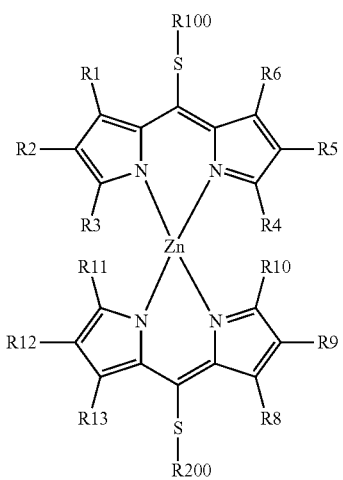
[Chemical Formula 1-1-6]
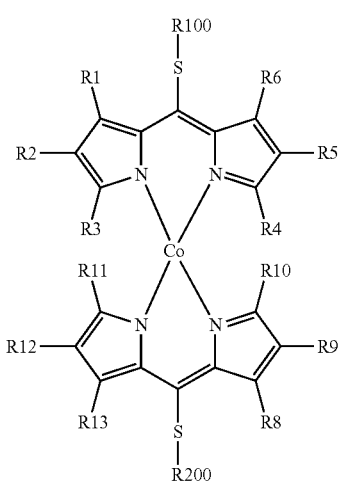

-continued

[Chemical Formula 1-1-7]

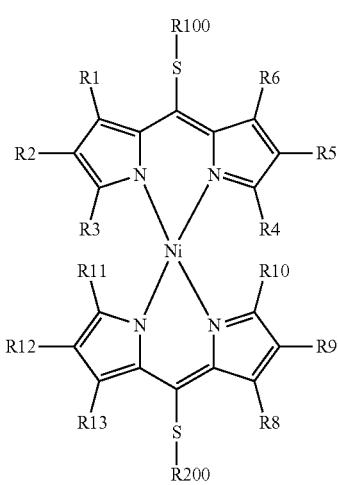

[Chemical Formula 1-1-8]

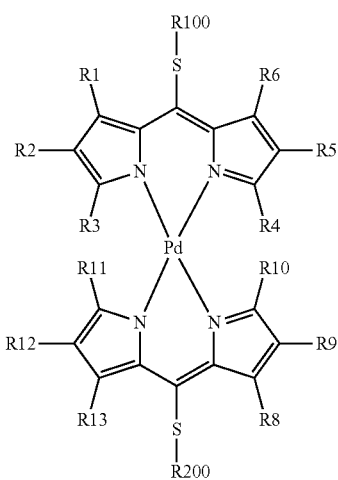

In Chemical Formulae 1-1-1 to 1-1-8, each substituent has the same definition as in Chemical Formula 1-1.

In one embodiment of the present specification, R3, R4, R10 and R11 are the same as or different from each other, and each independently hydrogen; a linear or branched alkyl group; or a cycloalkyl group unsubstituted or substituted with an alkyl group.

In one embodiment of the present specification, R3, R4, R10 and R11 are each hydrogen.

In one embodiment of the present specification, R3, R4, R10 and R11 are each a $C_1$-$C_{10}$ alkyl group.

In one embodiment of the present specification, R3, R4, R10 and R11 are each a $C_1$-$C_{10}$ linear alkyl group.

In one embodiment of the present specification, R3, R4, R10 and R11 are each a $C_1$-$C_5$ alkyl group.

In one embodiment of the present specification, R3, R4, R10 and R11 are each a $C_1$-$C_5$ linear alkyl group.

In one embodiment of the present specification, R3, R4, R10 and R11 are each a $C_1$-$C_3$ alkyl group.

In one embodiment of the present specification, R3, R4, R10 and R11 are each a $C_1$-$C_3$ linear alkyl group.

In one embodiment of the present specification, R3, R4, R10 and R11 are each a methyl group or a propyl group.

In one embodiment of the present specification, R3, R4, R10 and R11 are each a cycloalkyl group unsubstituted or substituted with a $C_1$-$C_{10}$ alkyl group.

In one embodiment of the present specification, R3, R4, R10 and R11 are each a $C_3$-$C_{12}$ cycloalkyl group.

In one embodiment of the present specification, R3, R4, R10 and R11 are each a $C_3$-$C_8$ cycloalkyl group.

In one embodiment of the present specification, R3, R4, R10 and R11 are each a cyclopropyl group, a cyclobutyl group, a cyclopentyl group or a cyclohexyl group.

In one embodiment of the present specification, R3, R4, R10 and R11 are each a $C_5$-$C_{15}$ alkylcycloalkyl group.

In one embodiment of the present specification, R3, R4, R10 and R11 are each a $C_5$-$C_{10}$ alkylcycloalkyl group.

In one embodiment of the present specification, R3, R4, R10 and R11 are each a methylcyclohexyl group or a propylcyclohexyl group.

In one embodiment of the present specification, R100 and R200 are the same as or different from each other, and each independently an aryl group unsubstituted or substituted with one or more substituents selected from among an alkyl group, a fluoroalkyl group, a halogen group, a nitrile group, an alkoxy group and an aryl group; or a heteroaryl group unsubstituted or substituted with an alkyl group or $=$O.

In one embodiment of the present specification, R100 and R200 are each an aryl group unsubstituted or substituted with one or more substituents selected from among a methyl group, an ethyl group, a propyl group, a t-butyl group, fluorine, a trifluoromethyl group, a nitrile group, a methoxy group and a phenyl group; or a heteroaryl group unsubstituted or substituted with a methyl group or $=$O.

In one embodiment of the present specification, R100 and R200 are each a phenyl group unsubstituted or substituted with one or more substituents selected from among a methyl group, an ethyl group, a propyl group, a t-butyl group, fluorine, a trifluoromethyl group, a nitrile group, a methoxy group and a phenyl group; a dibenzofuranyl group; a pyridine group unsubstituted or substituted with a methyl group; or a benzopyranyl group unsubstituted or substituted with $=$O.

In one embodiment of the present specification, examples of the benzopyranyl group substituted with $=$O may include a coumarin group, a chromone group and the like.

In one embodiment of the present specification, Chemical Formula 1 is represented by the following Chemical Formula 2-1.

[Chemical Formula 2-1]

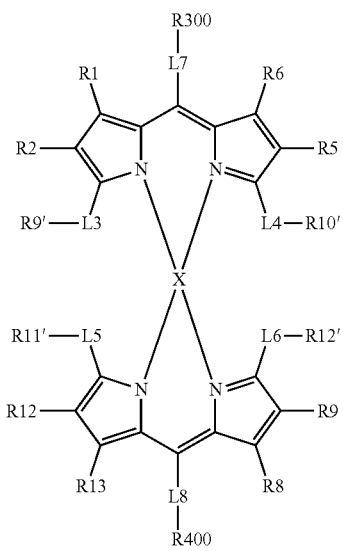

In Chemical Formula 2-1,

R1, R2, R5, R6, R8, R9, R12 and R13 are the same as or different from each other, and each independently hydrogen; a halogen group; an aldehyde group; a nitrile group; a nitro group; a substituted or unsubstituted ester group; a substituted or unsubstituted amide group; a substituted or unsubstituted alkyl group; a substituted or unsubstituted cycloalkyl group; a substituted or unsubstituted aryl group; a substituted or unsubstituted aryloxy group; a substituted or unsubstituted arylthio group; or a substituted or unsubstituted heteroaryl group, R9' to R12' are the same as or different from each other, and each independently a substituted or unsubstituted alkyl group; a substituted or unsubstituted aryl group; or a substituted or unsubstituted heteroaryl group, L3 to L6, L7 and L8 are the same as or different from each other, and each independently O or S, R300 and R400 are the same as or different from each other, and each independently a substituted or unsubstituted aryl group; or a substituted or unsubstituted heteroaryl group, and X is Zn, Co, Ni or Pd.

In one embodiment of the present specification, R1, R2, R5, R6, R8, R9, R12 and R13 are the same as or different from each other, and each independently hydrogen; a halogen group; a nitrile group; a nitro group; —CHO; —COOR; —(C=O)NR'R''; a linear or branched alkyl group; a fluoroalkyl group; a cycloalkyl group unsubstituted or substituted with an alkyl group; an aryl group unsubstituted or substituted with one or more substituents selected from among a nitrile group, a halogen group, an alkyl group and a fluoroalkyl group; a polycyclic heterocyclic group; an aryloxy group unsubstituted or substituted with one or more substituents selected from among a halogen group, an alkyl group and a fluoroalkyl group; or an arylthio group unsubstituted or substituted with one or more substituents selected from among a halogen group and an alkyl group, and R, R' and R'' are the same as or different from each other and each independently a substituted or unsubstituted alkyl group; a substituted or unsubstituted aryl group; or a substituted or unsubstituted heteroaryl group, and R' and R'' may bond to each other to form a ring.

In one embodiment of the present specification, R1, R2, R5, R6, R8, R9, R12 and R13 are the same as or different from each other, and are each hydrogen; a halogen group; a nitrile group; a nitro group; —CHO; —COOR; —(C=O)NR'R''; a $C_1$-$C_{10}$ alkyl group; a $C_1$-$C_{10}$ fluoroalkyl group; a $C_3$-$C_{12}$ cycloalkyl group; a $C_5$-$C_{15}$ alkylcycloalkyl group; an aryl group unsubstituted or substituted with a nitrile group, a halogen group, a $C_1$-$C_{10}$ alkyl group or a fluoroalkyl group; a $C_6$-$C_{10}$ aryloxy group unsubstituted or substituted with one or more substituents selected from among an alkyl group, a fluoroalkyl group and a halogen group; a $C_6$-$C_{10}$ arylthio group unsubstituted or substituted with one or more substituents selected from among an alkyl group and a halogen group; or an O-including heteroaryl group, and R, R' and R'' are each a $C_1$-$C_{10}$ alkyl group; a $C_2$-$C_{10}$ alkoxyalkyl group; a $C_5$-$C_{15}$ alkylaryl group; a $C_5$-$C_{15}$ arylalkyl group unsubstituted or substituted with $NO_2$; or an O-including heteroaryl group unsubstituted or substituted with =O, and R' and R'' may bond to each other to form an O-including hydrocarbon ring.

In one embodiment of the present specification, R1, R2, R5, R6, R8, R9, R12 and R13 are the same as or different from each other, and are each hydrogen; fluorine; chlorine; bromine; —CN; —$NO_2$; —CHO; —COOR; —(C=O)NR'R''; a $C_1$-$C_5$ alkyl group; a $C_1$-$C_5$ fluoroalkyl group; a $C_3$-$C_8$ cycloalkyl group; a $C_5$-$C_{10}$ alkylcycloalkyl group; a phenyl group unsubstituted or substituted with one or more substituents selected from among —CN, fluorine, a $C_1$-$C_5$ alkyl group and a trifluoroalkyl group; a phenoxy group unsubstituted or substituted with one or more substituents selected from among a $C_1$-$C_5$ alkyl group, a trifluoroalkyl group, fluorine, chlorine and bromine; a phenylthio group unsubstituted or substituted with one or more substituents selected from among a $C_1$-$C_5$ alkyl group, fluorine, chlorine and bromine; or an O-including polycyclic heteroaryl group, and R, R' and R'' are each a $C_1$-$C_5$ alkyl group; a $C_2$-$C_5$ alkoxyalkyl group; a $C_8$-$C_{12}$ alkylaryl group; a benzyl group unsubstituted or substituted with $NO_2$; or a benzopyranyl group unsubstituted or substituted with =O, and when R' and R'' are each a $C_1$-$C_5$ alkyl group and a $C_2$-$C_5$ alkoxyalkyl group, R' and R'' may bond to each other to form an O-including hydrocarbon ring.

In one embodiment of the present specification, R1, R2, R5, R6, R8, R9, R12 and R13 are the same as or different from each other, and are each hydrogen; fluorine; chlorine; bromine; —CN; —$NO_2$; —CHO; —COOR; —(C=O)NR'R''; a methyl group; an ethyl group; a propyl group; a t-butyl group; —$CF_3$; a cyclopropyl group; a cyclopentyl group; a cyclohexyl group; a methylcyclohexyl group; a propylcyclohexyl group; a phenyl group unsubstituted or substituted with —CN, fluorine, a methyl group, an ethyl group, a propyl group, a t-butyl group or —$CF_3$; a phenoxy group substituted with a t-butyl group, —$CF_3$ or fluorine; a phenylthio group substituted with chlorine; or a dibenzofuranyl group, and R, R' and R'' are each a methyl group; an ethyl group; a methoxyethyl group; a t-butylphenyl group; a nitrobenzyl group; or a coumarin group, and by R' and R'' bonding to each other to form an O-including hydrocarbon ring, NR'R'' may become a morpholinyl group.

In one embodiment of the present specification, Chemical Formula 2-1 is any one of the following Chemical Formulae 2-1-1 to 2-1-8.

[Chemical Formula 2-1-1]

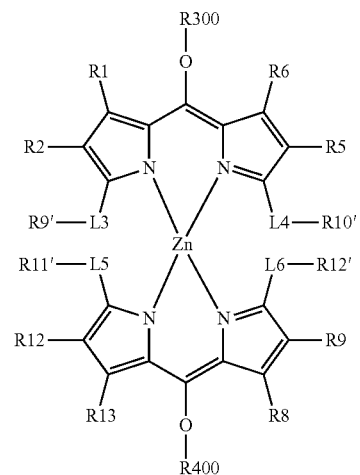

[Chemical Formula 2-1-2]
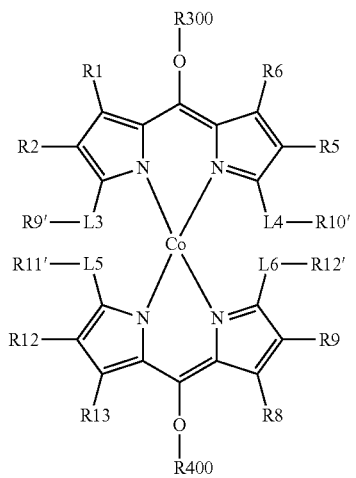
[Chemical Formula 2-1-3]
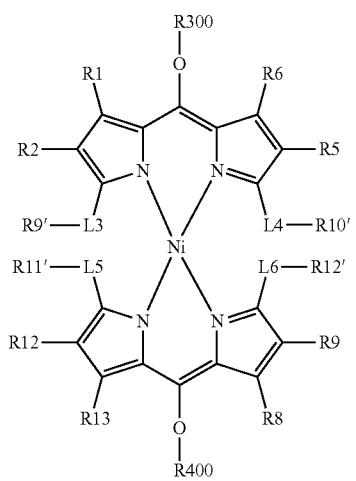
[Chemical Formula 2-1-4]
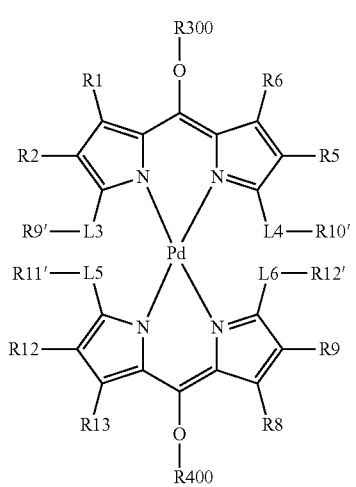
[Chemical Formula 2-1-5]
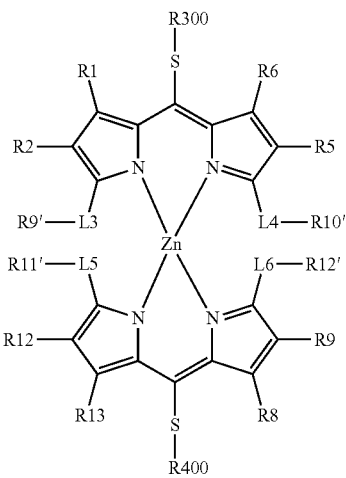
[Chemical Formula 2-1-6]
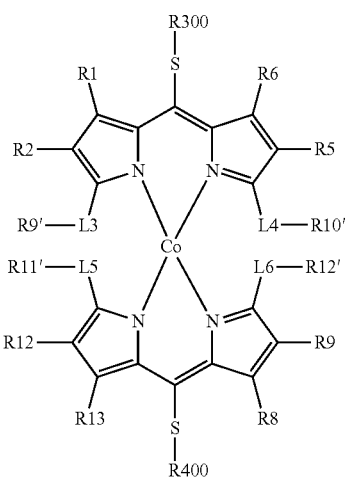
[Chemical Formula 2-1-7]
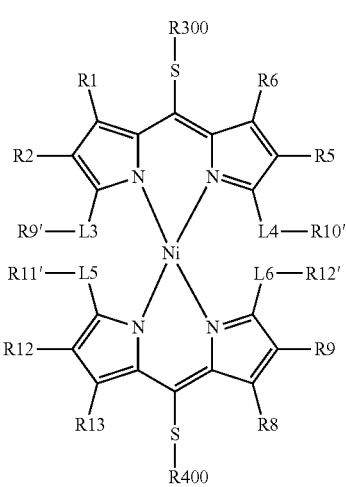

[Chemical Formula 2-1-8]

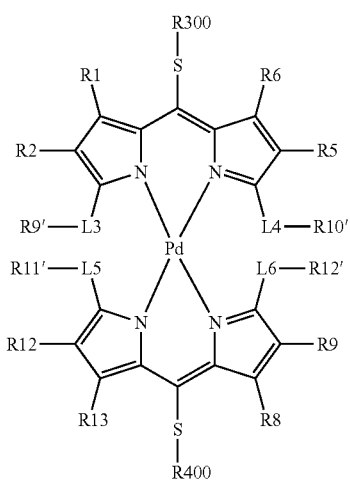

In Chemical Formulae 2-1-1 to 2-1-8, each substituent has the same definition as in Chemical Formula 2-1.

In one embodiment of the present specification, R9' to R12' are the same as or different from each other, and each independently an alkyl group unsubstituted or substituted with a halogen group; an aryl group unsubstituted or substituted with one or more substituents selected from among a nitrile group, a nitro group, a halogen group, an alkyl group and an alkoxy group; or a substituted or unsubstituted heteroaryl group including one or more of N and O.

In one embodiment of the present specification, R9' to R12' are each an alkyl group unsubstituted or substituted with fluorine.

In one embodiment of the present specification, R9' to R12' are each a hexafluoropropanyl group.

In one embodiment of the present specification, R9' to R12' are each a perfluoroalkyl group.

In one embodiment of the present specification, R9' to R12' are each a perfluoroethyl group.

In one embodiment of the present specification, R9' to R12' are each a phenyl group unsubstituted or substituted with one or more substituents selected from among a nitrile group, a nitro group, a halogen group, a $C_1$-$C_{10}$ alkyl group, a $C_1$-$C_{10}$ fluoroalkyl group and a $C_1$-$C_{10}$ alkoxy group.

In one embodiment of the present specification, R9' to R12' are each a phenyl group unsubstituted or substituted with one or more substituents selected from among —CN, —$NO_2$, fluorine, chlorine, a methyl group, a t-butyl group, —$CF_3$ and a methoxy group.

In one embodiment of the present specification, R9' to R12' are each an N- or O-including heteroaryl group unsubstituted or substituted with =O.

In one embodiment of the present specification, R9' to R12' are each an N-including monocyclic or polycyclic heteroaryl group; an O-including monocyclic or polycyclic heteroaryl group unsubstituted or substituted with =O.

In one embodiment of the present specification, R9' to R12' are each an N-including monocyclic heteroaryl group; an O-including polycyclic heteroaryl group; or a benzopyranyl group unsubstituted or substituted with =O.

In one embodiment of the present specification, R9' to R12' are each a pyridinyl group, a dibenzofuranyl group, a coumarin group or a chromone group.

In one embodiment of the present specification, R300 and R400 are the same as or different from each other, and each independently an aryl group unsubstituted or substituted with one or more substituents selected from among a nitrile group, a halogen group, an alkyl group, an alkoxy group, an aryl group and an alkoxyaryl group; or a substituted or unsubstituted heteroaryl group including one or more of N and O.

In one embodiment of the present specification, R300 and R400 are each a phenyl group unsubstituted or substituted with one or more substituents selected from among a nitrile group, a halogen group, a $C_1$-$C_{10}$ alkyl group, a $C_1$-$C_{10}$ alkoxy group, a $C_6$-$C_{10}$ aryl group and a $C_7$-$C_{15}$ alkoxyaryl group.

In one embodiment of the present specification, R300 and R400 are each a phenyl group unsubstituted or substituted with one or more substituents selected from among —CN, chlorine, fluorine, a methyl group, an ethyl group, a propyl group, a t-butyl group, a methoxy group, a phenyl group and a methoxyphenyl group.

In one embodiment of the present specification, R300 and R400 are each a naphthyl group.

In one embodiment of the present specification, R300 and R400 are each an N- or O-including heteroaryl group unsubstituted or substituted with =O.

In one embodiment of the present specification, R300 and R400 are each an N-including polycyclic heteroaryl group; or a benzopyranyl group unsubstituted or substituted with =O.

In one embodiment of the present specification, R300 and R400 are each a carbazole group, a coumarin group or a chromone group.

In one embodiment of the present specification, the compound represented by Chemical Formula 1 may be represented by any one of the following compounds.

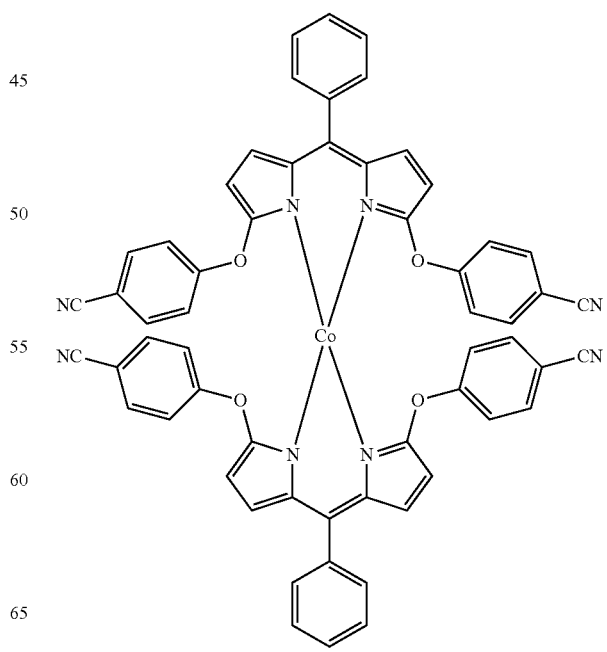

29
-continued
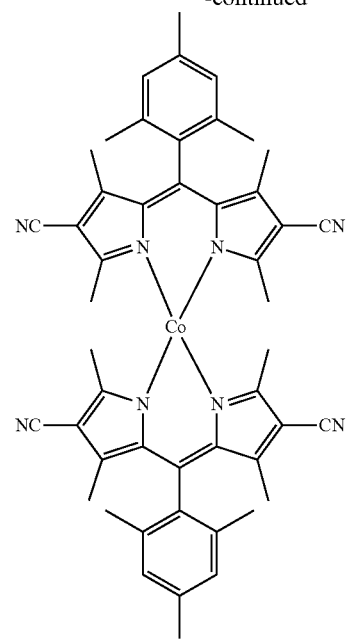
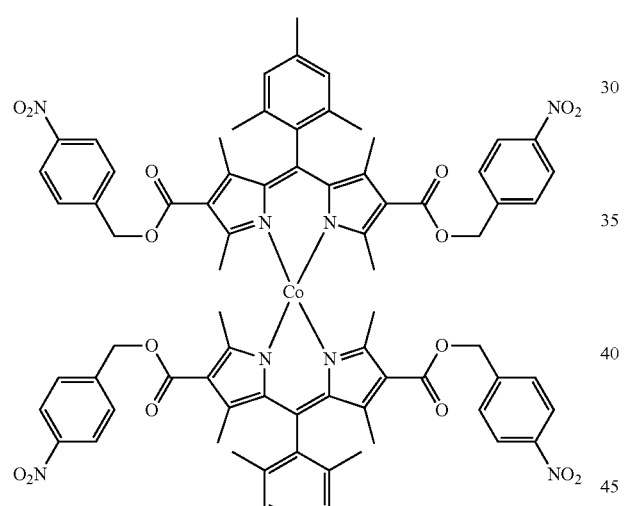
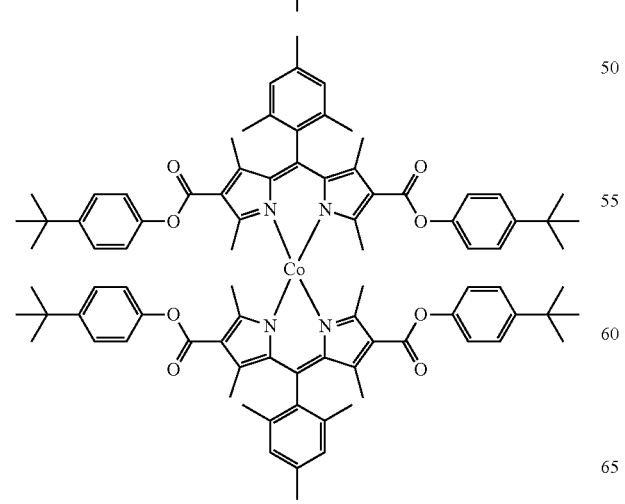
30
-continued
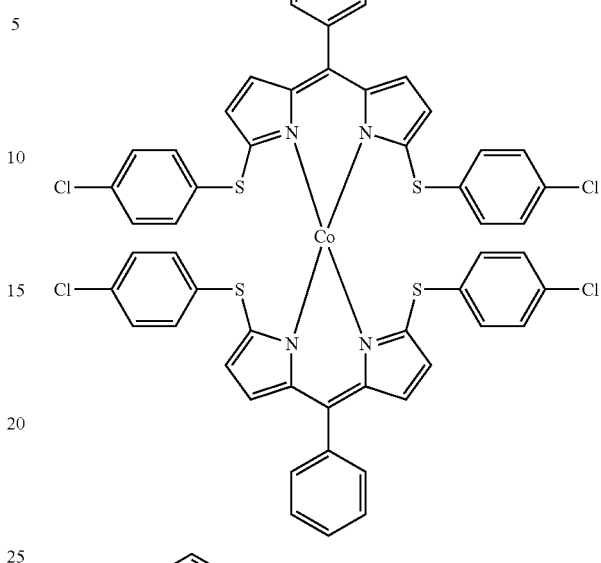
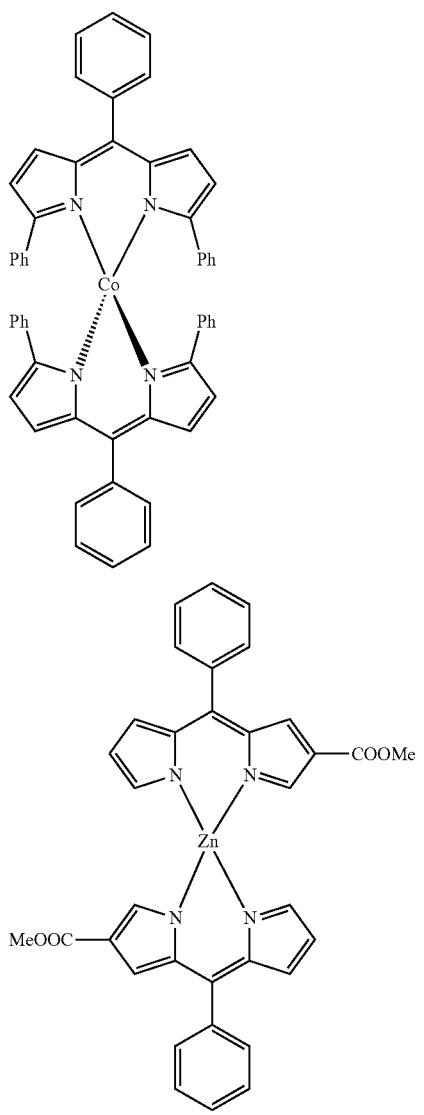

31
-continued
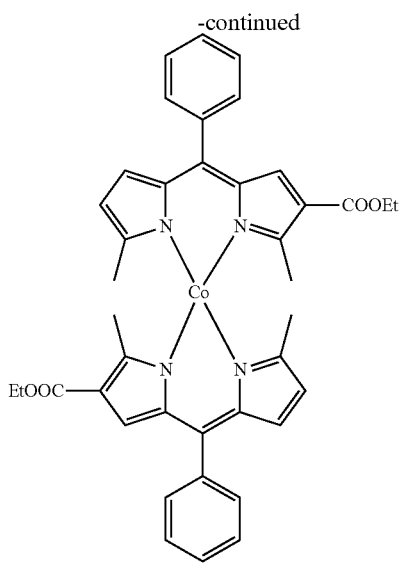
32
-continued
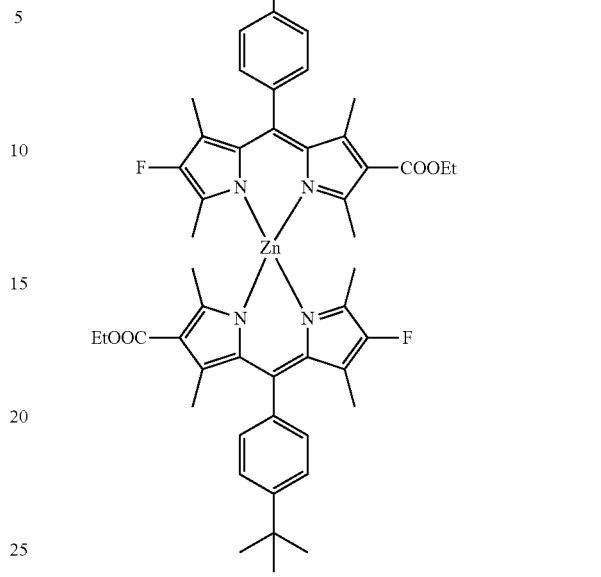
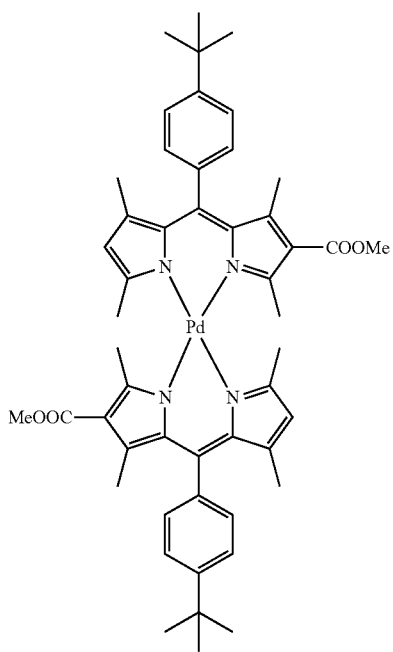
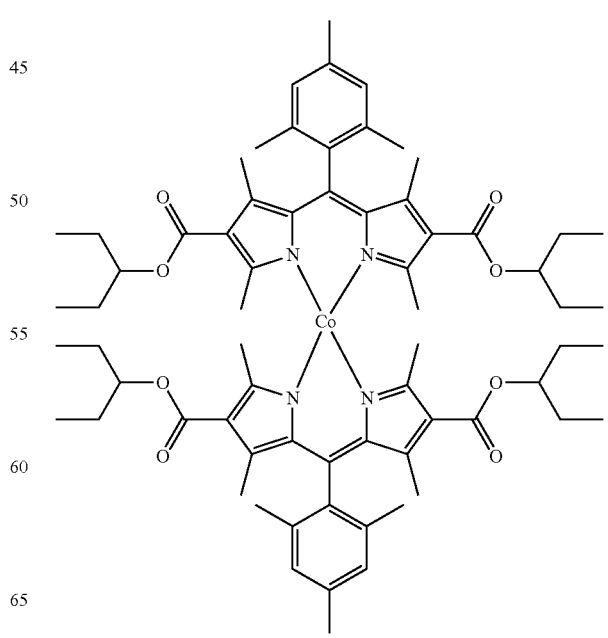

33
-continued
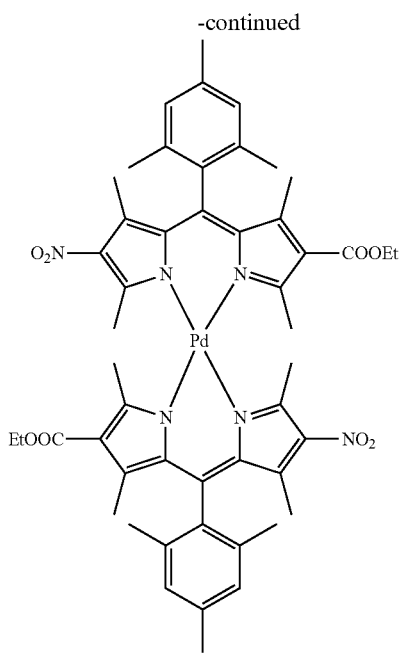
34
-continued
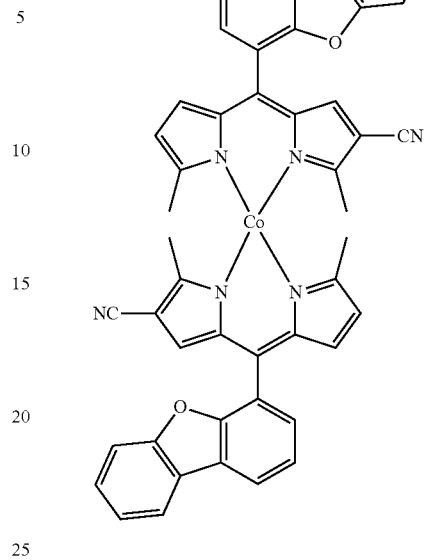
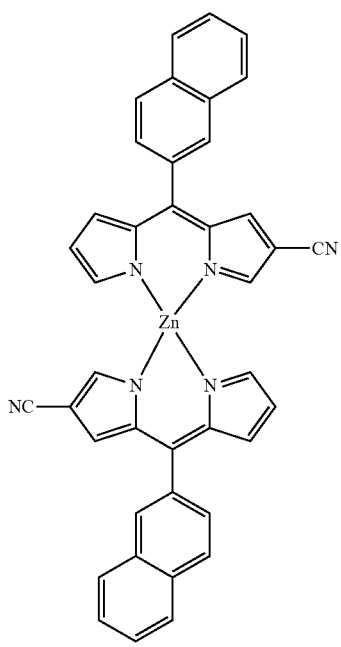
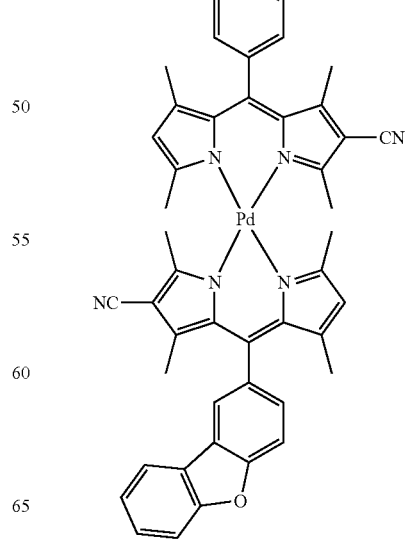

35
-continued
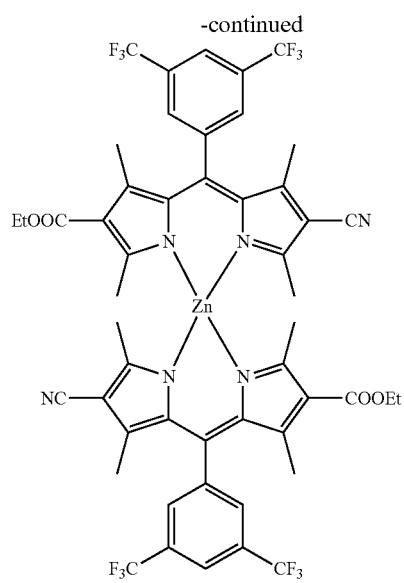
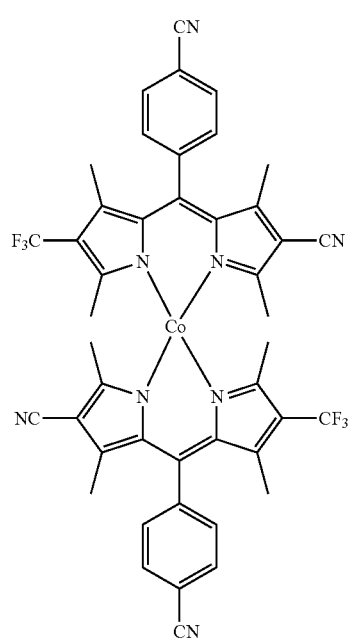
36
-continued
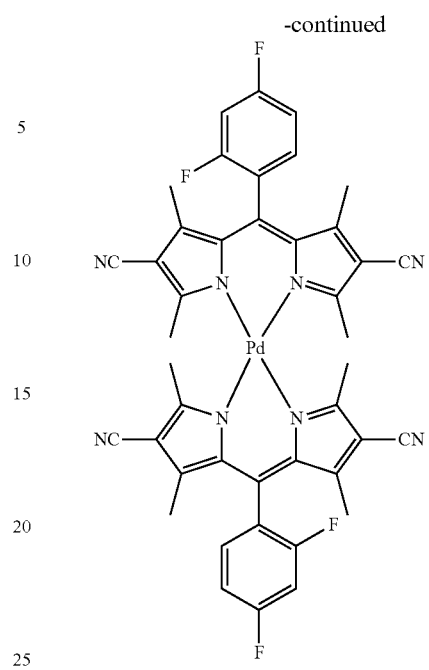
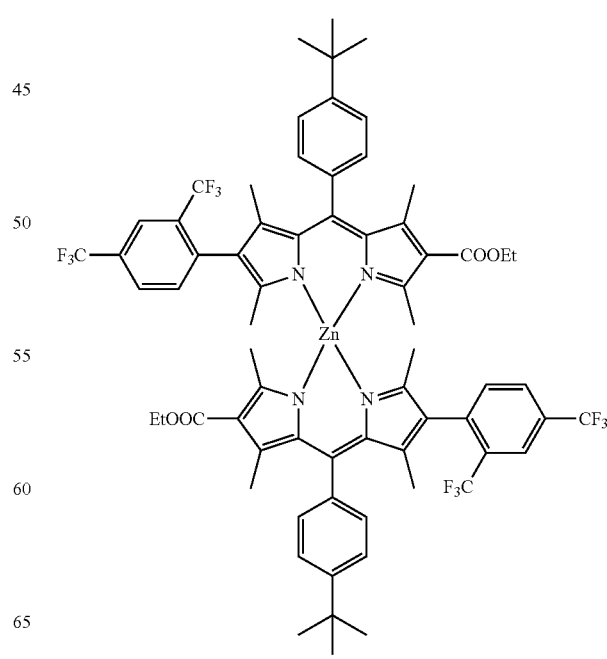

37
-continued
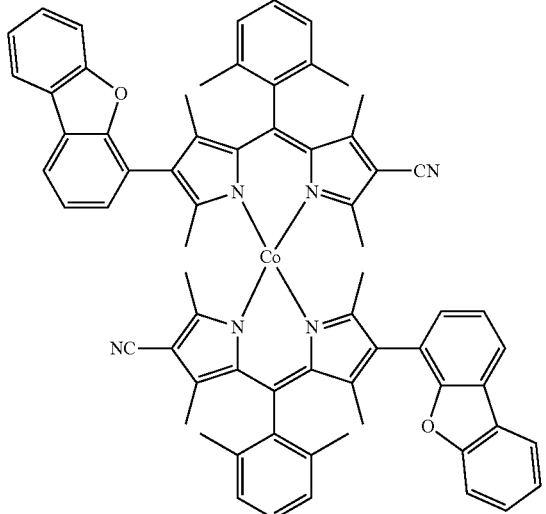
38
-continued
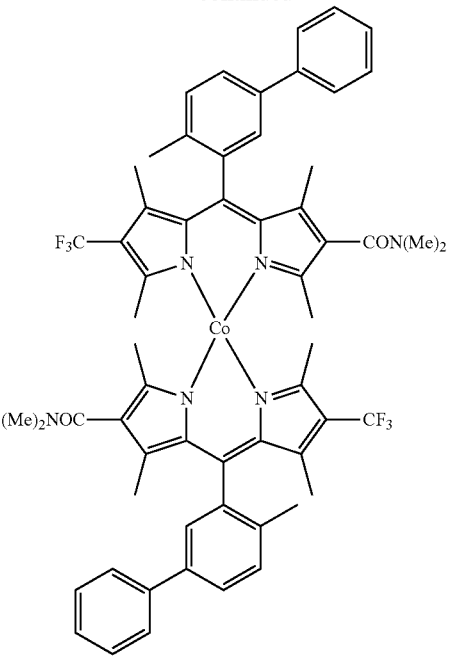
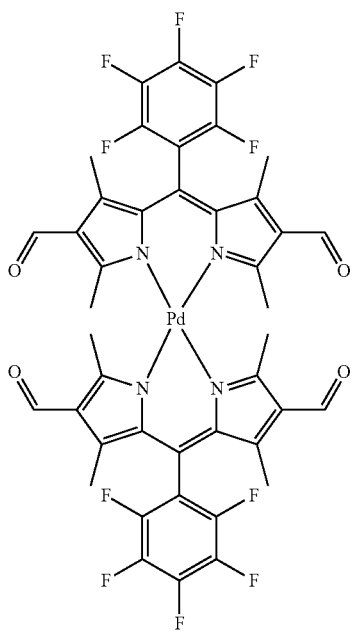

39
-continued
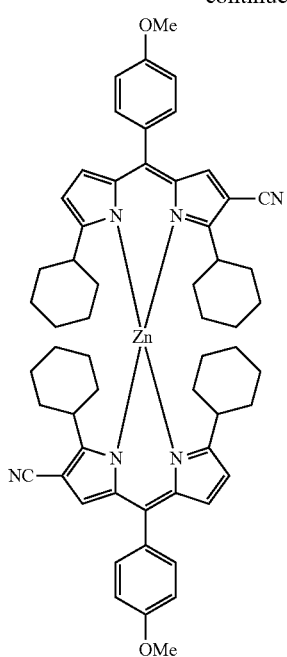
40
-continued
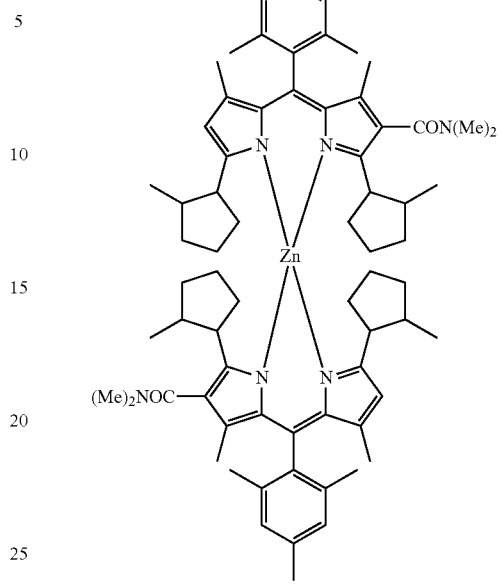
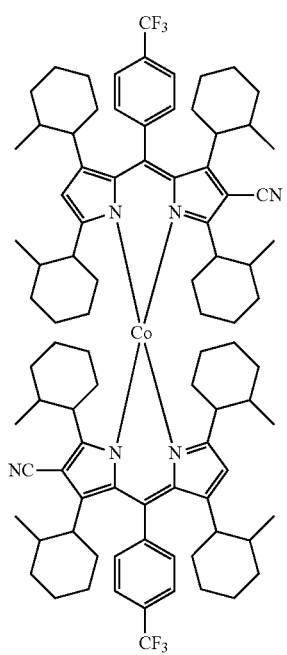
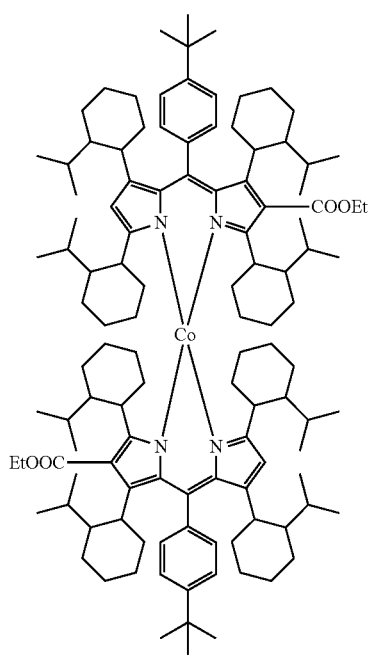

41
-continued
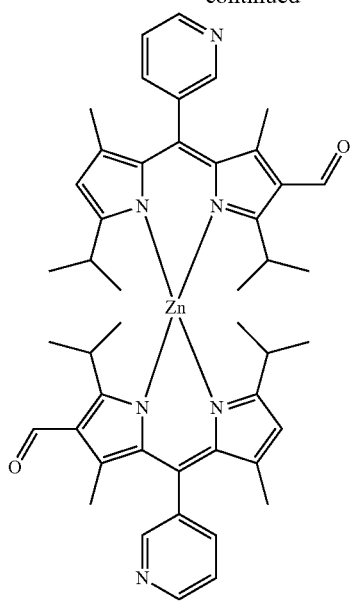
42
-continued
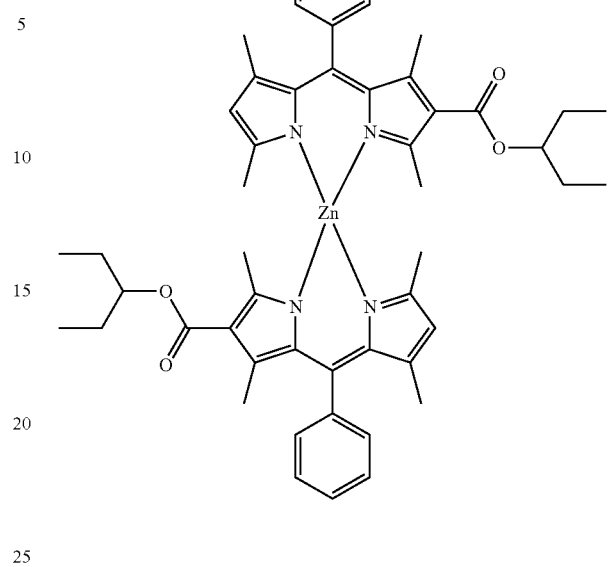
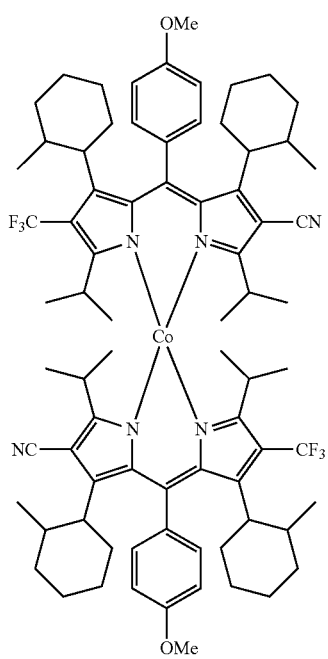
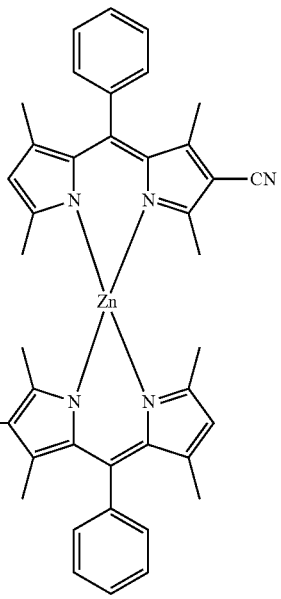

43
-continued
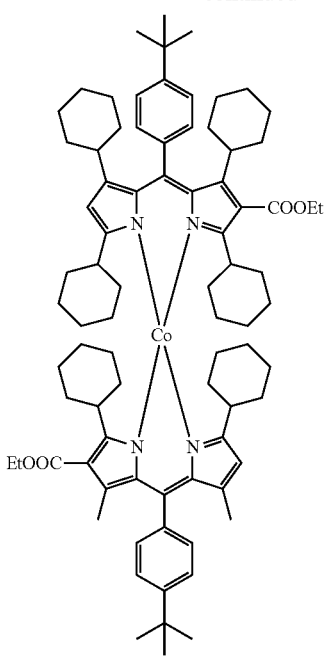
44
-continued
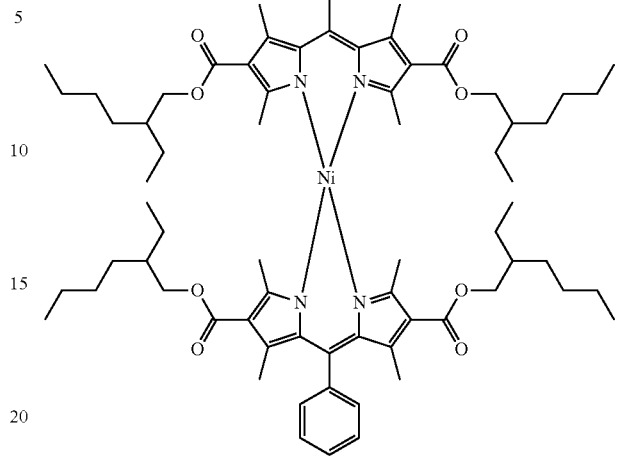
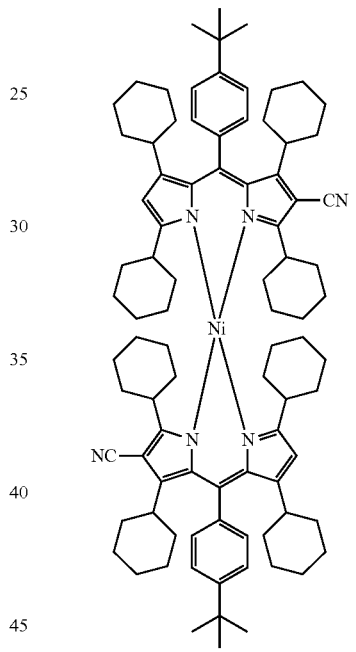
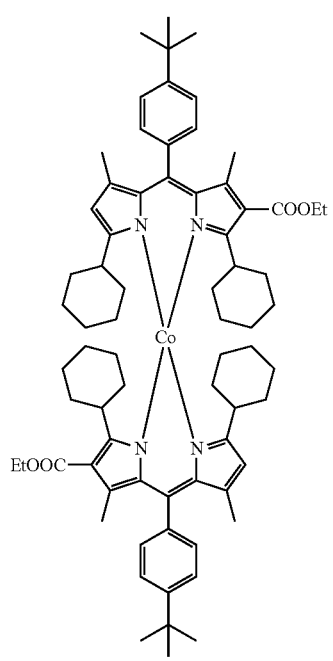

45
-continued
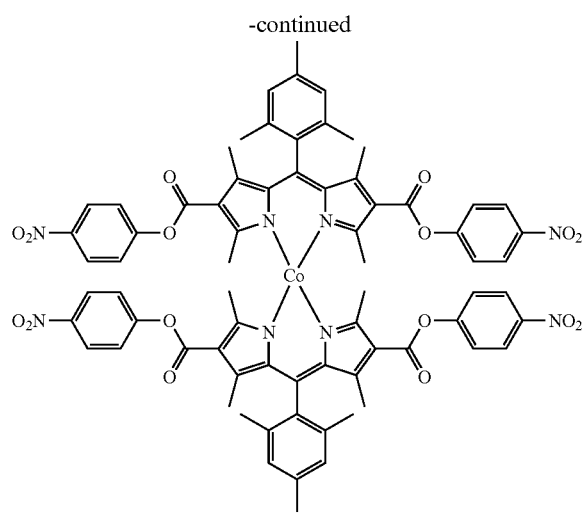
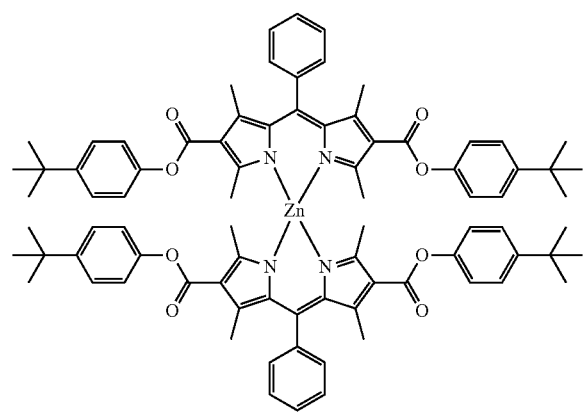
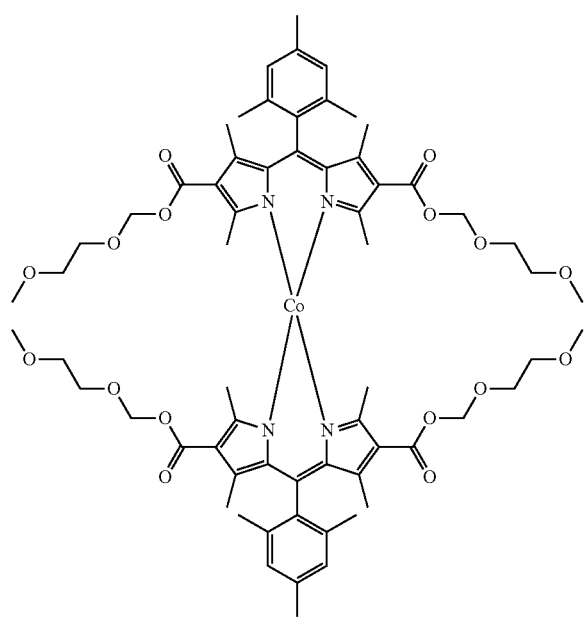
46
-continued
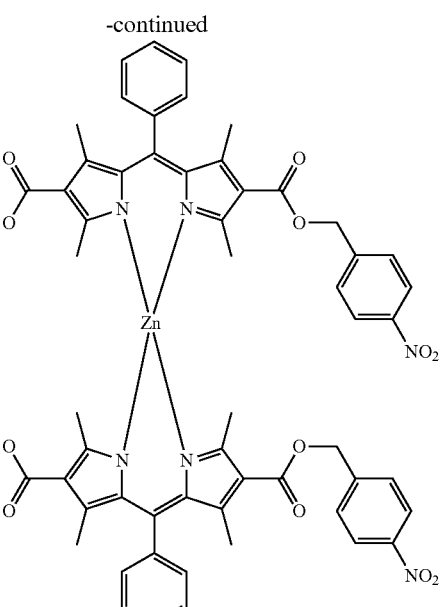
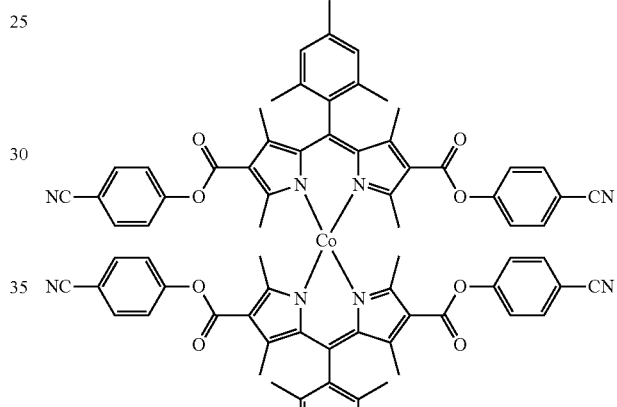
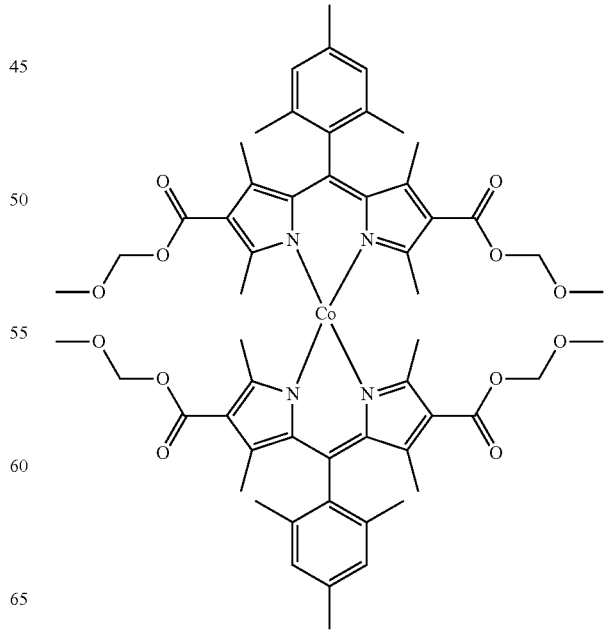

47
-continued
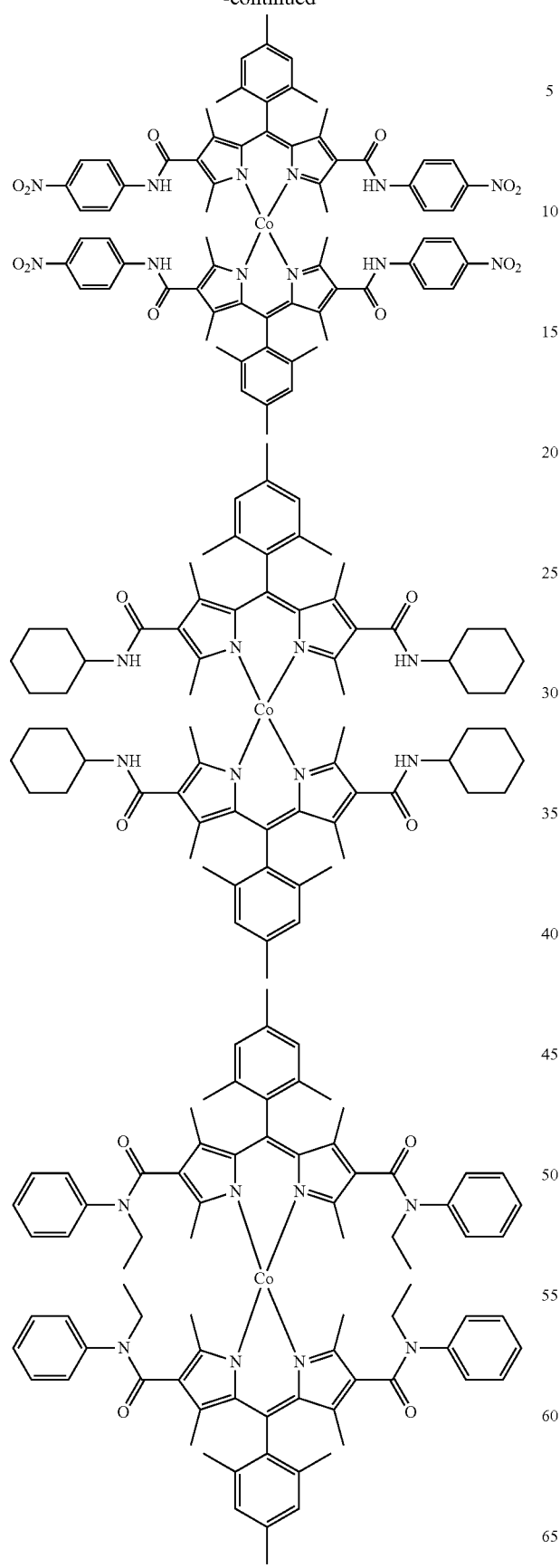
48
-continued
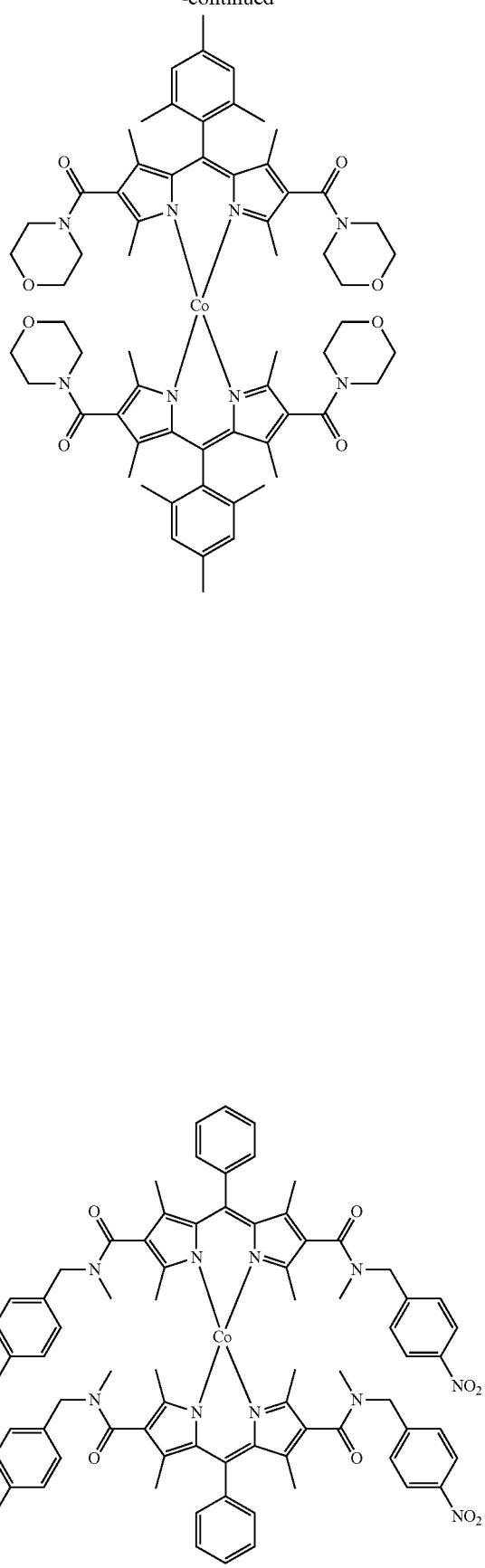

49
-continued
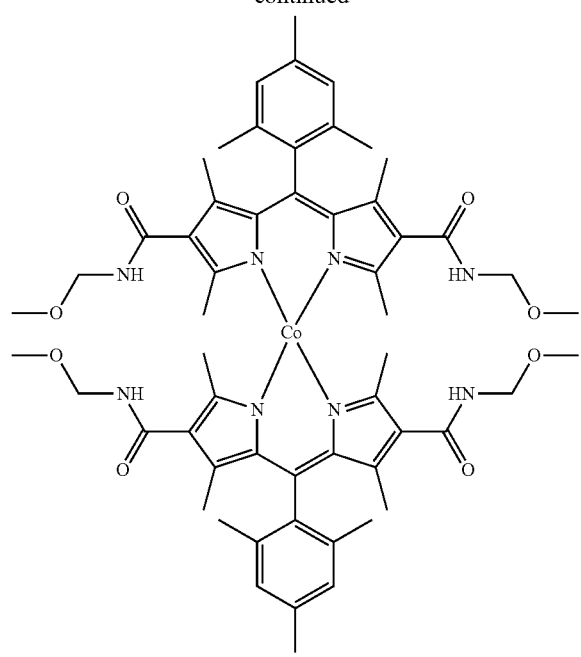
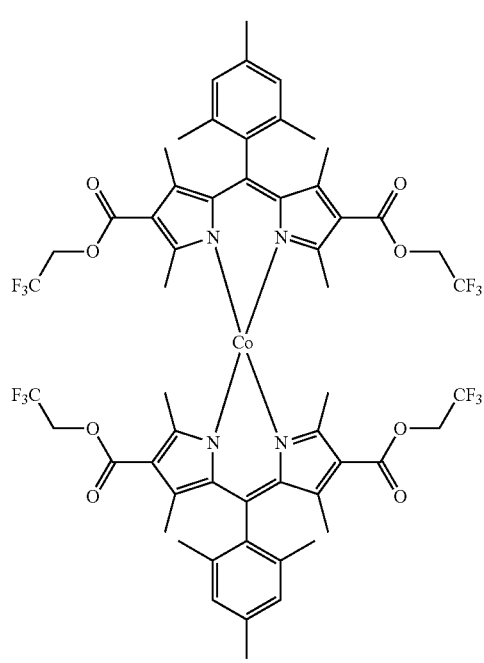
50
-continued
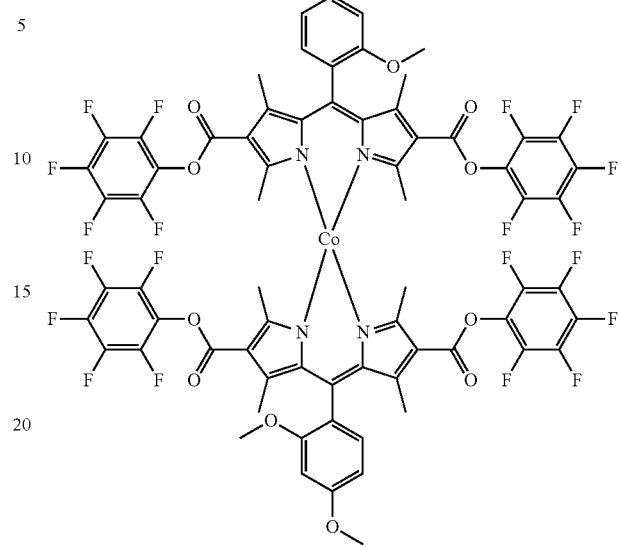
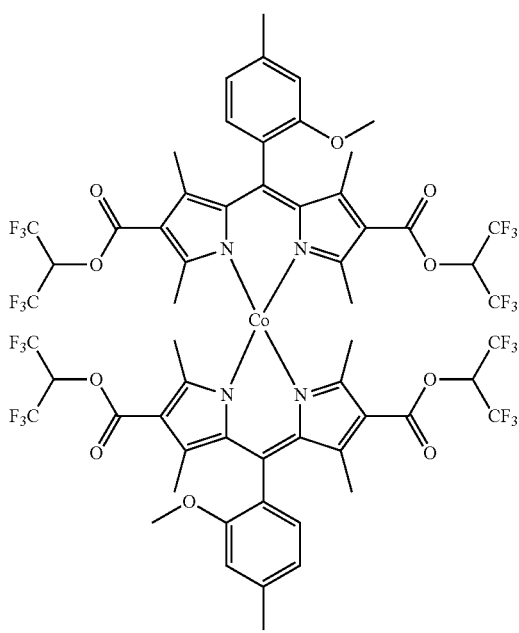

51
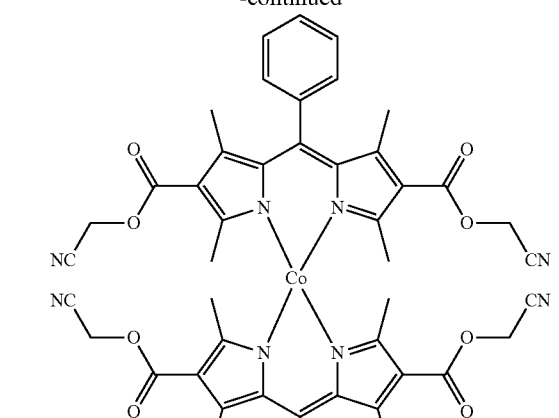
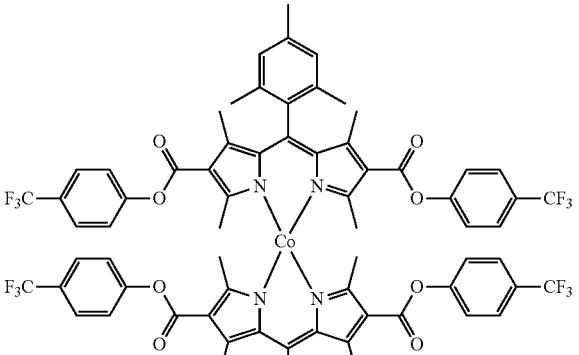
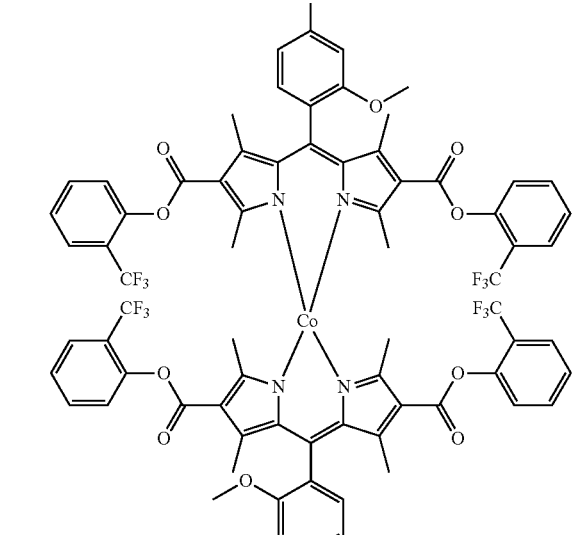
52
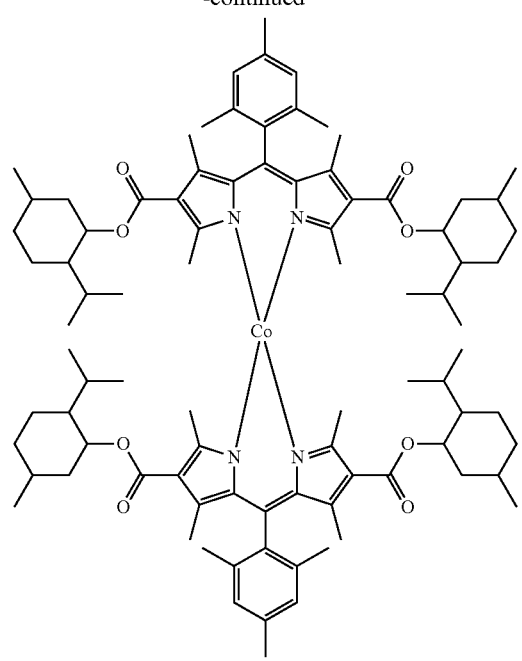
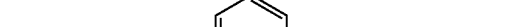

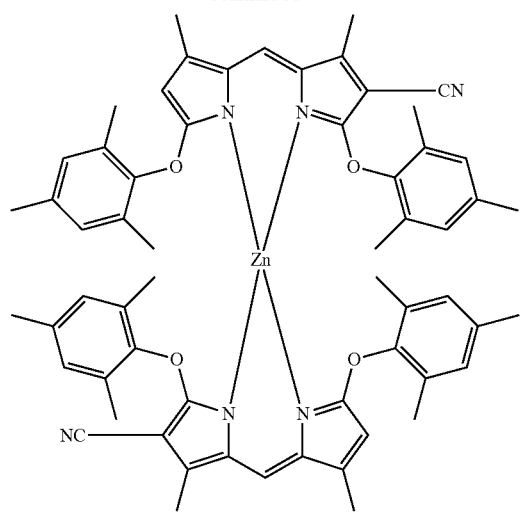
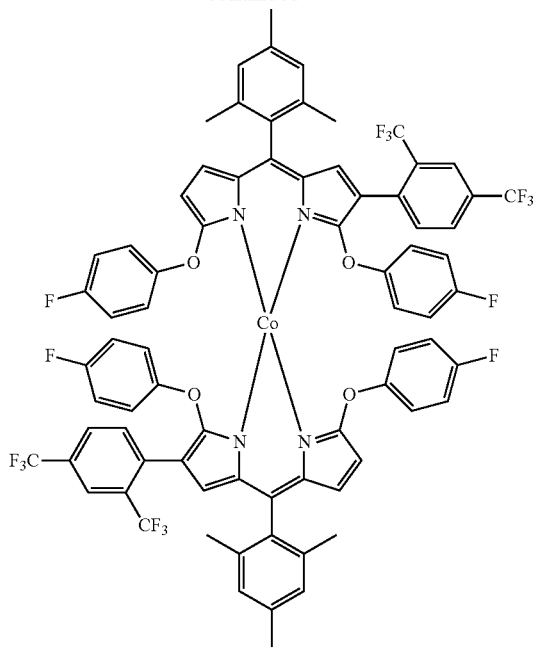
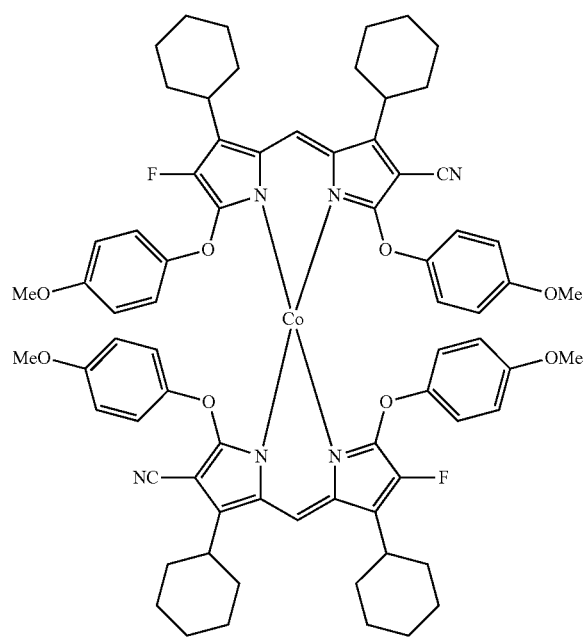
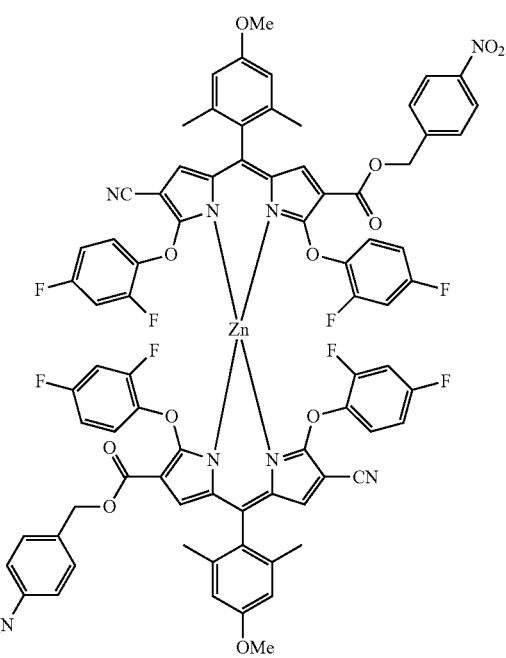

55
-continued
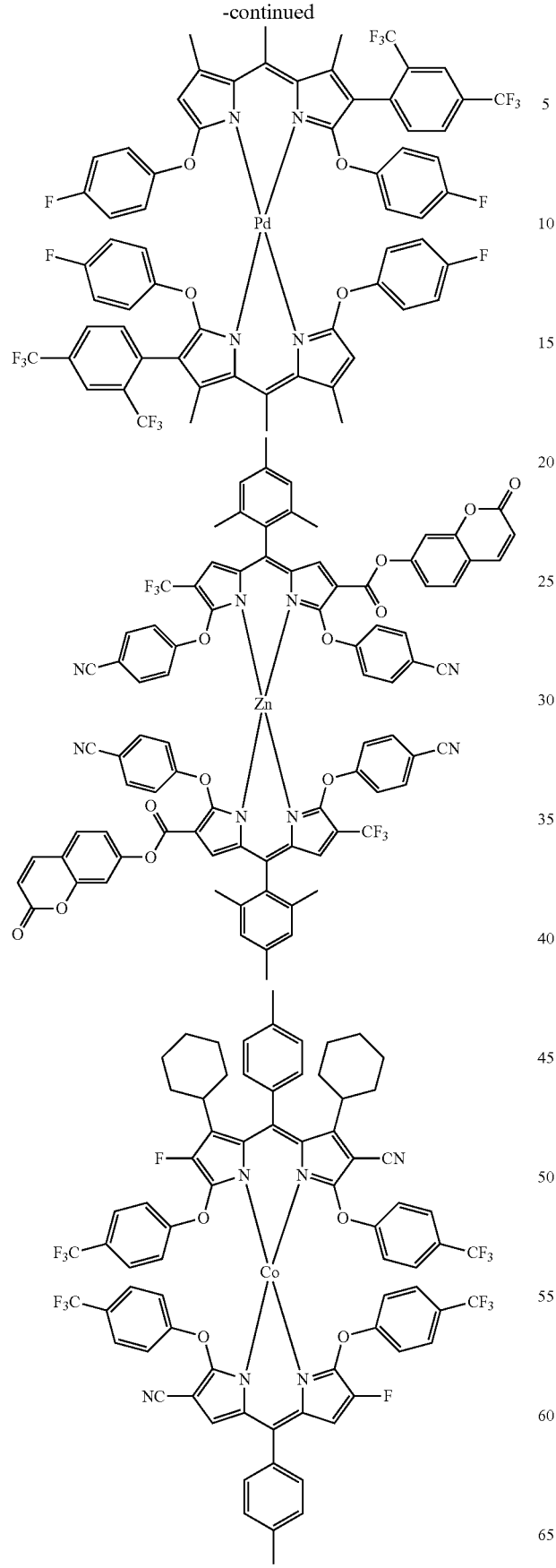
56
-continued
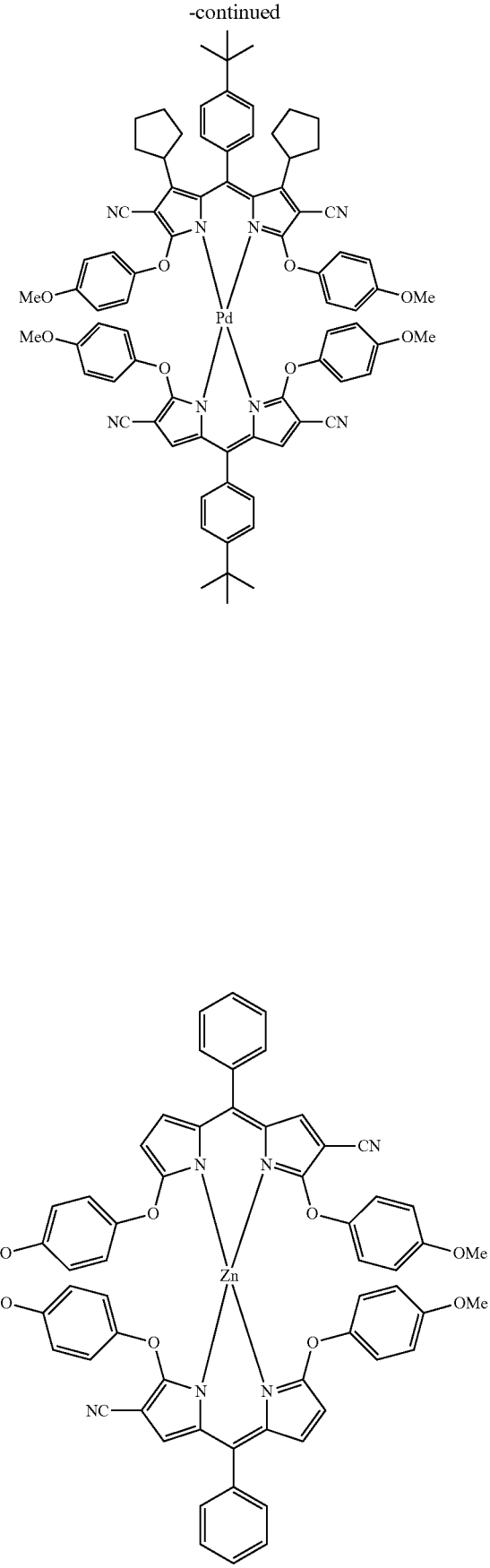

57
-continued
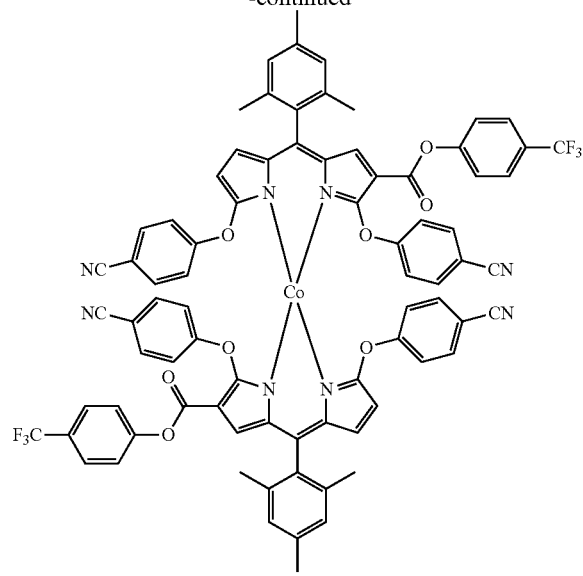
58
-continued
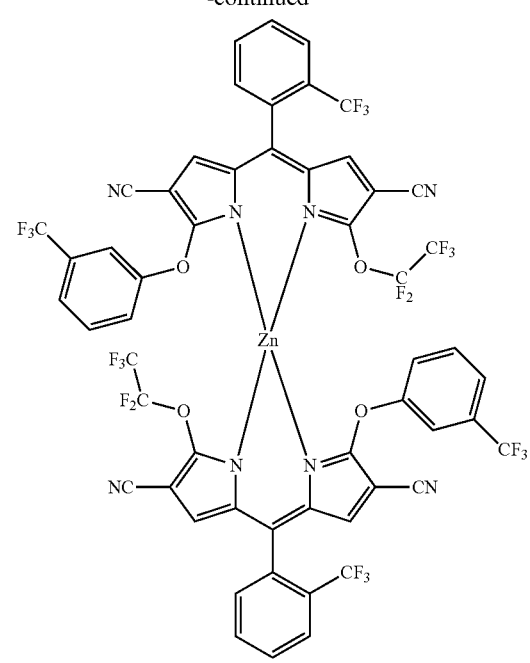
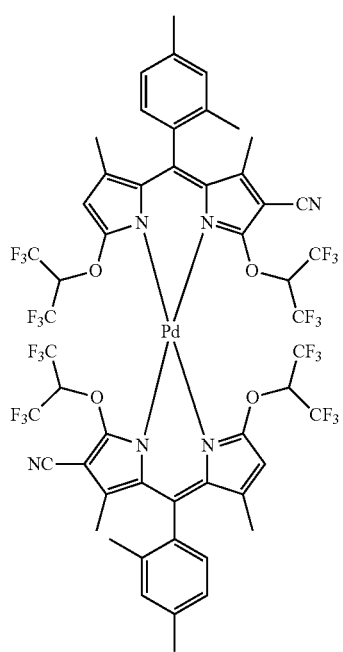
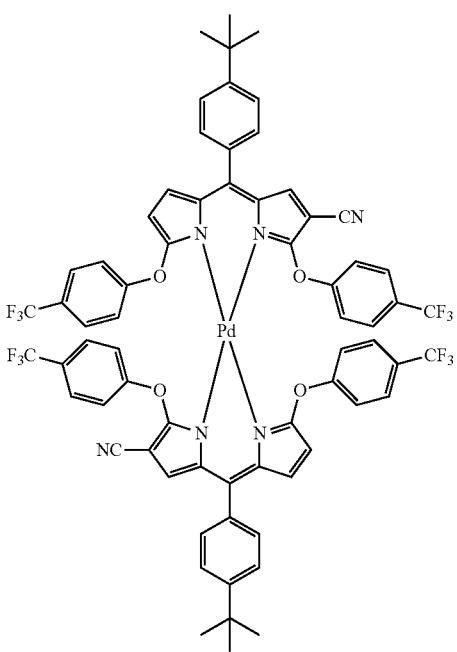

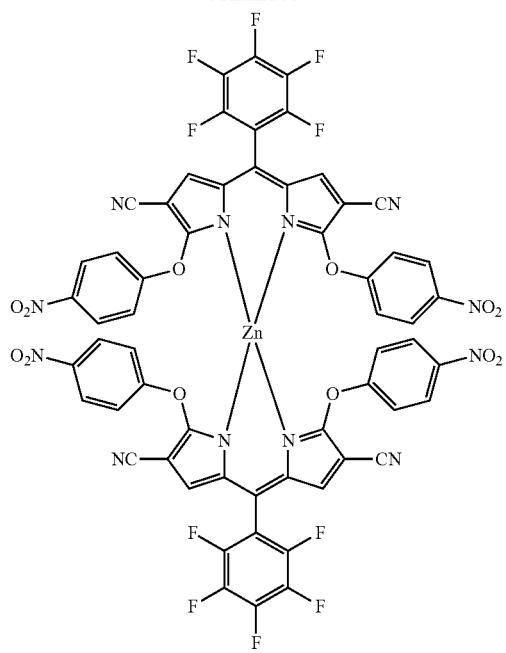
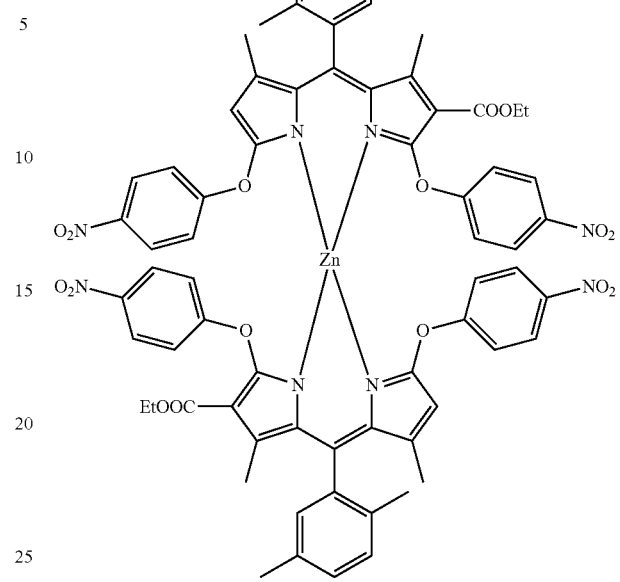
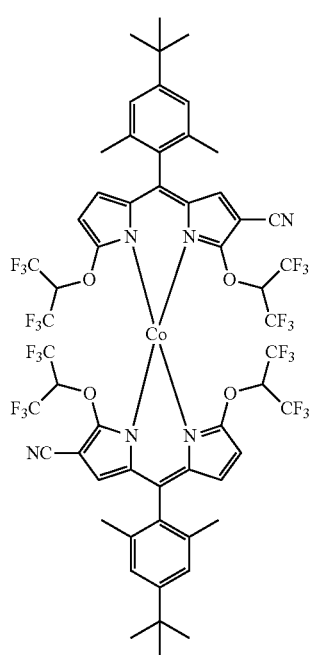
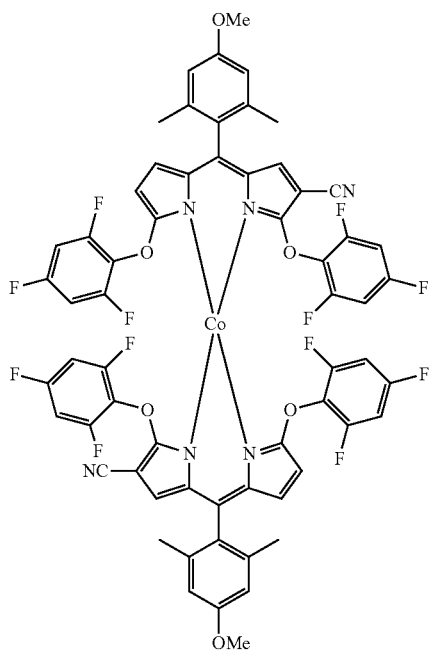

-continued
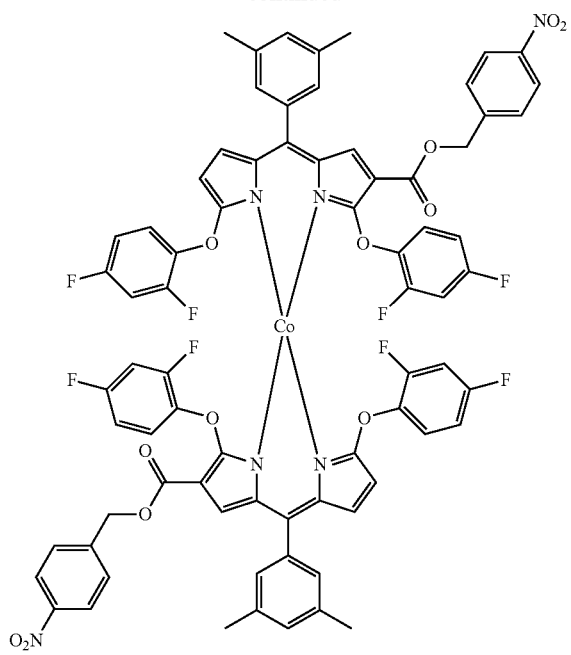
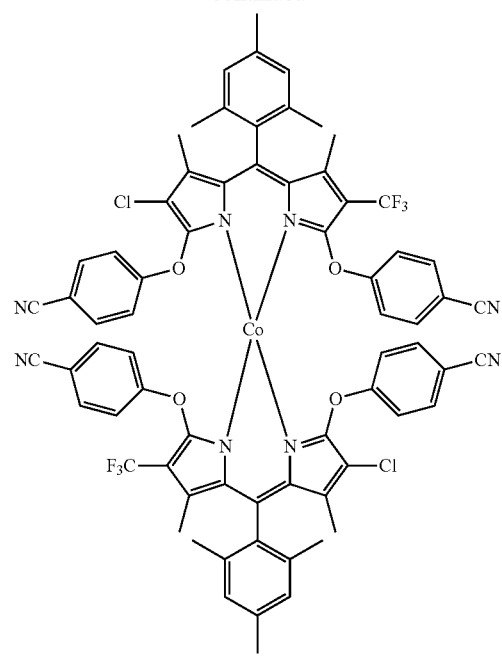
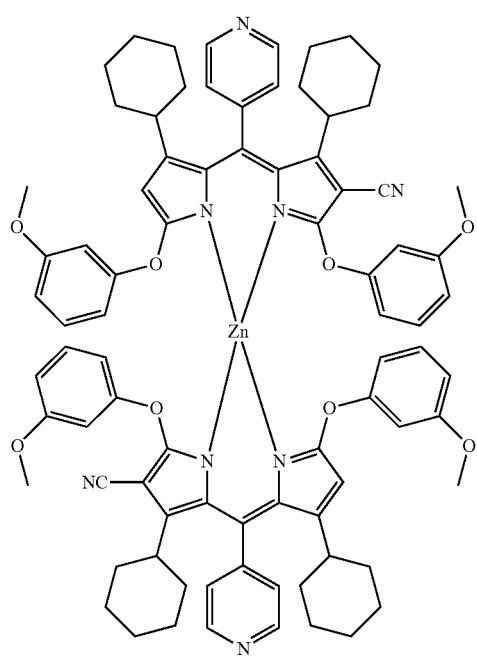
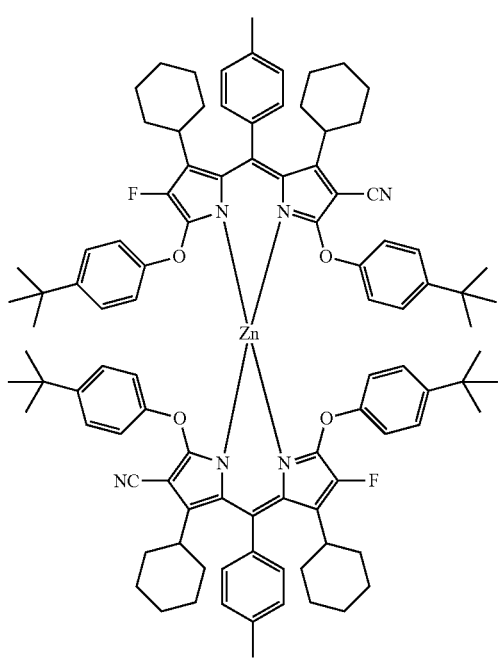

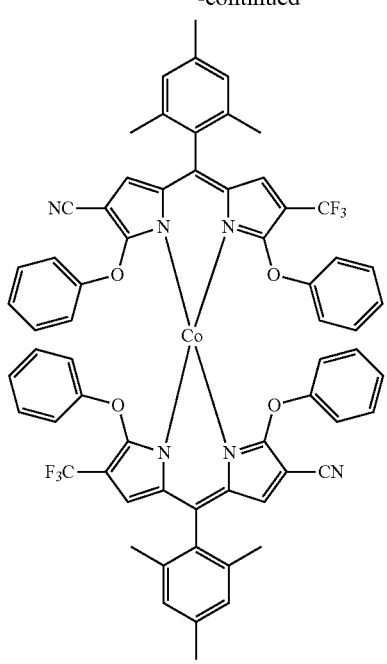
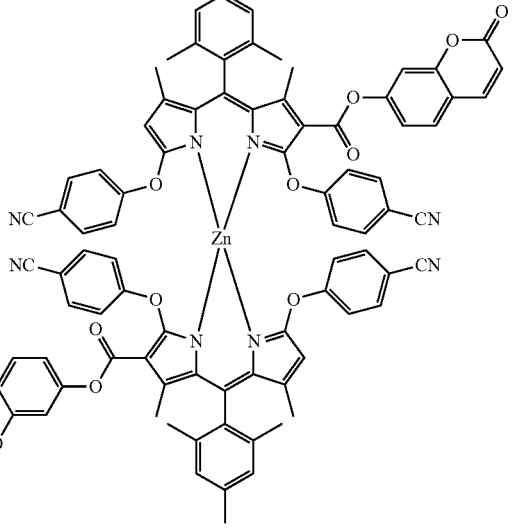
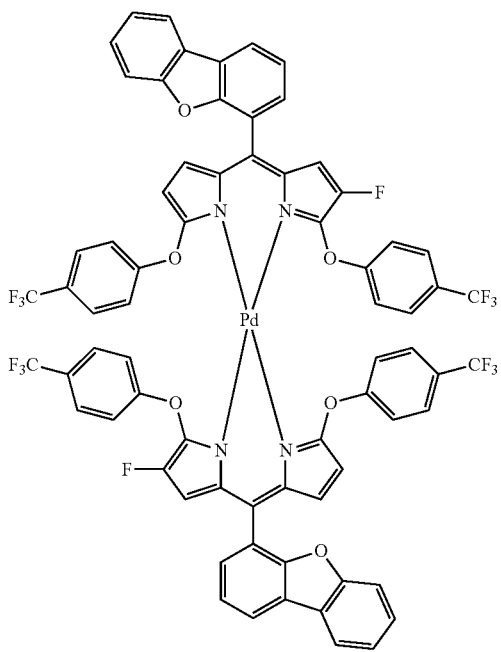
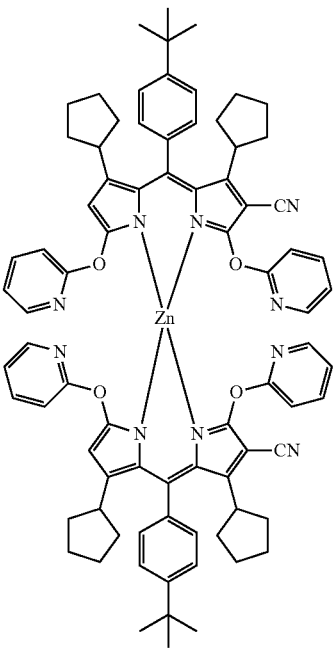

65
-continued
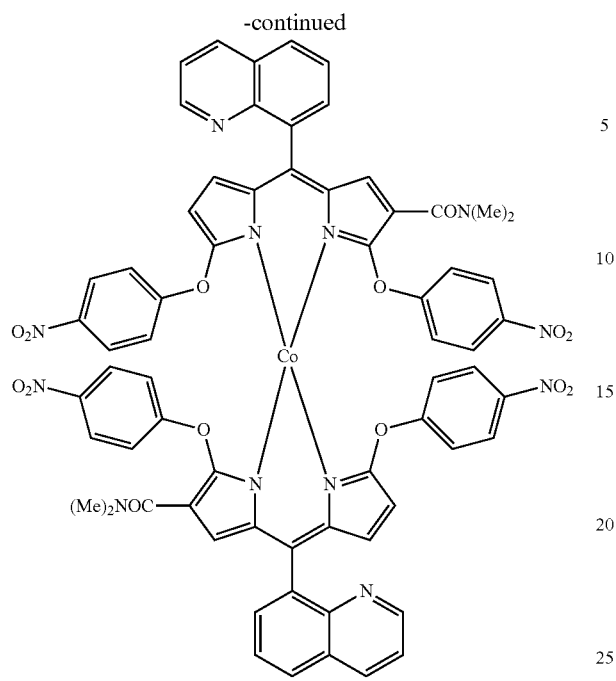
66
-continued
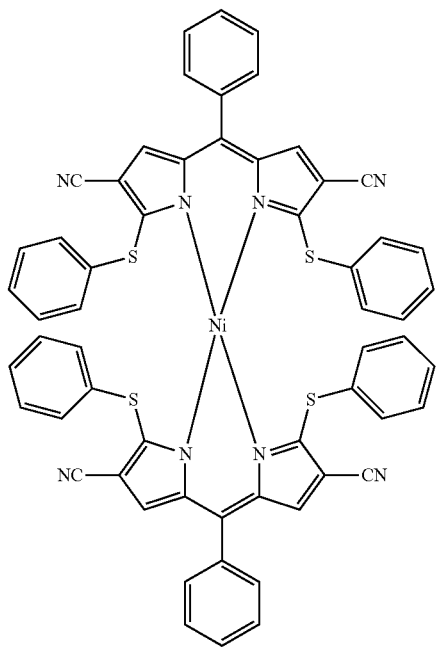
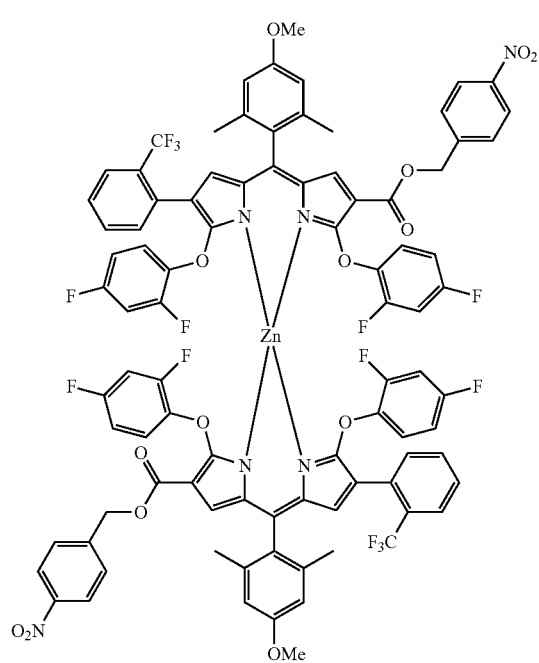
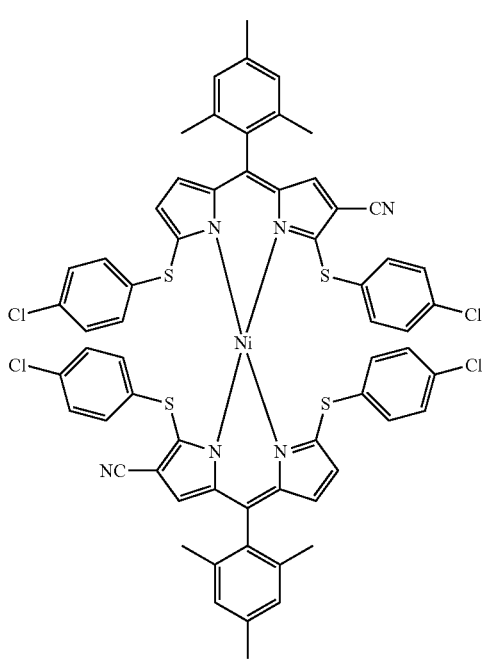

67
-continued
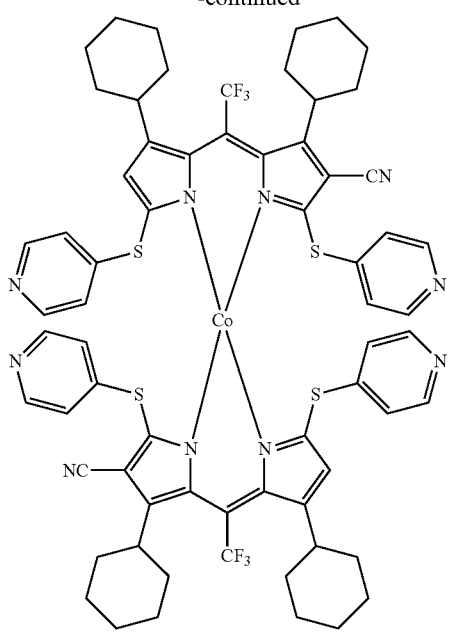
68
-continued
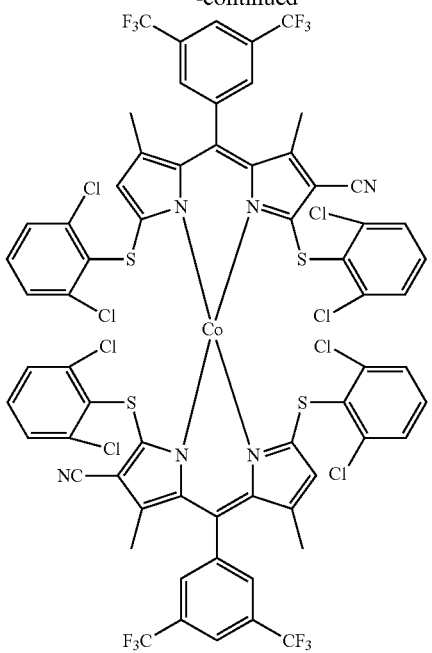
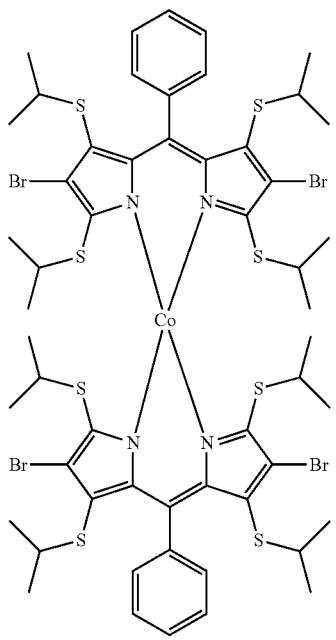

69
-continued
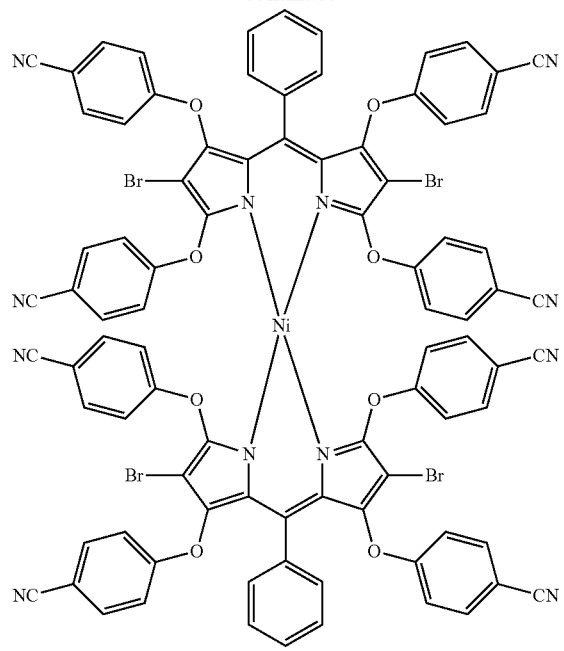
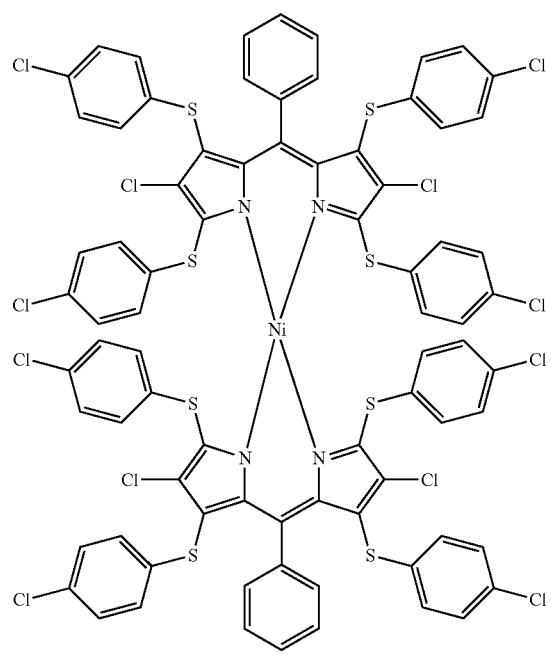
70
-continued
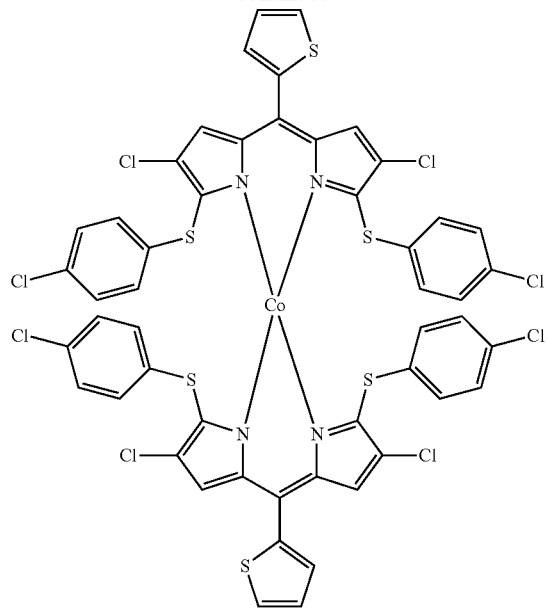
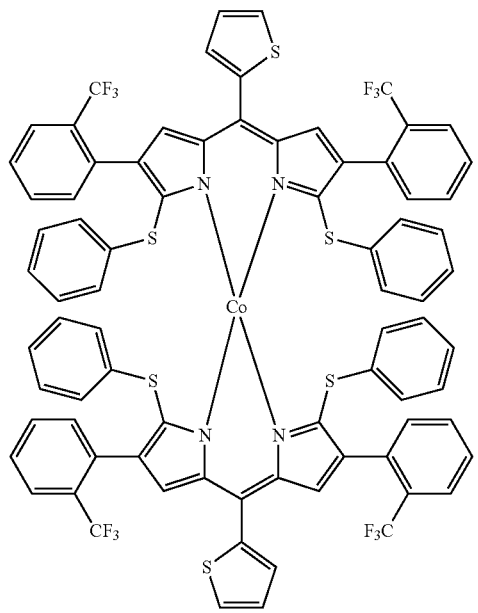

71
-continued
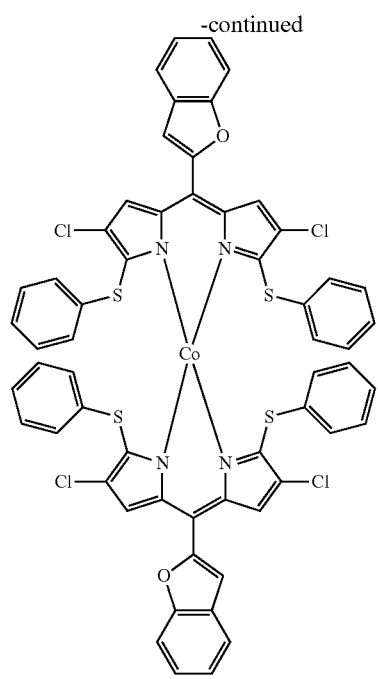
72
-continued
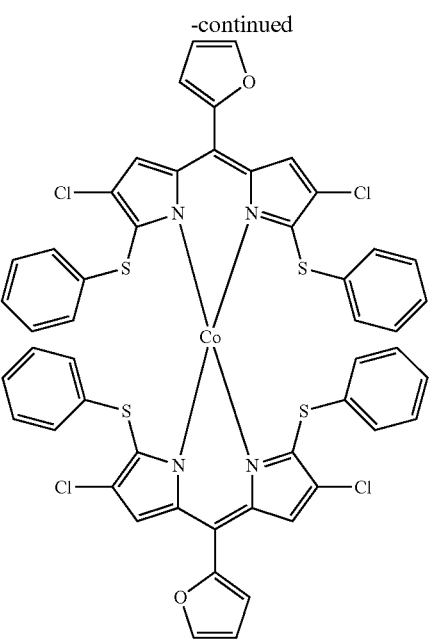
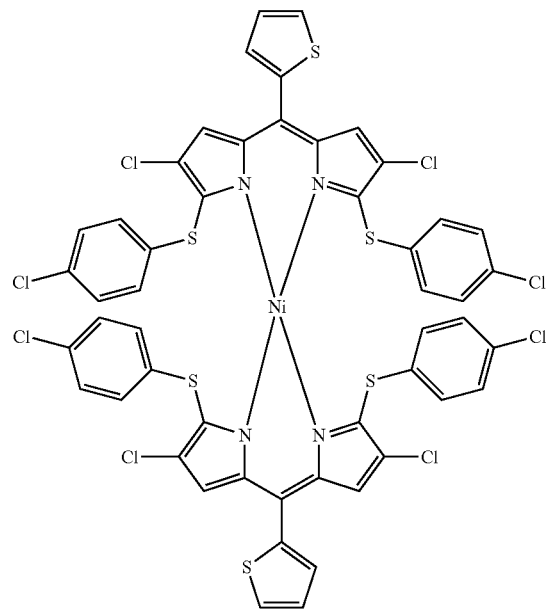
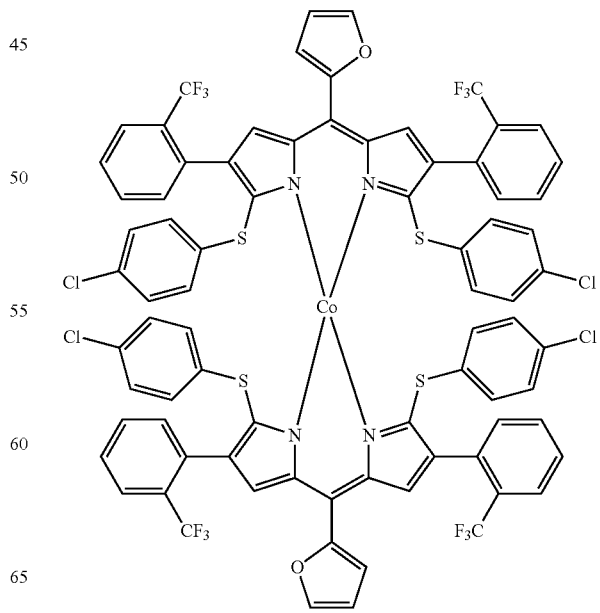

73
-continued
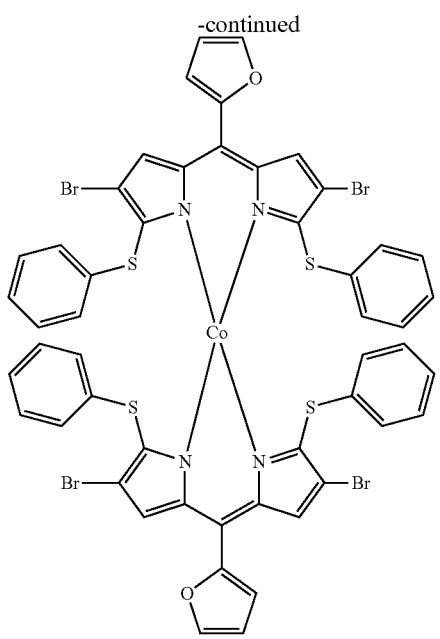
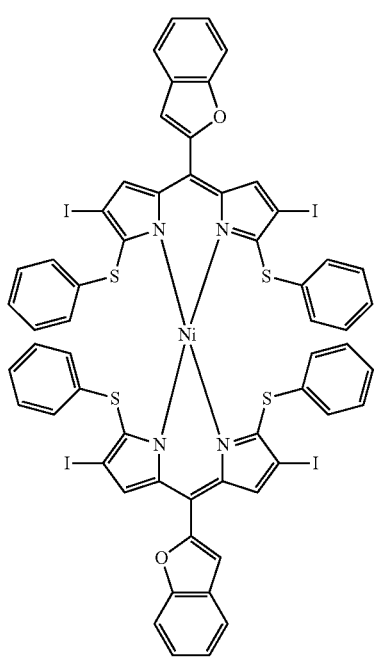
74
-continued
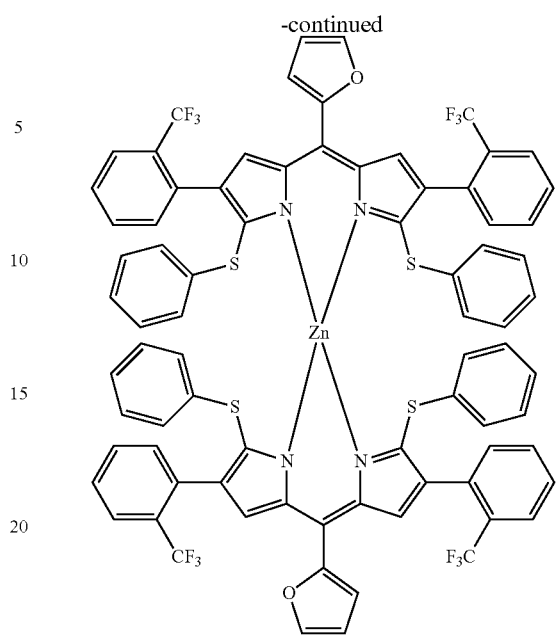
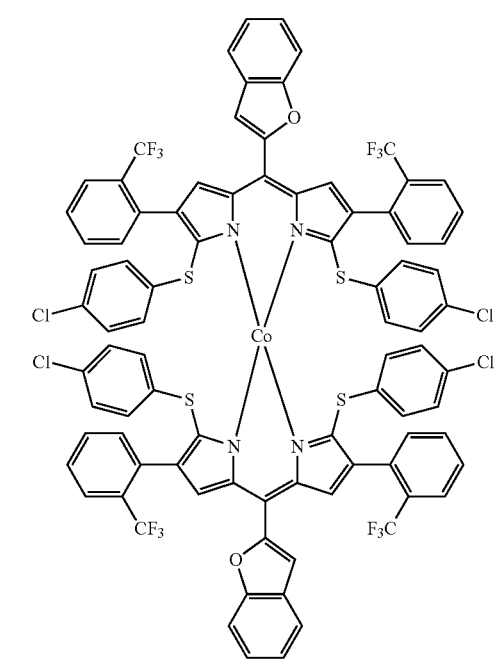

75

-continued

76

-continued

77
-continued
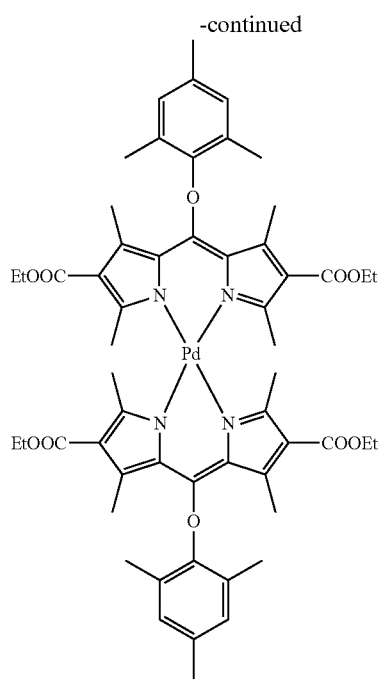
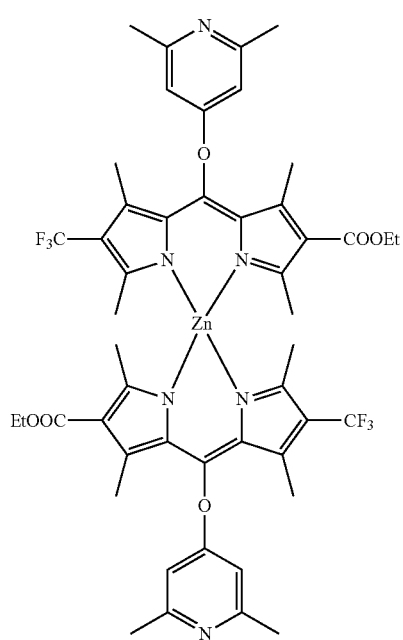
78
-continued
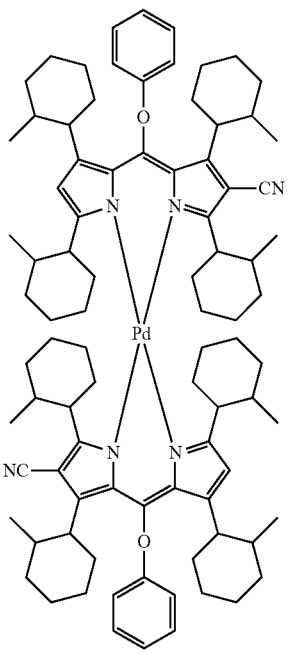
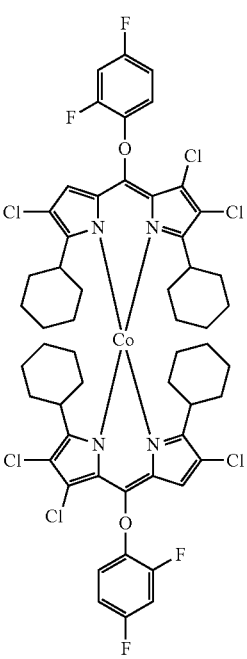

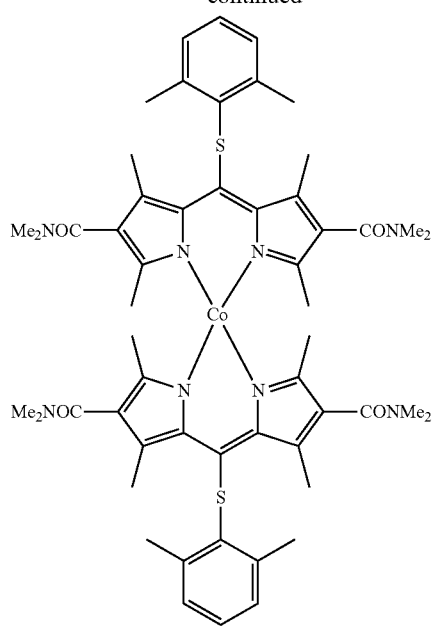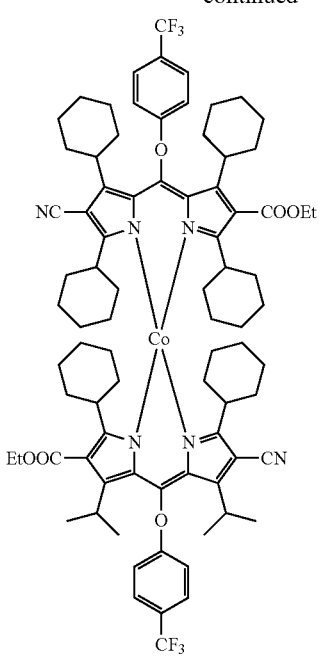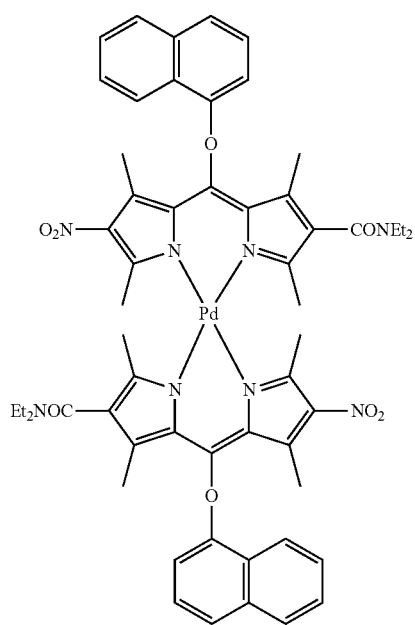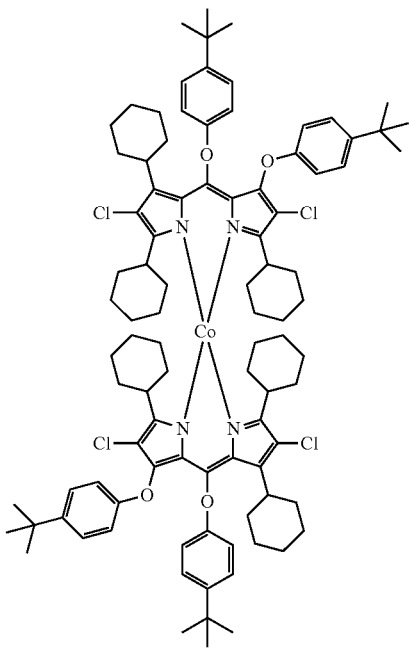

-continued
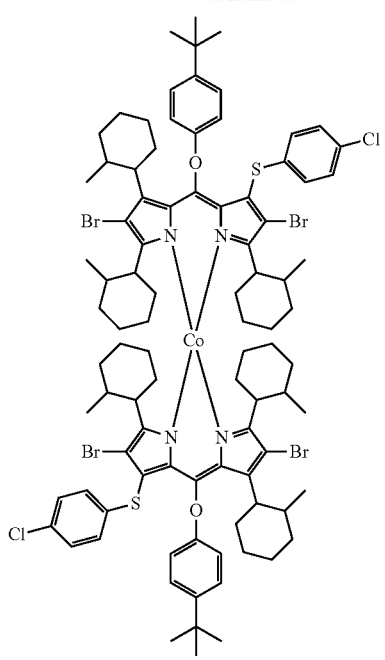
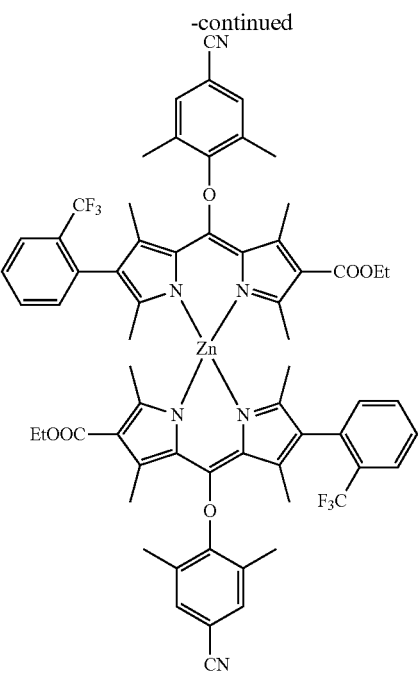
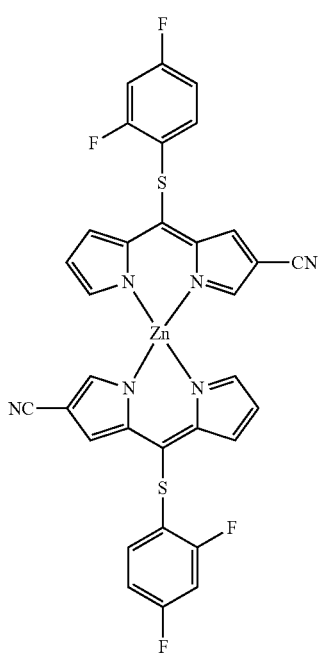
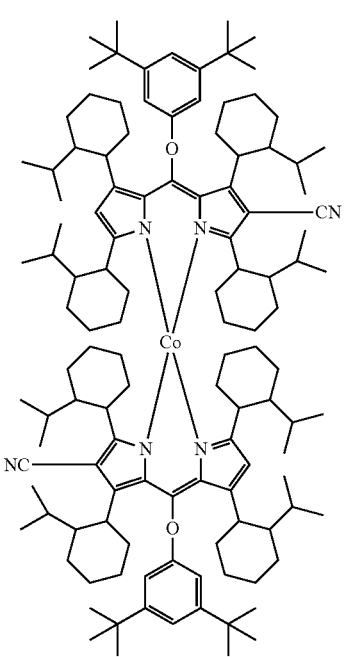

83
-continued
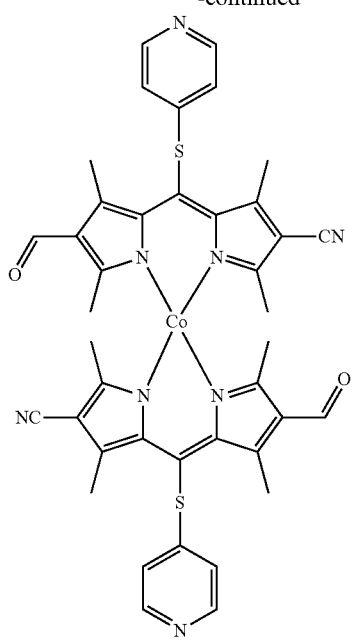
84
-continued
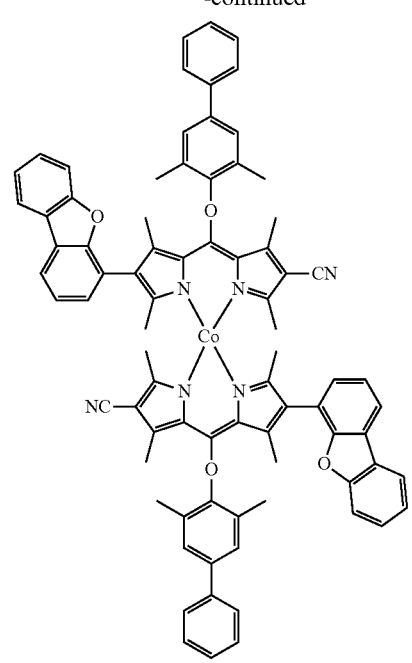
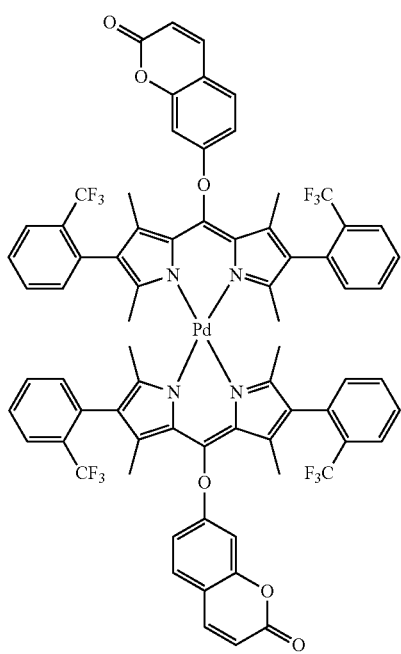
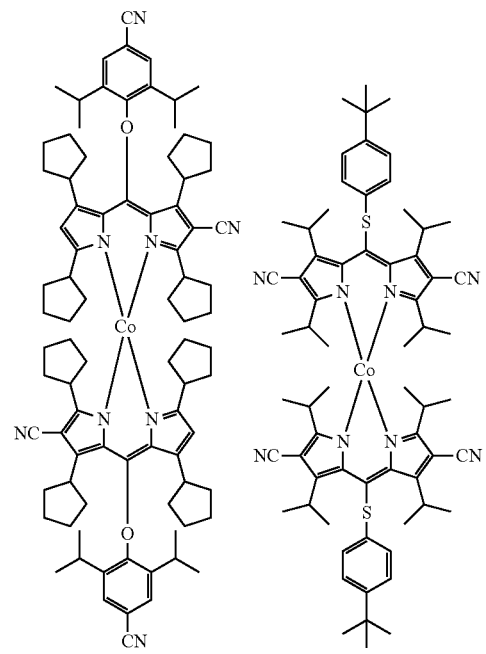

-continued
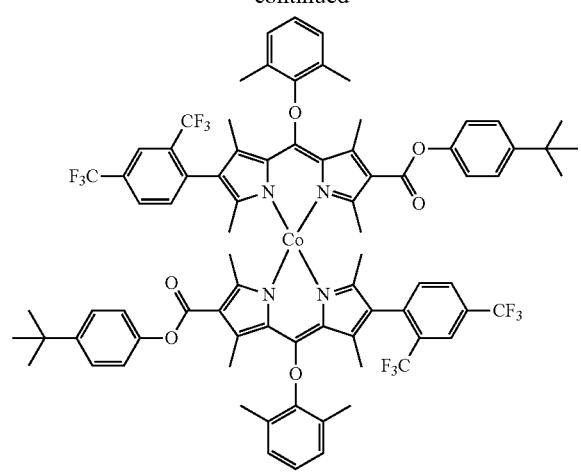
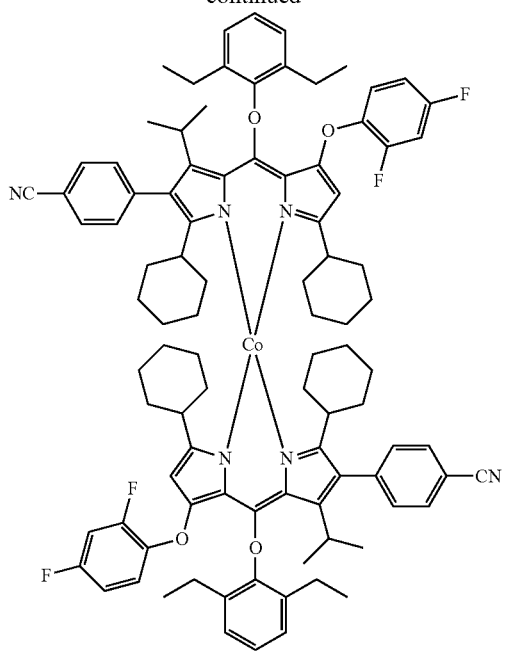
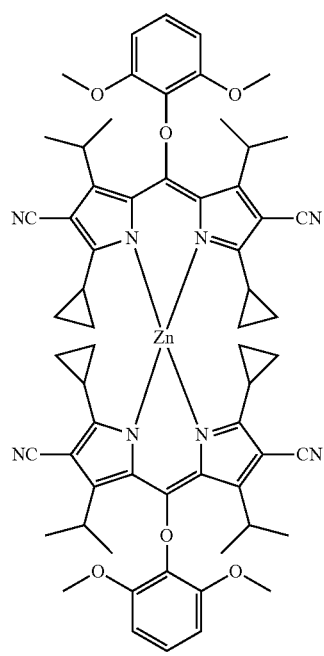
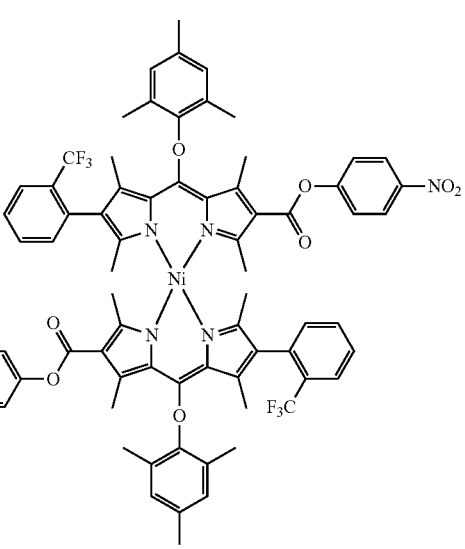

87
-continued
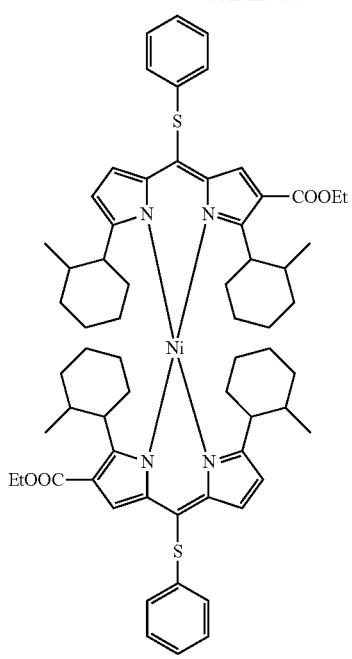
88
-continued
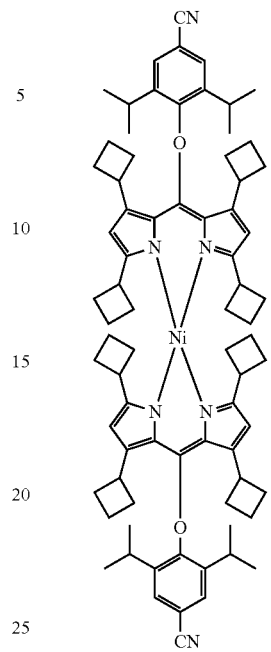
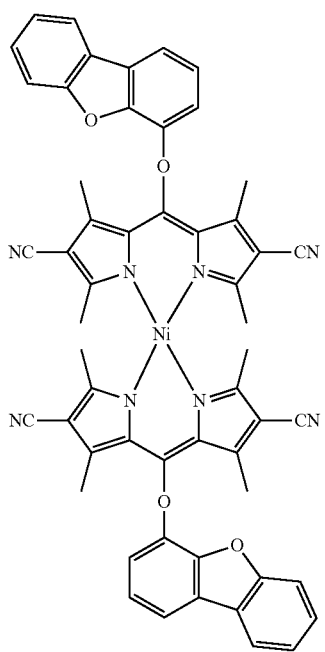
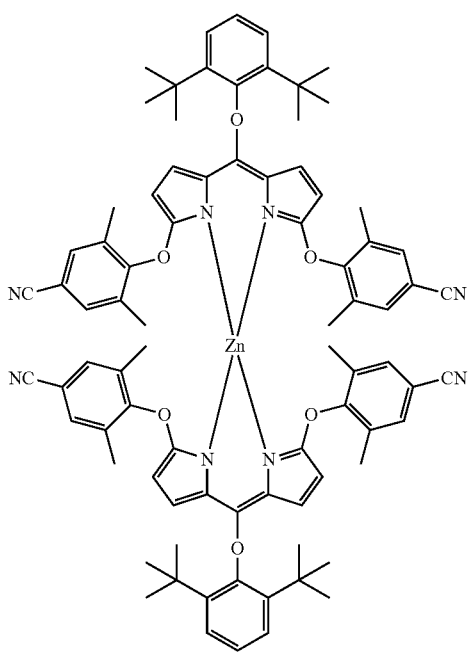

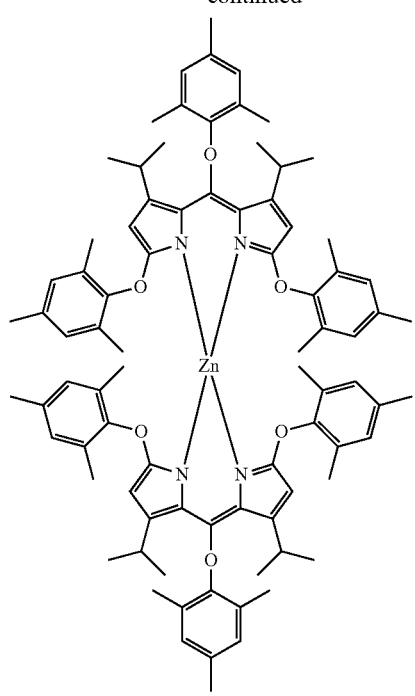
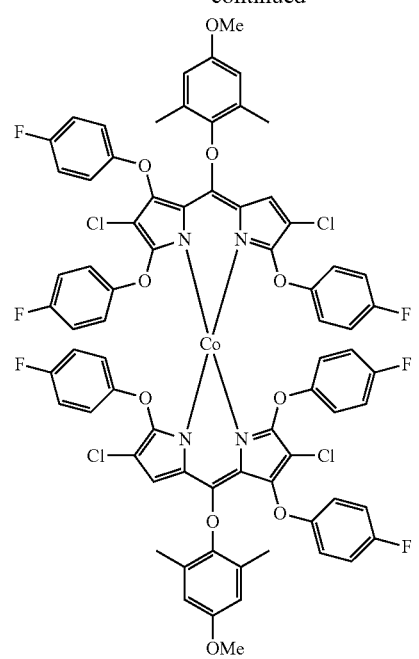
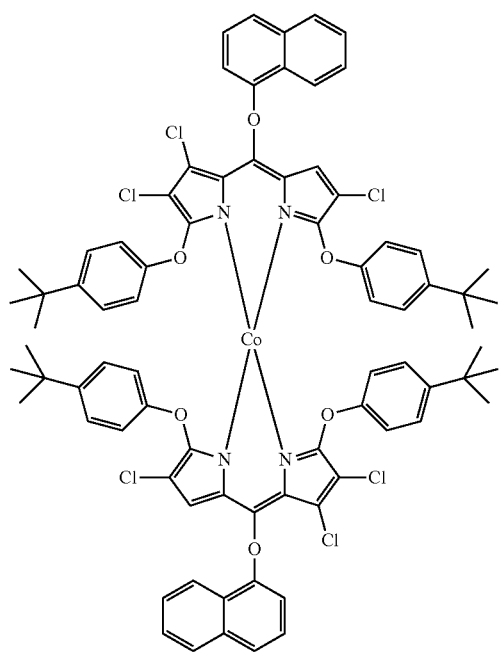
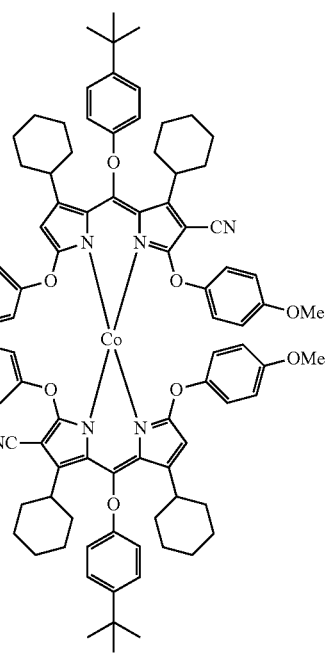

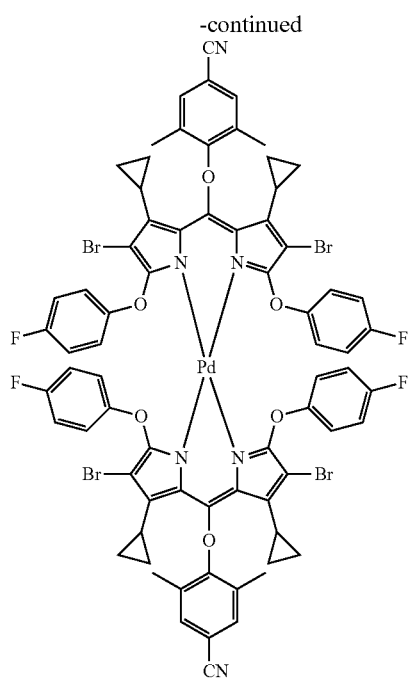
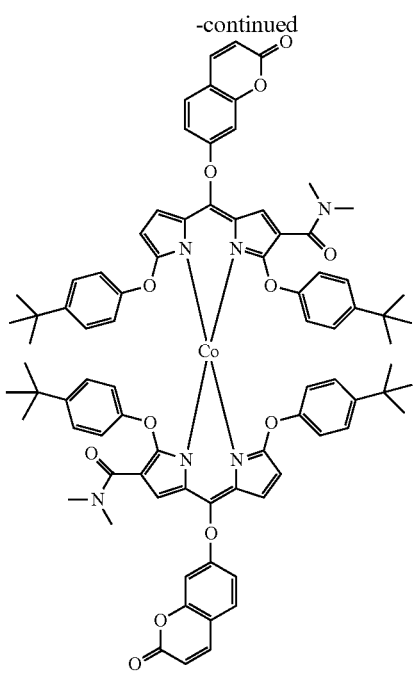
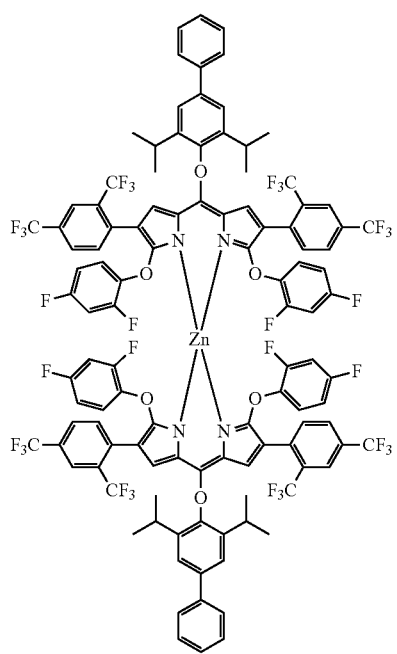
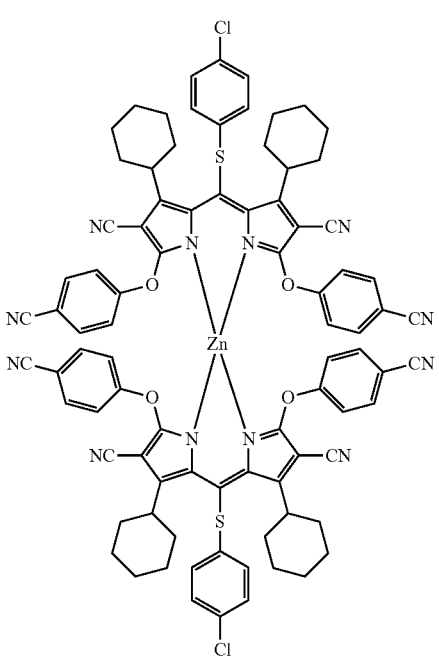

-continued
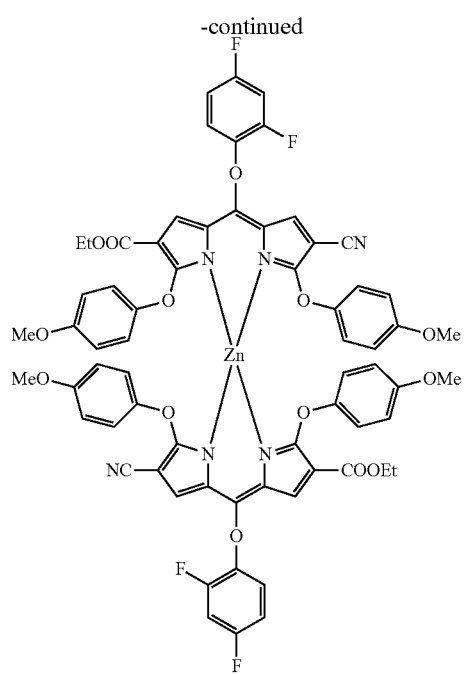
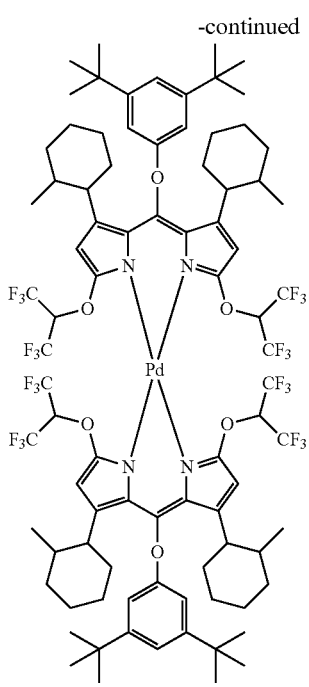
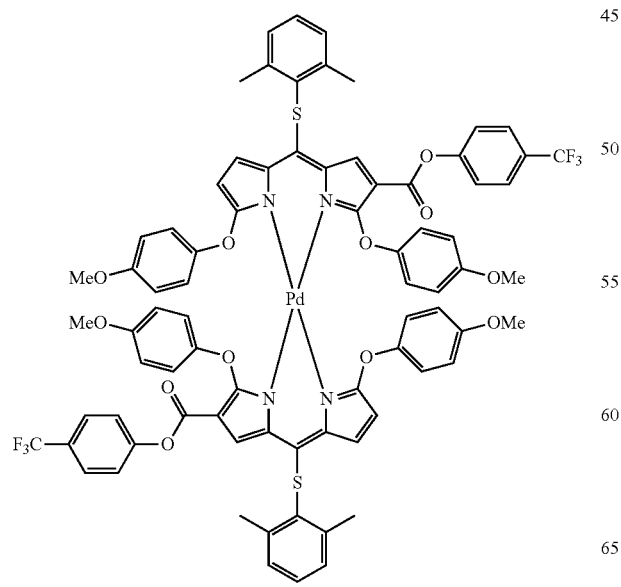
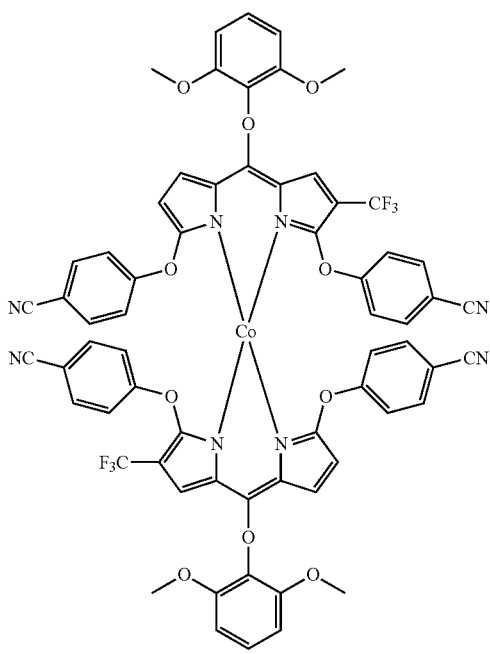

95
-continued
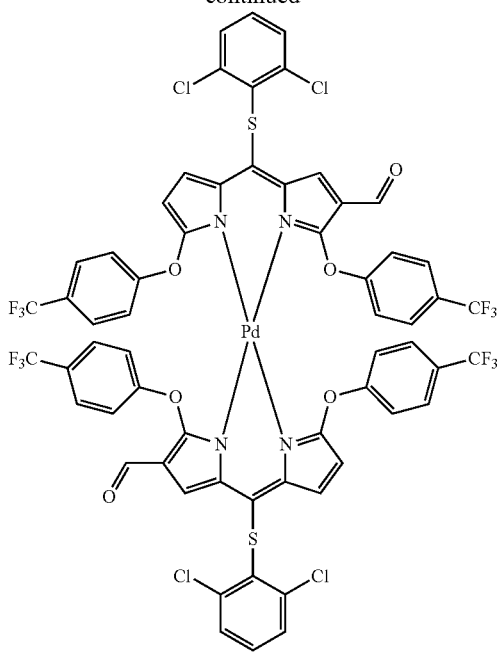
96
-continued
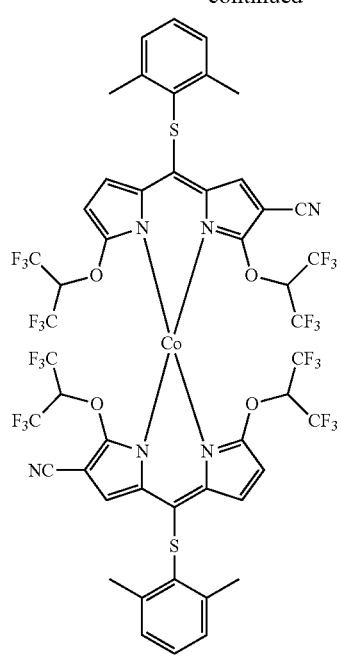
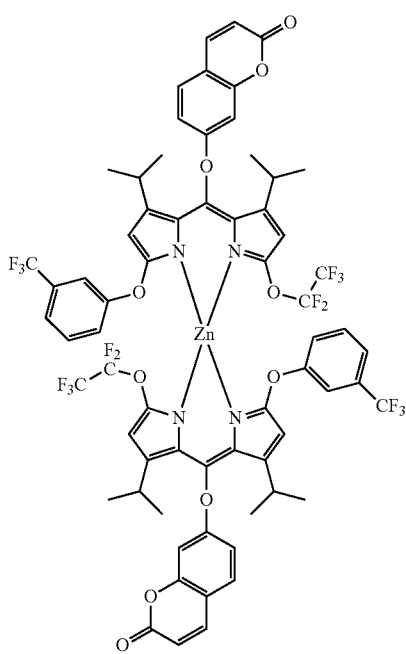
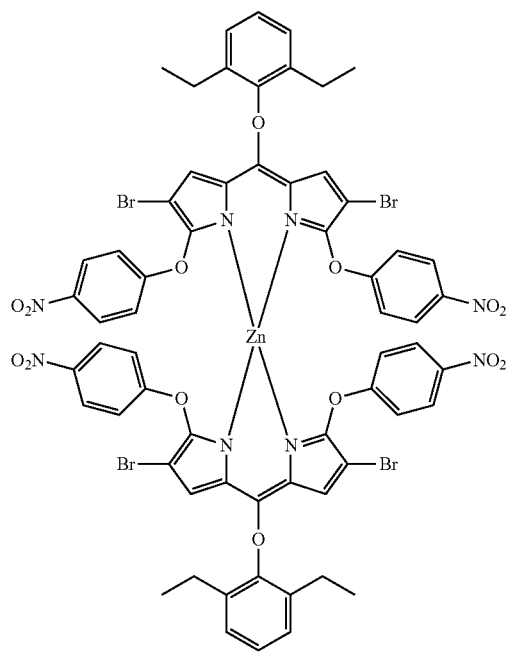

97
-continued
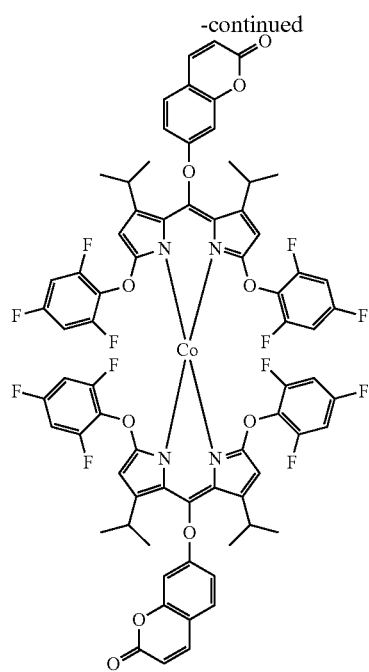
98
-continued
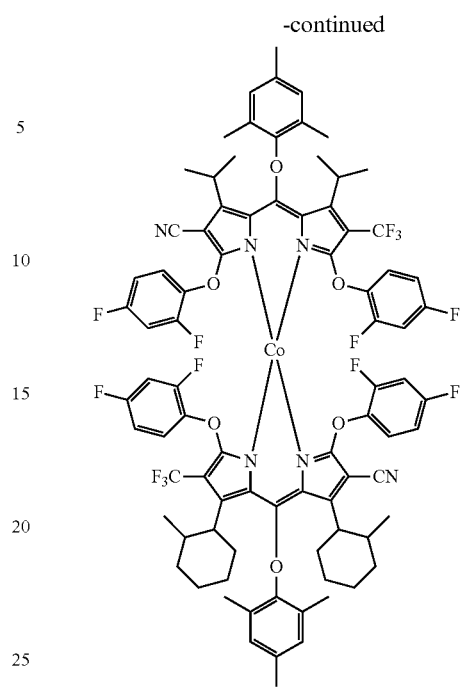
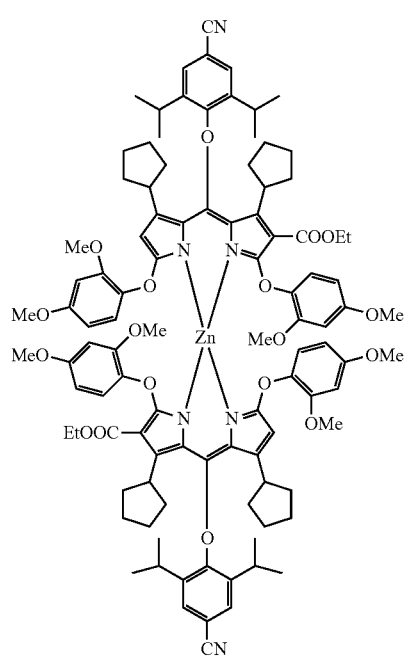
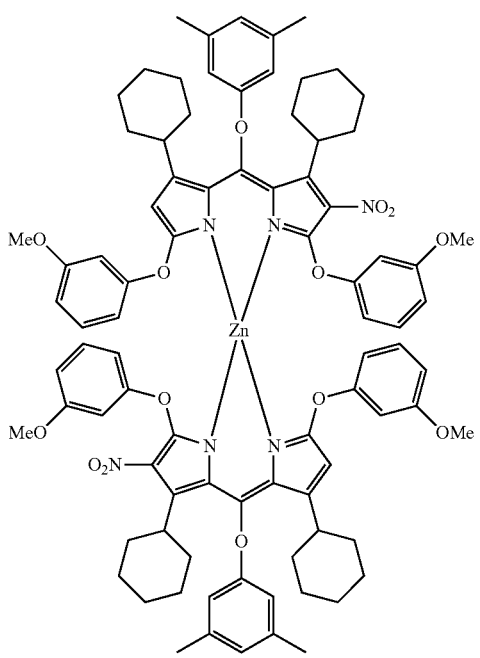

99
-continued
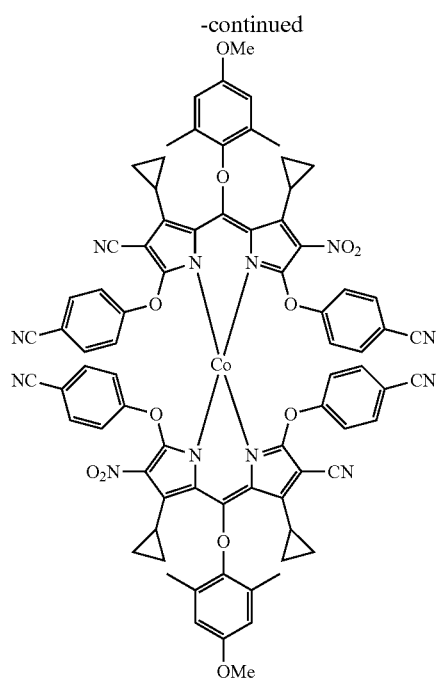
100
-continued
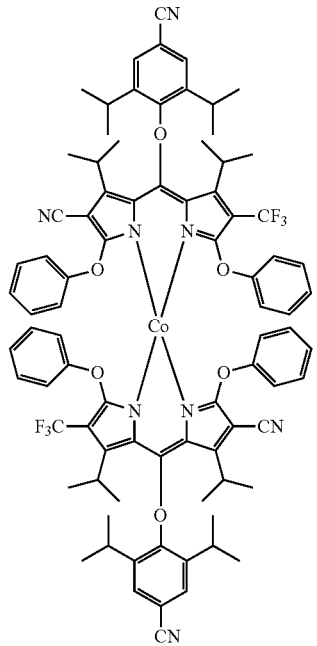
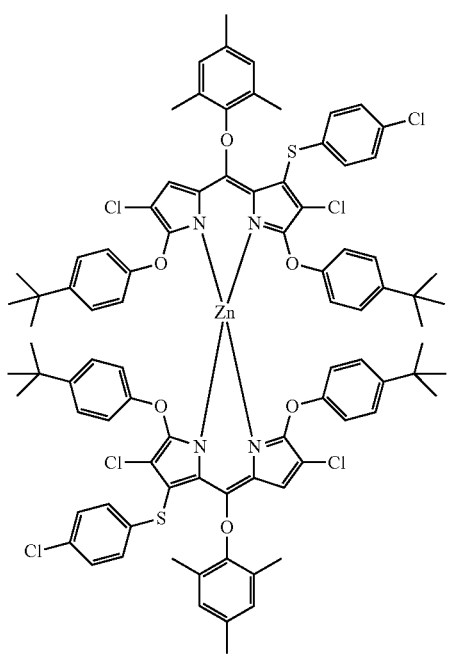
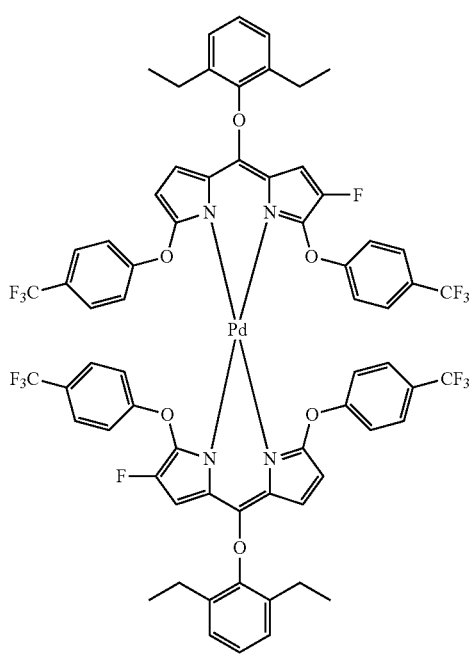

101
-continued
102
-continued
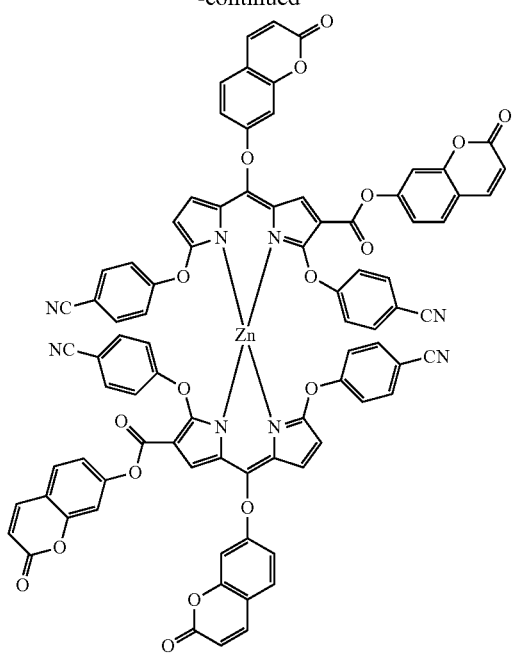
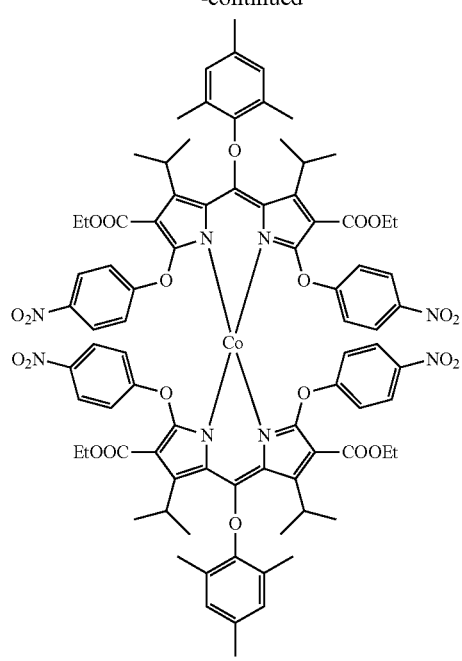
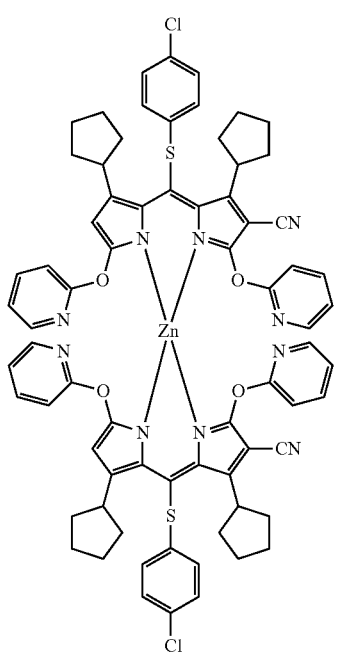
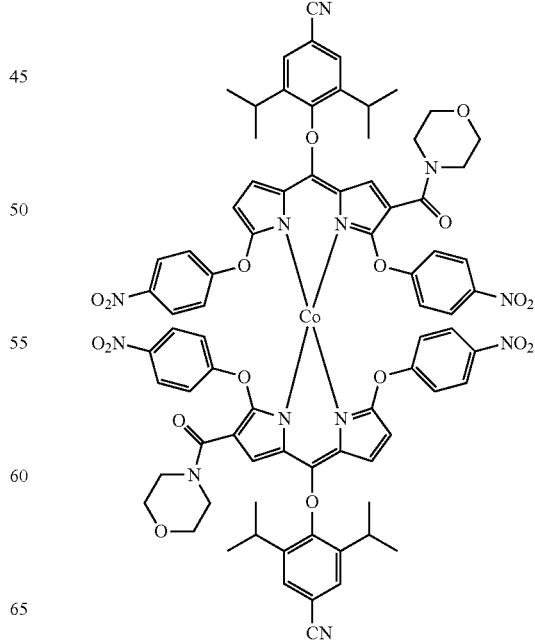

103
-continued
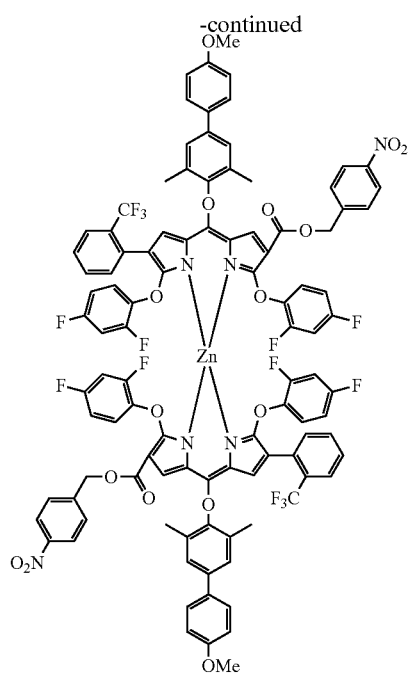
104
-continued
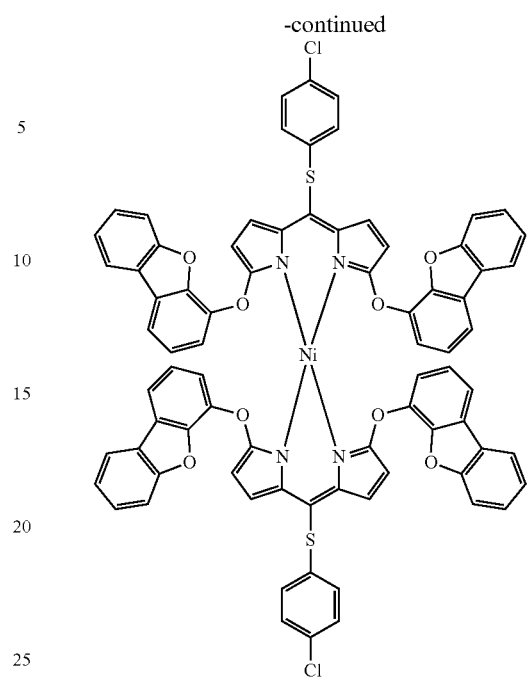
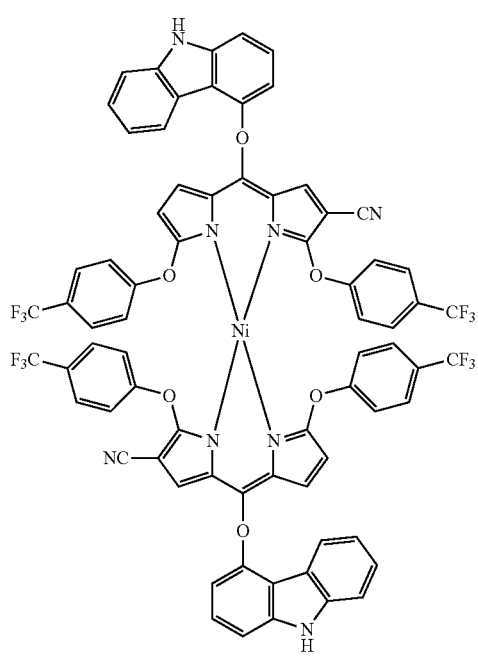
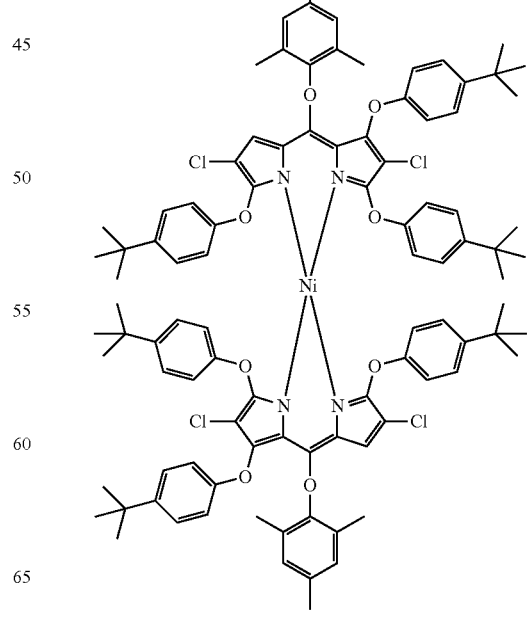

105
-continued
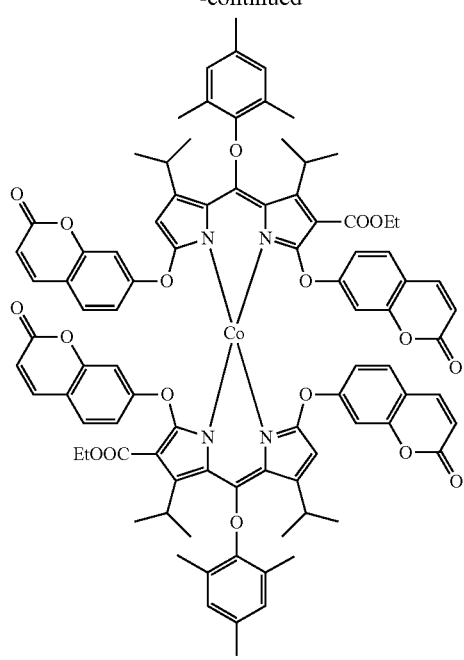
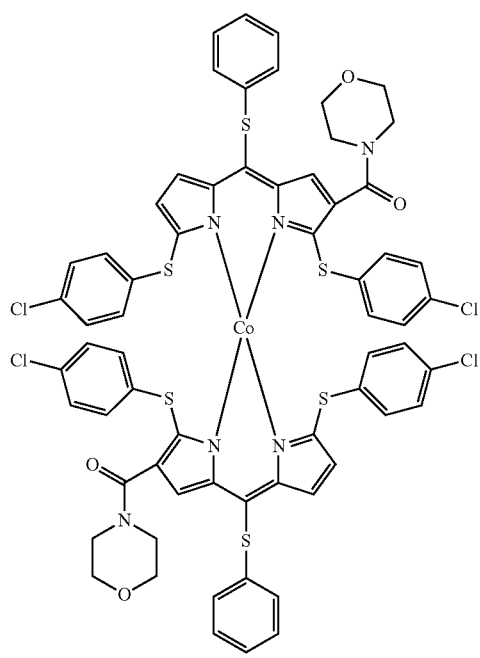
106
-continued
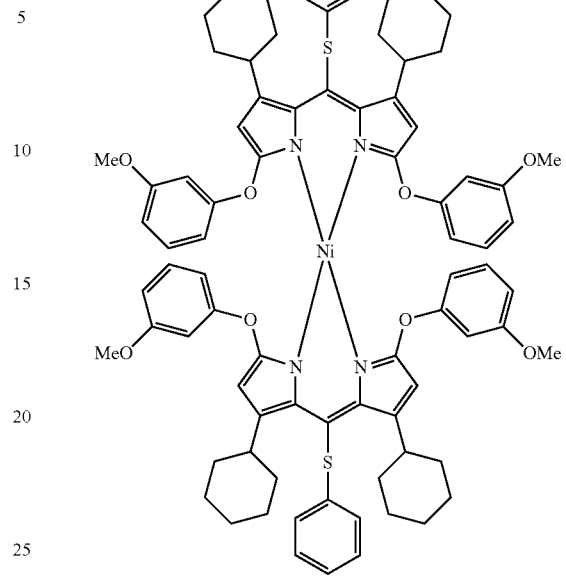
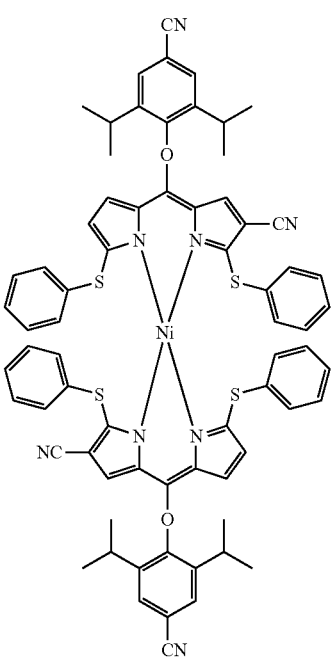

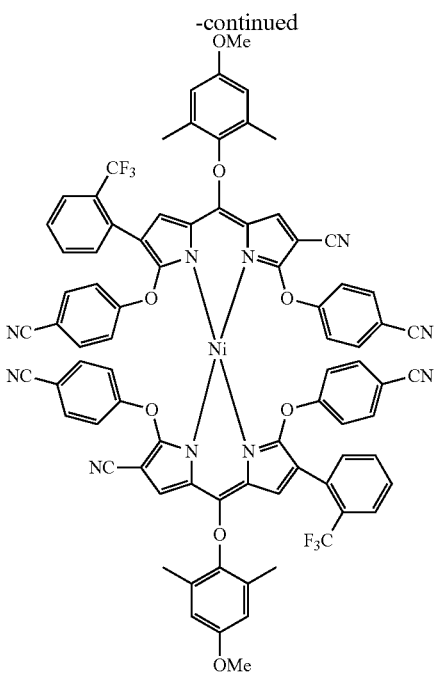

In the compounds,

Me means a methyl group, and Et means an ethyl group.

In one embodiment of the present specification, the optical film further includes a binder resin, and the optical film includes the dye or pigment in 0.001 parts by weight to 5 parts by weight with respect to 100 parts by weight of the binder resin.

When including the dye or pigment in the above-mentioned range, absorption at a wavelength of 500 nm may effectively occur without causing a problem of dye or pigment precipitation.

In one embodiment of the present specification, the adhesive resin may be a styrene-based resin or elastomer, an urethane-based resin or elastomer, a polyolefin-based resin or elastomer, a polyoxyalkylene-based resin or elastomer, a polyester-based resin or elastomer, a polyvinyl chloride-based resin or elastomer, a polycarbonate-based resin or elastomer, a polyphenylene sulfide-based resin or elastomer, a polyamide-based resin or elastomer, an acrylate-based resin or elastomer, an epoxy-based resin or elastomer, a silicone-based resin or elastomer, or a fluorine-based resin or elastomer, or includes a mixture thereof.

In one embodiment of the present specification, the optical film includes a composition for forming an optical film, or a cured material thereof.

In one embodiment of the present specification, the optical film may include the composition for forming an optical film according to one embodiment of the present specification as it is.

In one embodiment of the present specification, the optical film may include a cured material of the composition for forming an optical film according to one embodiment of the present specification.

In the present specification, the cured material is obtained by curing after the solvent included in the adhesive composition is dried, and each constituent included in the adhesive composition is crosslinked by forming chemical and/or physical bonds.

In one embodiment of the present specification, the composition for forming an optical film includes the dye or pigment and the binder resin described above.

The composition for forming an optical film may further include at least one selected from the group consisting of an antioxidant, an antistatic agent, a hindered amine-based light stabilizer, a UV stabilizer, a crosslinking agent, a coupling agent, a catalyst and a solvent.

Preferably, the composition for forming an optical film further includes an antioxidant, an antistatic agent and a hindered amine-based light stabilizer.

In one embodiment of the present specification, examples of the antioxidant may include KINOX 10 (pentaerythrityl tetrakis[3-(3,5-di-tert-butyl-4-hydroxyphenyl)propionate]), KINOX 76 (octadecyl-3-(3,5-di-tert-butyl-4-hydroxyphenyl)propionate), KINOX 30 (1,3,5-trimethyl-2,4,6-tris(3,5-di-tert-butyl-4-hydroxybenzyl)benzene), KINOX 34 (1,3,5-tris(3,5-di-tert-butyl-4-hydroxybenzyl)-1,3,5-triazine-2,4,6-(1H,3H,5H)-trione), KINOX 98 (N,N'-hexamethylene-bis[3-(3,5-di-tert-butyl-4-hydroxyphenyl)propionamide]), KINOX 68 (tris(2,4-di-tert-butylphenyl)phosphite), KINOX 28 (bis (2,4-dicumylphenyl)pentaerythritol diphosphite), or combinations thereof, however, the antioxidant is not limited thereto, and those commonly used in the art may be employed.

In one embodiment of the present specification, as the antistatic agent, ionic compounds or metal salts may be used, for example. As the ionic compound, known organic salts usable as an antistatic agent may be used, for example. As the metal salt, known alkali metal salts or alkaline earth metal salts usable as an antistatic agent may be used, for example. When further including the antistatic agent, the adhesive layer has antistatic properties and thereby may reduce generation of static electricity.

In one embodiment of the present specification, examples of the hindered amine-based light stabilizer may include LA 63P (1,2,3,4-butanetetracarboxylic acid-β,β,β',β'-tetramethyl-2,4,8,10-tetraoxaspiro[5.5]undecane-3,9-diethanol copolymer, 1,2,2,6,6-pentamethyl-4-piperidinyl ester), IRESORB 770 (decanedioic acid, 1,10-bis(2,2,6,6-tetramethyl-4-piperidinyl)ester), Tinuvin 292 (decanedioic acid, 1,10-bis(1,2,2,6,6-pentamethyl-4-piperidinyl)ester), Tinuvin 123 (decanedioic acid, bis (2,2,6,6-tetramethyl-1-(octyloxy)-4-piperidinyl)ester), or combinations thereof, however, the hindered amine-based light stabilizer is not limited thereto, and those commonly used in the art may be employed.

Examples of the UV stabilizer may include LA-F 70 (tris[2-hydroxy-3-methyl-4-hexyloxyphenyl]-1,3,5-triazine), Tinuvin 360 (bis[2-hydroxy-5-tert-octyl-3-(benzotriazol-2-yl)phenyl]methane), Tinuvin 99-2 (benzenepropanoic acid, 3-(2H-benzotriazol-2-yl)-5-(1,1-dimethylethyl)-4-hydroxy-C7-9-branched and linear alkyl esters), Tinuvin 1130 (a) 50% β-[3-(2-H-benzotriazol-2-yl)-4-hydroxy-5-tert-butylphenyl]-propionic acid-poly(ethylene glycol) 300-ester, b) 38% bis{β-[3-(2-H-benzotriazol-2-yl)-4-hydroxy-5-tert-butylphenyl]-propionic acid}-poly(ethylene glycol) 300-ester, and c) 12% polyethylene glycol), Tinuvin 400 (2-[4-[(2-hydroxy-3-dodecyloxypropyl)oxy]-2-hydroxyphenyl]-4,6-bis(2,4-dimethylphenyl)-1,3,5-triazine & 2-[4-[(2-hydroxy-3-tridecyloxypropyl)oxy]-2-hydroxyphenyl]-4,6-bis(2,4-dimethylphenyl)-1,3,5-triazine), Tinuvin 477, or combinations thereof, however, the UV stabilizer is not limited thereto, and those commonly used in the art may be employed.

The crosslinking agent may be an isocyanate-based crosslinking agent.

Examples of the isocyanate-based crosslinking agent may include tolylene diisocyanate, xylene diisocyanate, 2,4-diphenylmethane diisocyanate, 4,4-diphenylmethane diisocyanate, hexamethylene diisocyanate, isophorone diisocyanate, tetramethylxylene diisocyanate, naphthalene diisocyanate, triphenylmethane triisocyanate, methylenebis triisocyanate and the like, but are not limited thereto.

The coupling agent may be a silane-based coupling agent, but is not limited thereto, and those known in the art may be properly employed.

The catalyst may be a tin-based catalyst, but is not limited thereto, and those known in the art may be properly employed.

The solvent may be methyl ethyl ketone, but is not limited thereto, and those known in the art may be properly employed.

The composition for forming an optical film may further include, as necessary, the antioxidant in 0.01 parts by weight to 5 parts by weight, the antistatic agent in 0.01 parts by weight to 5 parts by weight, the hindered amine-based light stabilizer in 0.001 parts by weight to 1 parts by weight, the crosslinking agent and the coupling agent in 0.001 parts by weight to 1 parts by weight, and the catalyst in 0.0001 parts by weight to 0.1 parts by weight based on the total weight of 100 parts by weight of the composition for forming an optical film.

The composition for forming an optical film may further include, as necessary, the solvent in 10 parts by weight to 50 parts by weight based on the total weight of 100 parts by weight of the composition for forming an optical film.

The composition for forming an optical film may include, as necessary, the UV stabilizer in 0.05 parts by weight to 5 parts by weight based on the total weight of 100 parts by weight of the composition for forming an optical film.

The composition for forming an optical film may further include, as necessary, the dye or pigment in 0.001 parts by weight to 5 parts by weight based on the total weight of 100 parts by weight of the composition for forming an optical film.

The content of the dye may be adjusted in order to obtain an optical film having target transmittance according to the intended use, and when using in less than 0.001 parts by weight, the effect of using the dye is difficult to obtain. It is preferred not to exceed a maximum of 5 parts by weight, and this is due to the fact that precipitates of the dye may occur in the adhesive when the content of the dye is too excessive.

The crosslinking agent and the coupling agent are materials performing crosslinking of the adhesive, and the effect is difficult to obtain when the content is less than 0.001 parts by weight, and the content of greater than 1 parts by weight may cause direct damages by reacting with the dye.

The catalyst is a material facilitating the crosslinking reaction, and the effect is difficult to obtain when the content is less than 0.0001 parts by weight, and the content of greater than 0.1 parts by weight may decline adhesive properties.

The antioxidant is a material preventing oxidation of the composition, and the effect is difficult to obtain when the content is less than 0.01 parts by weight, and the content of greater than 5 parts by weight may cause a reliability problem of the dye or decline adhesive properties of the adhesive.

The antistatic agent is a material performing a role of preventing static electricity of the film, and the effect is difficult to obtain when the content is less than 0.01 parts by weight, and the content of greater than 5 parts by weight may cause a reliability problem of the dye or decline adhesive properties of the adhesive.

The hindered amine-based light stabilizer is a material enhancing light resistance reliability, and the effect is difficult to obtain when the content is less than 0.001 parts by weight, and the content of greater than 1 parts by weight may decline adhesive properties.

When a film such as an anti-reflection layer is not used in the optical film according to the present specification, the UV stabilizer may be added to enhance UV reliability. The effect of the UV stabilizer is difficult to obtain when the content is less than 0.05 parts by weight, and the content of greater than 5 parts by weight may decline adhesive properties.

In one embodiment of the present specification, the optical film may be an adhesive film.

When the optical film is an adhesive film, the adhesive film may function as an optical adhesive layer. The function as an optical adhesive layer means forming a black color adhesive film incorporating an organic dye capable of absorbing visible light, and an OLED panel including the same suppresses high panel reflectance. In other words, visible light transmittance of the adhesive film may be controlled in a range of approximately 30% to 90%, and transmittance in a visible region may be properly adjusted depending on the panel reflectance and the reflected color.

In one embodiment of the present application, the adhesive film may have a thickness of greater than or equal to 3 μm and less than or equal to 100 μm. The thickness may be preferably greater than or equal to 5 μm and less than or equal to 80 μm, and more preferably greater than or equal to 10 μm and less than or equal to 50 μm.

In one embodiment of the present specification, the adhesive film further includes a release layer provided on one surface thereof.

FIG. 4 illustrates a structure of the adhesive film including a release layer (4) provided on one surface of the adhesive film (3) according to one embodiment of the present specification.

In the present specification, the release layer means a transparent layer formed on one surface of the adhesive film through a release treatment, and, as long as it does not adversely affect in the manufacturing process of the adhesive film, may be employed without limit in terms of materials, thicknesses, properties and the like. The release layer provided on one surface of the adhesive film may be removed after manufacturing the adhesive film.

The release layer may include one or more selected from the group consisting of acetate-based, polyester-based, polyethersulphone-based, polycarbonate-based, polyamide-based, polyimide-based, polyolefin-based, cycloolefin-based, polyurethane-based, acryl-based, fluorine-based and silicone-based resins, but is not limited thereto.

The release layer may have a thickness of greater than or equal to 10 nm and less than or equal to 1,000 nm, preferably greater than or equal to 20 nm and less than or equal to 800 nm, and more preferably greater than or equal to 40 nm and less than or equal to 100 nm, however, the thickness is not limited thereto.

In the present specification, the adhesive film may be manufactured by coating the adhesive composition described above on the release layer or a base using a bar coater. The adhesive film may be manufactured by coating the adhesive composition described above on a base using a bar coater, and then drying the result. Descriptions on the base will be provided later. The methods of coating and drying are not particularly limited, and methods used in the art may be properly employed.

One embodiment of the present specification provides an adhesive optical filter including the optical film.

The adhesive optical filter includes the optical film; a binder resin film; and a surface treatment layer.

In one embodiment of the present specification, TAC (cellulose triacetate) may be used as the binder resin film, however, the binder resin film is not limited thereto.

In one embodiment of the present specification, the binder resin film may have a thickness of greater than or equal to 10 μm and less than or equal to 200 μm, preferably greater than or equal to 15 μm and less than or equal to 100 μm, and more preferably greater than or equal to 20 μm and less than or equal to 75 μm.

The surface treatment layer may be, for example, an anti-reflection layer or an anti-glare layer. The surface treatment layer may include a low refractive index layer having a refractive index of approximately 1.4 or less for a wavelength of 550 nm. A lower limit of the refractive index of the low refractive index layer may be, for example, approximately 1.2, and a specific refractive index range may be from 1.31 to 1.35. The low refractive index layer may include a photocurable acrylate containing hollow silica and a fluorine-based acrylate. The surface treatment layer may further include a hard coating layer on one surface of the low refractive index layer. The hard coating layer is a layer protecting a base surface from being damaged by friction and the like, and includes an organic coating agent such as melamine, acryl or urethane, an inorganic coating agent such as silicon-based, or an organic-inorganic hybrid coating agent, and normally has a thickness of 5 μm to 30 μm.

A material and a thickness of the surface treatment layer are not particularly limited, and materials and thicknesses commonly used in the art may be employed.

In examples to describe later, a surface treatment layer-attached optical film is described, however, the surface treatment layer does not affect Equations 1 and 2 described above, and each reliability factor.

Hereinafter, an adhesive optical filter when the optical film is an adhesive film will be described.

One embodiment of the present specification provides an adhesive optical filter including an optical film; and a surface treatment layer.

The adhesive optical filter includes an adhesive film; and a surface treatment layer provided on one surface of the adhesive film.

In addition, one embodiment of the present specification provides an adhesive optical filter further including a binder resin film between the adhesive film and the surface treatment layer.

Specifically, FIG. 5 illustrates a structure of the adhesive optical filter according to one embodiment of the present specification. The adhesive optical filter (10) includes a binder resin film (2); the adhesive film (3) provided on one surface of the binder resin film (2); and a surface treatment layer (1) provided on a surface opposite to the surface where the binder resin film (2) and the adhesive film (3) are in contact with each other.

In one embodiment of the present specification, the adhesive film or the binder resin film may each be a single layer or a multilayer. The multilayer means 2 or 3 layers.

When the adhesive film or the binder resin film is a multilayer, the adhesive films or the binder resin films may be each independently the same as or different from each other. Being different from each other may be a difference in the types of the constituents included each layer, or may be a difference in the content thereof.

The adhesive optical filter may be manufactured by consecutively laminating a surface treatment layer provided on one surface of a binder resin film, and then laminating the adhesive film on a surface opposite to the surface in contact with the surface treatment layer of the binder resin film.

In addition, the adhesive optical filter may be manufactured by laminating a surface treatment layer provided on one surface of a base, preparing the adhesive film separately, and then attaching the adhesive film on a surface opposite to the surface in contact with the surface treatment layer laminated on the base.

The method of laminating the surface treatment layer on one surface of the base and the method of laminating the adhesive film on a surface opposite to the surface in contact with the surface treatment layer of the binder resin film are not particularly limited, and, for example, methods such as coating may be employed, and other methods used in the art may be properly employed.

One embodiment of the present specification provides a display device including the optical film described above.

One embodiment of the present specification provides a display device including the adhesive optical filter described above.

In one embodiment of the present specification, the display device further includes a display panel, and the optical film is provided on the display panel.

In one embodiment of the present specification, the display panel is a spontaneous light emitting display panel or a non-spontaneous light emitting display panel.

Examples of the spontaneous light emitting display panel may include an OLED panel and the like not requiring a backlight, and examples of the non-spontaneous light emitting display panel may include an LCD panel and the like requiring a backlight.

According to one embodiment of the present application, an OLED panel may be used as the display panel, however, the display panel is not limited thereto.

In one embodiment of the present specification, the display panel is an OLED panel, and the display device is an OLED device including an OLED panel; and the optical film provided on one surface of the OLED panel.

In one embodiment of the present specification, the OLED panel further includes a white pixel.

In one embodiment of the present specification, the OLED panel is a white OLED panel.

In one embodiment of the present specification, the display device may be included in, for example, TVs, computer monitors, laptops, mobile phones and the like.

FIG. 1 to FIG. 3 are diagrams showing wavelength-dependent absorption spectra of the optical films, and the wavelength-dependent absorption spectra of the optical films may be measured using a UV-vis spectrometer. In FIG. 1 to FIG. 4, the horizontal value means an absorption wavelength (nm), and the vertical value represents transmittance (%).

FIG. 1 and FIG. 2 are diagrams showing wavelength-dependent absorption spectra of the optical films according to examples. Examples 1 to 3 are spectra of optical films obtained by varying an amount of Compound 1 added to Solvent Black 28. Examples 4 to 6 are spectra of optical films obtained by varying an amount of Compound 1 to Solvent Black 28 and Pigment Blue 15. Examples 7 to 9 are spectra of optical films prepared by adding Compounds 2 to 4 to Solvent Black 28.

FIG. 3 is a diagram showing wavelength-dependent absorption spectra of the optical films according to comparative examples. Comparative Examples 1 and 2 are spectra of optical films in which a dye absorbing at least some of a wavelength of 490 nm to 510 nm is not added to Solvent Black 28 or a mixture of Solvent Black 28 and Pigment Blue 15. Comparative Examples 3 and 4 are spectra of optical films in which Compound 1 is added to Solvent Black 28 or a mixture of Solvent Black 28 and Pigment Blue 15, however, the transmission color specified in claim 1 is not satisfied.

FIG. 6 illustrates a structure of an OLED device (30), one example of the display device according to one embodiment of the present specification. The OLED device (30) of the present specification may include an OLED panel (20) and an adhesive optical filter (10) provided on one surface of the OLED panel (20) and having the adhesive film (3), the binder resin film (2) and the surface treatment layer (1) consecutively formed therein. Specifically, in the OLED device (30), one surface where the OLED panel (20) and the optical filter (10) are in contact with each other is a surface opposite to the surface where the adhesive film (3) and the binder resin film (2) are in contact with each other.

In the OLED device, the descriptions provided above are applied to the optical film.

In the present specification, the OLED panel may consecutively include a substrate, a lower electrode, an organic material layer and an upper electrode. The organic material layer may include an organic material capable of emitting light when a voltage is applied to the lower electrode and the upper electrode. Any one of the lower electrode and the upper electrode may be an anode, and the other one may be a cathode. The anode is an electrode where holes are injected, and may be made with conductive materials having high work function. The cathode is an electrode where electrons are injected, and may be made with conductive materials having low work function. As the anode, a transparent metal oxide layer such as ITO (indium tin oxide) or IZO (indium zinc oxide) having high work function may be commonly used, and as the cathode, a metal electrode having low work function may be used. An organic material layer is generally transparent, and a transparent display may be obtained when the upper electrode and the lower electrode are made to be transparent. In one example, a transparent display may be obtained when the thickness of the upper electrode or the lower electrode is employed to be very thin.

FIG. 7 illustrates of a structure of the OLED panel according to one embodiment of the present specification, and it may be identified that the OLED panel consecutively includes a substrate (11); a lower electrode (12); an organic material layer (13); and an upper electrode (14). The OLED panel may further include an encapsulation substrate (15), which functions to prevent inflow of moisture and/or oxygen from the outside, on the upper electrode.

The organic material layer may include a light emitting layer, and may further include a common layer for charge injection and transport. Specifically, the common layer for charge injection and transport may include a hole transporting layer, a hole injecting layer, an electron injecting layer and an electron transporting layer for balancing electrons and holes, but is not limited thereto.

The optical film may be disposed on a side of the OLED panel where light emits. For example, the adhesive optical filter may be disposed on an outer side of the substrate in a bottom emission structure where light emits toward the substrate side, and the adhesive optical filter may be disposed on an outer side of the encapsulation substrate in a top emission structure where light emits toward the encapsulation substrate side.

Specifically, (a) of FIG. 8 illustrates the OLED device when the OLED panel (20) has a bottom emission structure, and in the bottom emission structure side where light emits from the organic material layer (13) toward the substrate (11) side, the adhesive optical filter (10) may be provided on a surface opposite to the surface where the substrate (11) and the lower electrode (12) are in contact with other, and a surface opposite to the surface in contact with the binder resin film (2) of the adhesive film (3) included in the adhesive optical filter (10) is provided in contact with the substrate (11) of the OLED panel (20).

(b) of FIG. 8 illustrates the OLED device when the OLED panel (20) has a top emission structure, and in the top emission structure where light emits from the organic material layer (13) toward the encapsulation substrate (15) side, the adhesive optical filter (10) may be provided on a surface opposite to the surface where the encapsulation substrate (15) and the upper electrode (14) are in contact with each other, and a surface opposite to the surface in contact with the binder resin film (2) of the adhesive film (3) included in the adhesive optical filter (10) is provided in contact with the encapsulation substrate (15) of the OLED panel (20).

Although not illustrated in the drawings, the OLED panel may have a dual emission structure, and when the OLED panel has a dual emission structure, the optical film may be provided on both outermost side surfaces of the OLED panel, and may also be provided on one outermost side surface of the OLED panel.

The optical film may improve visibility and display performance by minimizing external light from being reflected by a reflective layer made of a metal such as an electrode and a wire of the OLED panel and coming out of the outer side of the OLED panel. The outer side of the OLED panel means an outer side of the encapsulation substrate in the top emission, and means an outer side of the substrate in the bottom emission.

In one example, the OLED panel may further include a color filter-formed substrate as necessary. The color filter means a layer formed by coating color resists of red, green and blue in a specific pattern, and, when light passes through, displaying colors through each color filter.

(a) of FIG. 9 illustrates a structure of the OLED panel in a bottom emission structure provided with the color filter-formed substrate (16), and the color filter-formed substrate (16) may be disposed on a surface opposite to the surface where a lower electrode (12) and an organic material layer (13) are in contact with each other. Herein, the OLED panel may have a structure consecutively including an encapsulation substrate (15), a transparent metal oxide electrode (anode) that is an upper electrode (14), the organic material layer (13), a metal electrode (cathode) that is the lower electrode (12) and the color filter-formed substrate (16).

(b) of FIG. 9 illustrates a structure of the OLED panel in a top emission structure provided with the color filter-formed substrate (16), and the color filter-formed substrate (16) may be disposed on a surface opposite to the surface where an upper electrode (14) and an organic material layer (13) are in contact with each other. Herein, the OLED panel may have a structure consecutively including the color filter-formed substrate (16), the upper electrode (14), the organic material layer (13), a lower electrode (12) and a substrate (11).

As illustrated, the color filter may include red, green and blue regions, and although not separately indicated in the drawing, a black matrix for separating the regions may be further included. When a color filter is present in the OLED panel, lower panel reflectance may be obtained compared when a color filter is not present. Specifically, when a red, green and blue color filter is present in front of a light emitting layer of an OLED, high reflectance in a metal electrode located at the back surface of the light emitting layer is reduced. The panel reflectance means electrode reflection, and specifically means that external light penetrating into the OLED panel is reflected by an electrode included in the OLED panel.

The OLED panel may be employed without particular limit as long as it is used in the art, but may have average reflectance of approximately 30% to 50% in a wavelength range of 400 nm to 600 nm, and may also be an OLED panel with 25% or less. The average reflectance may be expressed as a sum of regular reflected light obtained by light from a light source entering the reflective surface and reflected at the same angle and diffused reflected light that is light scattered and reflected in various directions instead of being regular reflected due to irregularities or curves on the surface, and is expressed by averaging 400 nm to 600 nm reflectance values among the measured reflectance values for each wavelength.

(a) of FIG. 10 illustrates a structure of the white OLED panel in a bottom emission structure provided with a substrate having a white pixel-including color filter formed therein (17), and the substrate having a white pixel-including color filter formed therein (17) may be disposed on a surface opposite to the surface where a lower electrode (12) and an organic material layer (13) are in contact with each other. Herein, the OLED panel may have a structure consecutively including an encapsulation substrate (15), a transparent metal oxide electrode (anode) that is an upper electrode (14), the organic material layer (13), a metal electrode (cathode) that is the lower electrode (12) and the substrate having a white pixel-including color filter formed therein (17).

(b) of FIG. 10 illustrates a structure of the OLED panel in a top emission structure provided with a substrate having a white pixel-including color filter formed therein (17), and the substrate having a white pixel-including color filter formed therein (17) may be disposed on a surface opposite to the surface where an upper electrode (14) and an organic material layer (13) are in contact with each other. Herein, the OLED panel may have a structure consecutively including the substrate having a white pixel-including color filter formed therein (17), the upper electrode (14), the organic material layer (13), a lower electrode (12) and a substrate (11).

Hereinafter, the present specification will be described in detail with reference to examples. However, the examples according to the present specification may be modified to various other forms, and the scope of the present specification is not to be construed as being limited to the examples described below. The examples of the present specification are provided in order to more fully describe the present specification to those having average knowledge in the art.

EXAMPLE AND COMPARATIVE EXAMPLE

As a binder resin, AD-701 (LG Chem.) (solid content 15.5%) was used, and a certain amount of a dye was dissolved in methyl ethyl ketone (MEK) so that an amount of the dye or pigment became 0.2 parts by weight to 1.5 parts by weight with respect to 100 parts by weight of the solid content of the binder resin, and as a result, a composition for forming an optical film was prepared. Specific type and amount of the dye or pigment are as described in the following Table 1.

The binder resin AD-701 (LG Chem.) and the dye according to the following Table 1 were mixed, and mixed for approximately 40 minutes in a shaker (SKC 6100, JEIO Tech.). The mixed composition for forming an optical film was coated on a release layer (PET) to a thickness of approximately 22 μm to 23 μm using a knife bar coating device (KP-3000, Kipae E&T), and dried for 3 minutes in an oven of approximately 100° C. to prepare an optical film.

A surface treatment layer (LG Chem., AAR4) having a minimum reflection wavelength of 500 nm or less was attached to a surface opposite to the surface in contact with the release layer (PET) of the optical film.

When evaluating reliability, the surface treatment layer-attached optical film was attached to glass having a size of 4 cm²×4 cm² after removing the release layer (PET), and when evaluating a viewing angle, it was attached to an OLED panel (OLED55E9KNA, LG Electronics).

TABLE 1

|  | Dye or Pigment Absorbing Wavelength of 500 nm (Parts by Weight) | Solvent Black 28 Parts by Weight | Pigment Blue 15 Parts by Weight |
|---|---|---|---|
| Example 1 | Compound 1 (0.0375) | 1.1028 | — |
| Example 2 | Compound 1 (0.0723) | 1.1028 | — |
| Example 3 | Compound 1 (0.1164) | 1.1028 | — |
| Example 4 | Compound 1 (0.0375) | 1.1028 | 0.2009 |
| Example 5 | Compound 1 (0.1164) | 1.1028 | 0.2009 |
| Example 6 | Compound 1 (0.2702) | 1.1028 | 0.2009 |
| Example 7 | Compound 2 (0.0799) | 1.1028 | — |
| Example 8 | Compound 3 (0.0560) | 1.1028 | — |
| Example 9 | Compound 4 (0.0604) | 1.1028 | — |
| Comparative Example 1 | — | 1.1028 | — |
| Comparative Example 2 | — | 1.1028 | 0.2009 |
| Comparative Example 3 | Compound 1 (0.1538) | 1.1028 | — |
| Comparative Example 4 | Compound 1 (0.3866) | 1.1028 | 0.2009 |
| Comparative Example 5 | — | — | — |

In Table 1, Solvent Black 28 is a metal-containing azo-based compound (BASF Corporation), Pigment Blue 15 is a phthalocyanine-based compound (BASF Corporation), FDB-007 is manufactured by Yamada Chem., SD-021SP is manufactured by Mitsui Chem., and Compounds 1 to 5 were each prepared using preparation methods to describe below.

Preparation Example Compound 1

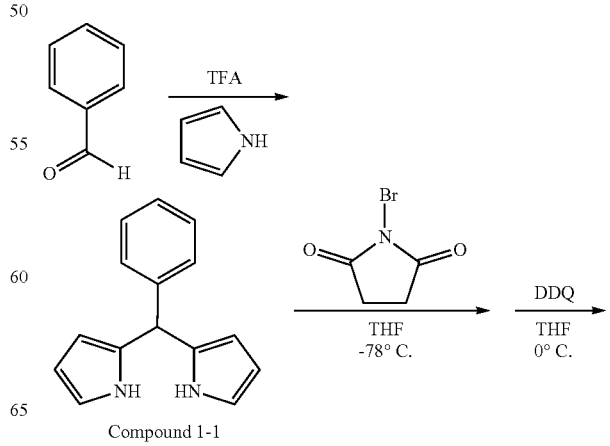

Compound 1-1

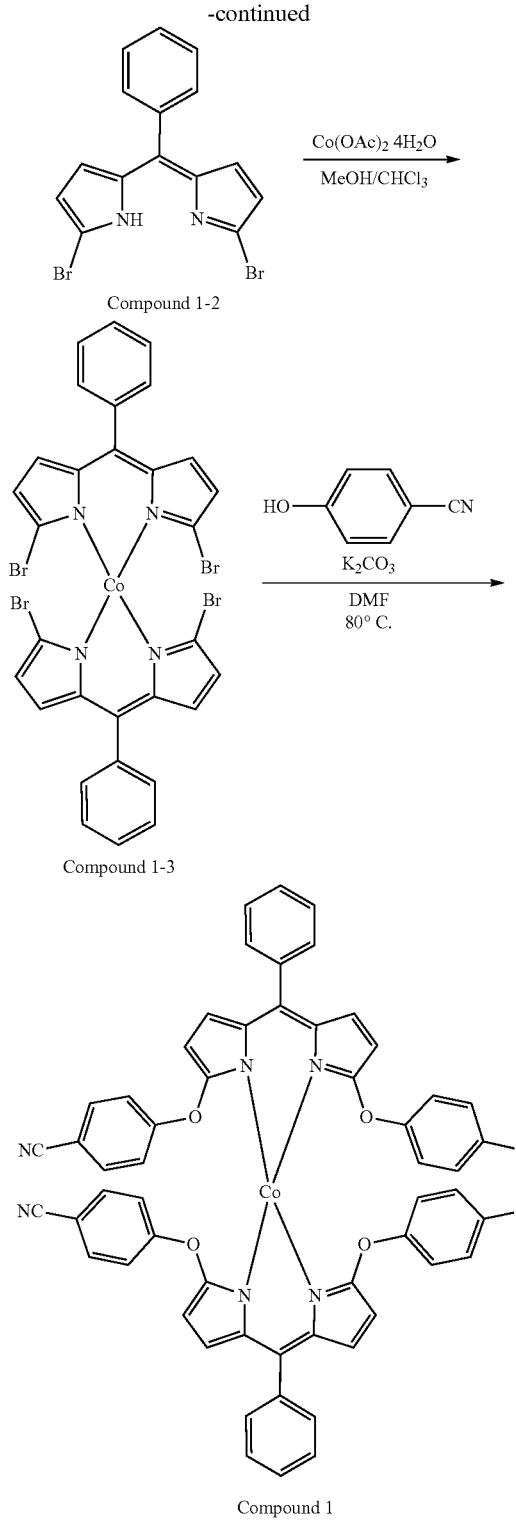

Compound 1-2

Compound 1-3

Compound 1

Synthesis of Compound 1-1

Benzaldehyde (20.0 g) was introduced to a pyrrole solvent and stirred well. Trifluoroacetic acid (0.10 equivalent) was slowly introduced thereto. After identifying the completion of the reaction, the result was extracted using dichloromethane and an aqueous sodium bicarbonate solution. The extracted organic layer was dried with sodium sulfate, and then a silica gel column was used to secure purified and separated Compound 1-1 (15.5 g, yield 37.0%).

Synthesis of Compound 1-2

Compound 1-1 (15.5 g) was stirred well and dissolved in a tetrahydrofuran solvent. The reaction solution was cooled to −78° C. using dry ice and acetone, and N-bromosuccinimide (NBS) (2.0 equivalent) was slowly introduced thereto in a solid state while maintaining the temperature. When the reaction was completed, the reaction solution was cooled to 0° C. using ice water, and then 2,3-dichloro-5,6-dicyano-1,4-benzoquinone (DDQ) (1.1 equivalent) was introduced thereto. When the reaction was completed, triethylamine (1.5 equivalent) was introduced thereto, and the result was extracted using diethyl ether and water. The extracted organic layer was dried with sodium sulfate, and then a silica gel column was used to secure purified and separated Compound 1-2 (10.2 g, yield 38.7%).

Synthesis of Compound 1-3

Compound 1-2 (3.0 g) was stirred well and dissolved in a methanol/chloroform (1/1) solvent. Cobalt acetate tetrahydrate (0.50 equivalent) was introduced to the reaction solution in a solid state. After the reaction was completed, the result was extracted with dichloromethane and water. The extracted organic layer was dried using sodium sulfate and, after removing the solvent by vacuum distillation, recrystallized using methanol. Through the recrystallization, purified and separated Compound 1-3 (2.7 g, yield 83.7%) was secured.

Synthesis of Compound 1

Compound 1-3 (2.7 g) was stirred well and dissolved in an N,N-dimethylformamide solvent. Sodium carbonate (20.0 equivalent) and 4-cyanophenol (10.0 equivalent) were introduced thereto, and the reaction solution was heated to 80° C. and stirred. After the reaction was completed, the result was extracted using chloroform and water. The extracted organic layer was dried with sodium sulfate and, after removing the solvent by vacuum distillation, recrystallized using methanol. Through the recrystallization, purified and separated Compound 1 (2.4 g, yield 74.8%) was secured. HR LC/MS/MS m/z calculated for $C_{58}H_{34}CoN_8O_4$ (M+): 965.2035; found: 965.2041

Preparation Example Compound 2

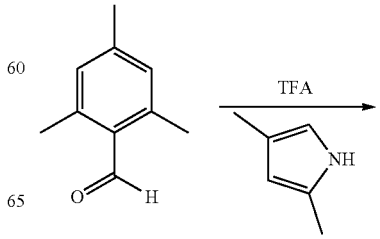

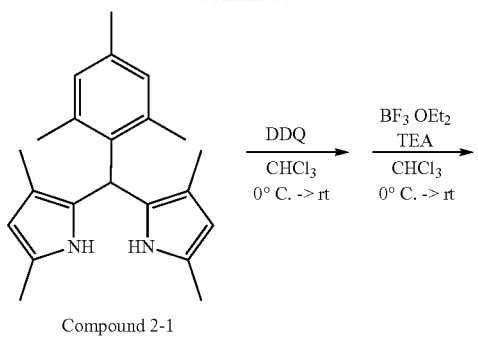

Compound 2-1

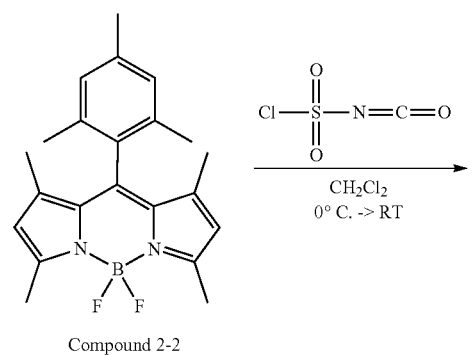

Compound 2-2

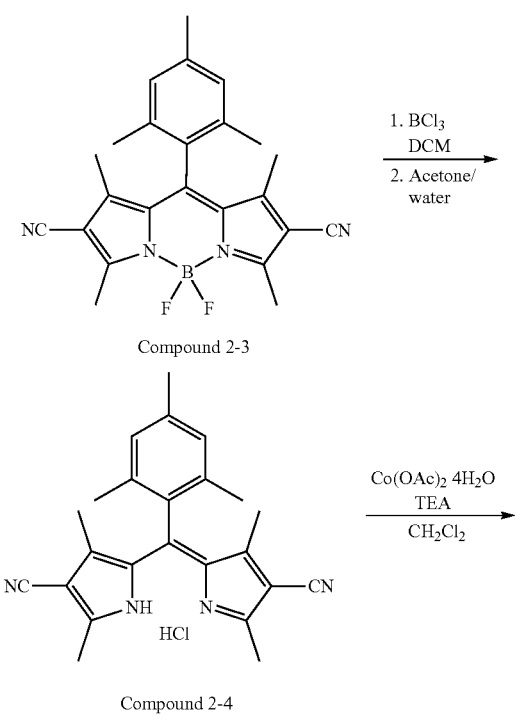

Compound 2-3

Compound 2-4

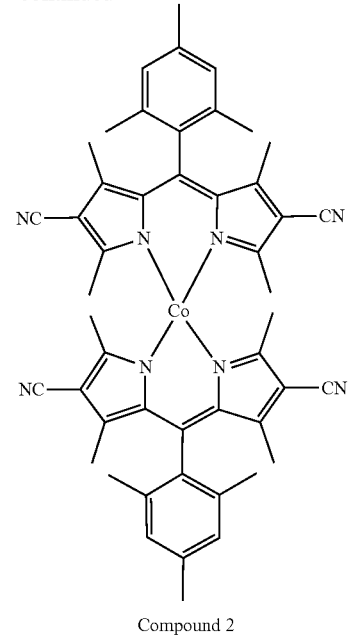

Compound 2

Synthesis of Compound 2-1

Mesityl aldehyde (20.0 g) was introduced to a 2,4-dimethylpyrrole solvent, and stirred well. Trifluoroacetic acid (0.10 equivalent) was slowly introduced thereto. After identifying the completion of the reaction, the result was extracted using dichloromethane and an aqueous sodium bicarbonate solution. The extracted organic layer was dried with sodium sulfate, and then a silica gel column was used to secure purified and separated Compound 2-1 (16.8 g, yield 38.8%).

Synthesis of Compound 2-2

Compound 2-1 (16.8 g) was stirred well and dissolved in a chloroform solvent. The reaction solution was cooled to 0° C. using ice water, and 2,3-dichloro-5,6-dicyano-1,4-benzoquinone (DDQ) (1.1 equivalent) was introduced thereto. The result was stirred well at room temperature, and when the reaction was completed, triethylamine (1.5 equivalent) was introduced thereto, and the result was extracted using diethyl ether and water. After drying the extracted organic layer with sodium sulfate, the reaction solution remaining in the container obtained by vacuum distilling the filtrate was stirred well again in a chloroform solvent. The reaction solution was cooled to 0° C. using ice water, and then triethylamine (20.0 equivalent) and a boron trifluoride ethyl ether complex ($BF_3 \cdot OEt_2$) (10.0 equivalent) were slowly introduced thereto. The reaction solution was stirred at room temperature, and when the reaction was finished, the result was extracted using chloroform and an aqueous sodium bicarbonate solution. The extracted organic layer was dried with sodium sulfate, and then a silica gel column was used to secure purified and separated Compound 2-2 (15.5 g, yield 80.7%).

Synthesis of Compound 2-3

Compound 2-2 (3.0 g) was stirred well and dissolved in a dichloromethane solvent. After cooling the reaction solution to 0° C. using ice water, chlorosulfonyl isocyanate (10.0 equivalent) was introduced thereto, and the result was stirred at room temperature. When the reaction was completed, N,N-dimethylformamide (20.0 equivalent) was introduced thereto, and the result was stirred well again for a sufficient period of time. The result was extracted using chloroform and water, and the organic layer was dried using sodium sulfate. The solvent was removed by vacuum distillation, and the result was recrystallized using methanol. Through the recrystallization, purified and separated Compound 2-3 (2.7 g, yield 79.2%) was secured.

Synthesis of Compound 2-4

Compound 2-3 (2.7 g) was stirred well and dissolved in a dichloromethane solvent. A boron trichloride 1.0 M heptane solution (1.0 equivalent) was slowly added dropwise thereto. When the reaction was completed, the solvent was vacuum distilled at a low temperature of 30° C. or lower, then acetone and water in a ratio of 10/1 were introduced to the reaction solution remaining in the container, and the result was stirred well again. When the reaction was completed, the result was extracted with dichloromethane and water, and the extracted organic layer was dried using sodium sulfate. The solvent was removed by vacuum distillation, and the result was recrystallized using methanol. Through the recrystallization, purified and separated Compound 2-4 (2.2 g, yield 83.8%) was secured.

Synthesis of Compound 2

Compound 2-4 (2.2 g) was stirred well and dissolved in a dichloromethane solvent. Cobalt acetate tetrahydrate (0.50 equivalent) was introduced to the reaction solution in a solid state, and triethylamine (2.5 equivalent) was further introduced thereto. After the reaction was completed, the result was extracted with dichloromethane and water. The extracted organic layer was dried using sodium sulfate and, after removing the solvent by vacuum distillation, recrystallized using methanol. Through the recrystallization, purified and separated Compound 2 (1.9 g, yield 88.1%) was secured. HR LC/MS/MS m/z calculated for $C_{48}H_{46}CoN_8$ (M+): 793.3177; found: 793.3183

Preparation Example Compound 3

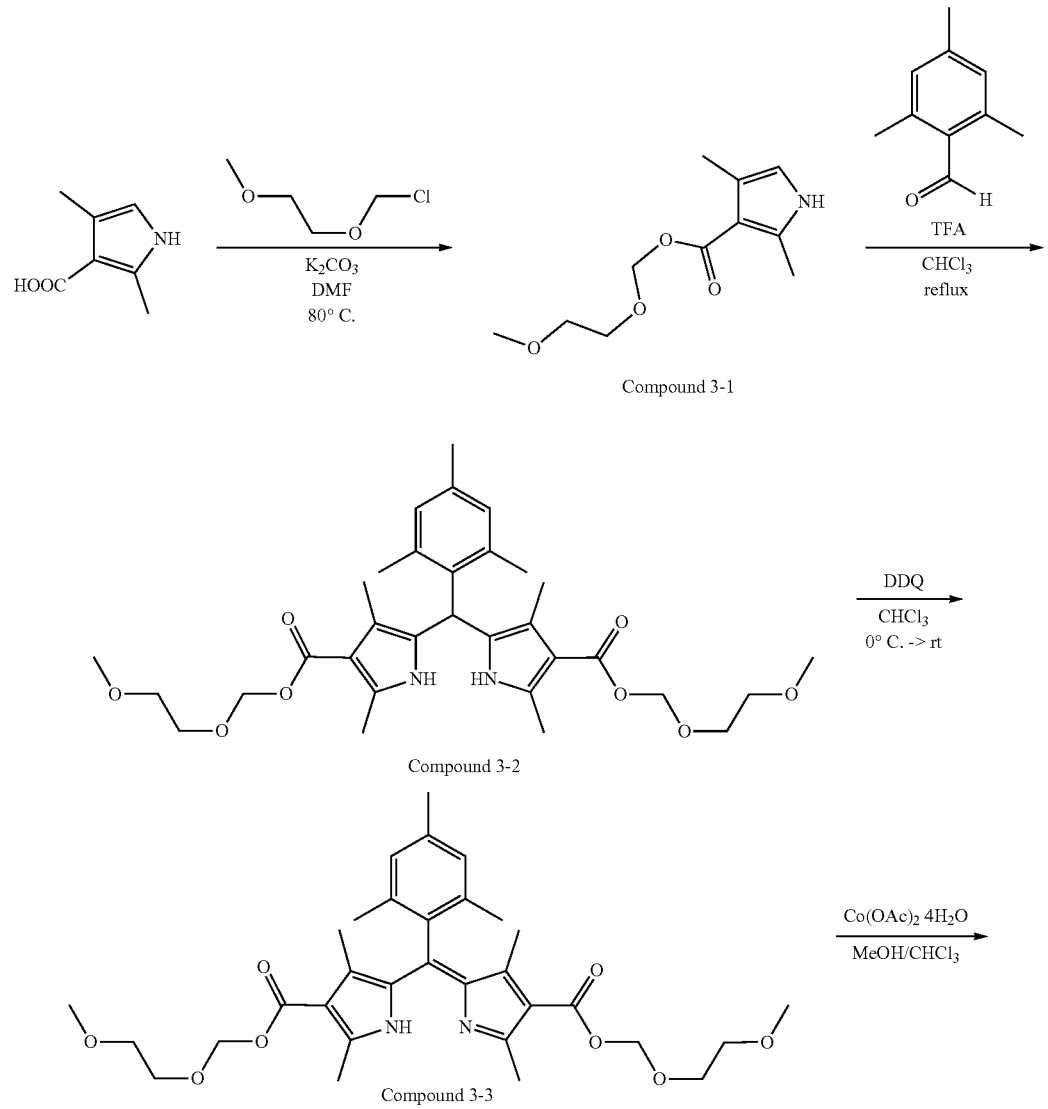

Compound 3-1

Compound 3-2

Compound 3-3

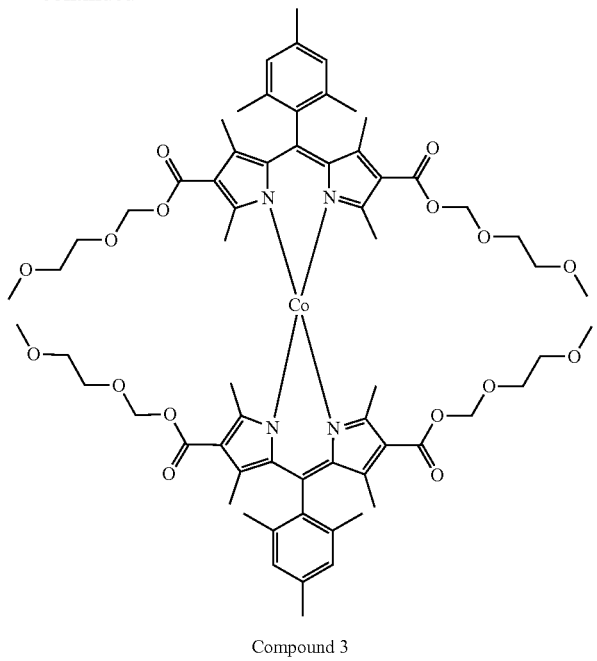

Compound 3

Synthesis of Compound 3-1

2,4-Dimethylpyrrole-3-carboxylic acid (10.0 g) was stirred well and dissolved in an N,N-dimethylformamide solvent. Sodium carbonate (3.0 equivalent) and 2-methoxyethoxymethyl chloride (2.0 equivalent) were introduced thereto, and the reaction solution was heated to 80° C. and stirred. After the reaction was completed, the result was extracted using chloroform and water. The extracted organic layer was dried with sodium sulfate and, after removing the solvent by vacuum distillation, recrystallized using methanol. Through the recrystallization, purified and separated Compound 3-1 (7.8 g, yield 47.8%) was secured.

Synthesis of Compound 3-2

Mesityl aldehyde (1.5 g) was introduced to a chloroform solvent and stirred well. Compound 3-1 (2.0 equivalent) was introduced thereto, and then trifluoroacetic acid (0.20 equivalent) was slowly introduced thereto. The reaction solution was stirred under reflux, and completion of the reaction was identified. The reaction solution was extracted using chloroform and an aqueous sodium bicarbonate solution. The extracted organic layer was dried with sodium sulfate, and then a silica gel column was used to secure purified and separated Compound 3-2 (2.9 g, yield 49.0%).

Synthesis of Compound 3-3

Compound 3-2 (2.9 g) was stirred well and dissolved in a chloroform solvent. The reaction solution was cooled to 0° C. using ice water, and 2,3-dichloro-5,6-dicyano-1,4-benzoquinone (DDQ) (1.1 equivalent) was introduced thereto. The result was stirred well at room temperature, and when the reaction was completed, triethylamine (1.5 equivalent) was introduced thereto, and the result was extracted using diethyl ether and water. The extracted organic layer was dried with sodium sulfate, and then a silica gel column was used to secure purified and separated Compound 3-3 (2.2 g, yield 76.1%).

Synthesis of Compound 3

Compound 3-3 (2.2 g) was stirred well and dissolved in a methanol/chloroform (1/1) solvent. Cobalt acetate tetrahydrate (0.50 equivalent) was introduced to the reaction solution in a solid state. After the reaction was completed, the result was extracted with dichloromethane and water. The extracted organic layer was dried using sodium sulfate and, after removing the solvent by vacuum distillation, recrystallized using methanol. Through the recrystallization, purified and separated Compound 3 (2.0 g, yield 86.7%) was secured. HR LC/MS/MS m/z calculated for $C_{64}H_{82}CoN_4O_{16}$ (M+): 1221.5058; found: 1221.5063

Preparation Example Compound 4
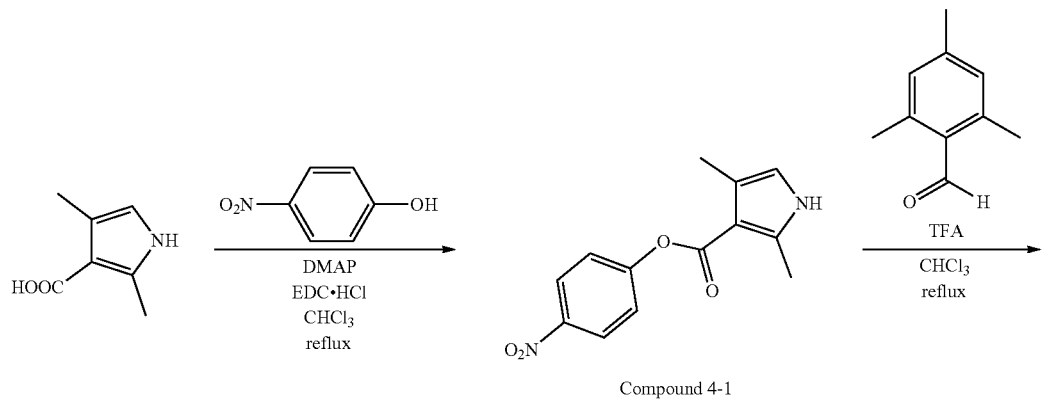
Compound 4-1
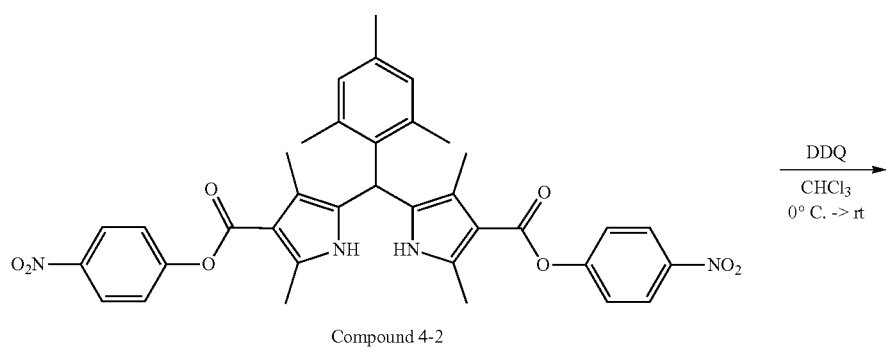
Compound 4-2
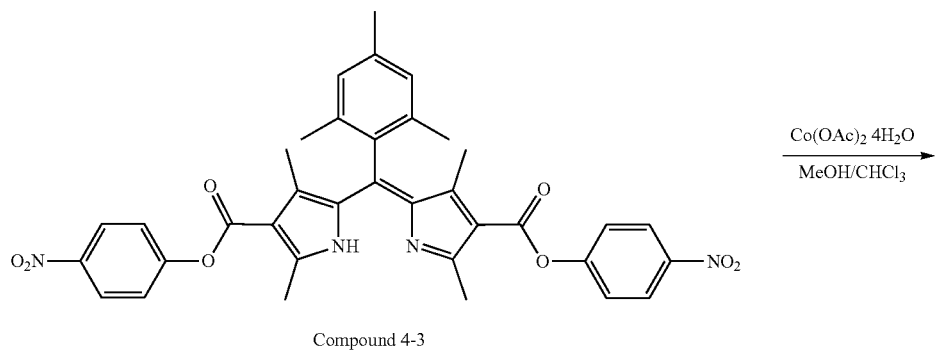
Compound 4-3

-continued

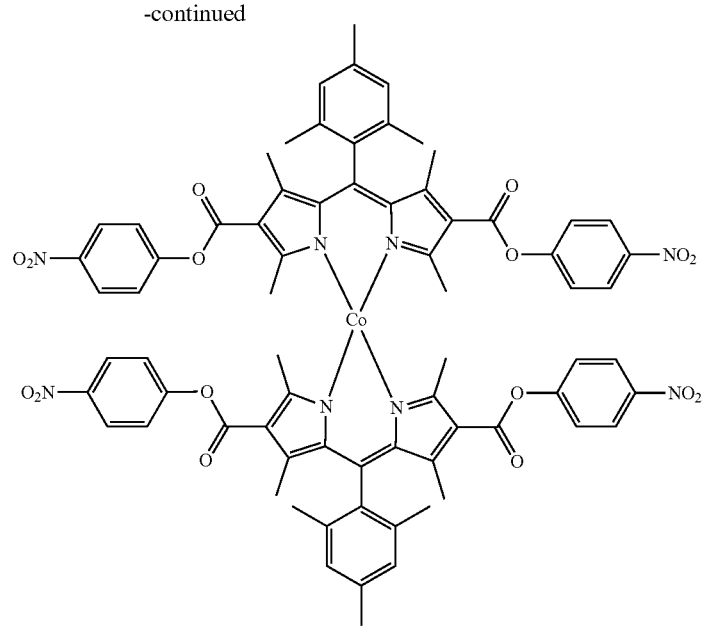

Compound 4

Synthesis of Compound 4-1

2,4-Dimethylpyrrole-3-carboxylic acid (10.0 g) was introduced to a chloroform solvent, stirred well and dissolved therein. 4-Nitrophenol (2.0 equivalent), 4-dimethylaminopyridine (DMAP) (2.2 equivalent) and N-(3-dimethylaminopropyl)-N'-ethylcarbodiimide hydrochloride (EDC-HCl) (2.2 equivalent) were introduced thereto, and the result was stirred under reflux. After the reaction was completed, the reaction solution was cooled to room temperature, and extracted using chloroform and water. The extracted organic layer was dried with sodium sulfate and, after removing the solvent by vacuum distillation, recrystallized using ethanol. Through the recrystallization, purified and separated Compound 4-1 (10.9 g, yield 58.3%) was secured.

Synthesis of Compound 4-2

Mesityl aldehyde (2.0 g) was introduced to a chloroform solvent and stirred well. Compound 4-1 (2.0 equivalent) was introduced thereto, and then trifluoroacetic acid (0.20 equivalent) was slowly introduced thereto. The reaction solution was stirred under reflux, and completion of the reaction was identified. The reaction solution was extracted using chloroform and an aqueous sodium bicarbonate solution. The extracted organic layer was dried with sodium sulfate, and then a silica gel column was used to secure purified and separated Compound 4-2 (3.7 g, yield 42.1%).

Synthesis of Compound 4-3

Compound 4-2 (3.0 g) was stirred well and dissolved in a chloroform solvent. The reaction solution was cooled to 0° C. using ice water, and 2,3-dichloro-5,6-dicyano-1,4-benzoquinone (DDQ) (1.1 equivalent) was introduced thereto. The result was stirred well at room temperature, and when the reaction was completed, triethylamine (1.5 equivalent) was introduced thereto, and the result was extracted using diethyl ether and water. The extracted organic layer was dried with sodium sulfate, and then a silica gel column was used to secure purified and separated Compound 4-3 (2.5 g, yield 83.6%).

Synthesis of Compound 4

Compound 4-3 (2.5 g) was stirred well and dissolved in a methanol/chloroform (1/1) solvent. Cobalt acetate tetrahydrate (0.50 equivalent) was introduced to the reaction solution in a solid state. After the reaction was completed, the result was extracted with dichloromethane and water. The extracted organic layer was dried using sodium sulfate and, after removing the solvent by vacuum distillation, recrystallized using methanol. Through the recrystallization, purified and separated Compound 4 (2.2 g, yield 84.3%). HR LC/MS/MS m/z calculated for $C_{72}H_{62}CoN_8O_{16}$ (M+): 1353.3616; found: 1353.3624

[Evaluation of Transmission Properties and Reliability]

In Table 1, Comparative Examples 1 and 2 did not use a dye absorbing at least some of a wavelength of 490 nm to 510 nm, and in Comparative Examples 3 and 4, the transmission color did not satisfy the condition according to the present specification. Comparative Example 5 did not use a dye at all. Specific results of evaluating transmission properties and reliability of the examples and the comparative examples are as described in the following Table 2. The transmission color was measured using a UV3600 device of Shimadzu Corporation based on the CIE 1976 color coordinate, and from the spectrum measured using the device, a* and b* values were calculated.

The reliability was evaluated as heat resistance reliability, moisture and heat resistance reliability and light resistance reliability each under a condition to describe below, and it was evaluated as to when the following reliability was all satisfied, and it was evaluated as x when any one of these is not satisfied. The results are described in the following Table 2.

Heat resistance reliability: changes in the transmission Y value of a D65 light source in a CIE XYZ color space after 500 hours at a wavelength of 380 nm to 780 nm and 80° C. expressed as a percentage was 3% p or less Changes in the transmission Y value being expressed as a percentage in the heat resistance reliability means subtracting the Y value (%) measured after storing for 500 hours at a wavelength of 380 nm to 780 nm and 80° C. immediately after preparing the optical film from the transmission Y value (%) of the optical film measured immediately after preparing the optical film.

Moisture and heat resistance reliability: changes in the transmission Y value of a D65 light source in a CIE XYZ color space after 500 hours at a wavelength of 380 nm to 780 nm, 60° C. and relative humidity of 90% expressed as a percentage was 3% p or less Changes in the transmission Y value being expressed as a percentage in the moisture and heat resistance reliability means subtracting the Y value (%) measured after storing for 500 hours at a wavelength of 380 nm to 780 nm, 60° C. and relative humidity of 90% from the transmission Y value (%) of the optical film measured immediately after preparing the optical film.

Light resistance reliability: changes in the transmission Y value of a D65 light source in a CIE XYZ color space under a condition of a wavelength of 380 nm to 780 nm and 22,560,000 lux*hr expressed as a percentage was 3% p or less Changes in the transmission Y value being expressed as a percentage in the light resistance reliability means subtracting the Y value (%) measured after storing for 48 hours at a wavelength of 380 nm to 780 nm, 50° C. or lower and approximately 470,000 lux from the transmission Y value (%) of the optical film measured immediately after preparing the optical film.

TABLE 2

| | Dye Absorbing at Least Some of Wavelength of 490 nm to 510 nm | T % (530)- T % (500) | [T % (460) + T % (610)]-[T % (500)X1.8] | Transmission Color (a*, b*) | Reliability |
|---|---|---|---|---|---|
| Example 1 | O | 1.9 | 9.4 | 0.08, -2.20 | O |
| Example 2 | O | 6.8 | 19.5 | 2.80, -1.91 | O |
| Example 3 | O | 11.5 | 29.4 | -5.82, -1.51 | O |
| Example 4 | O | 1.3 | 1.0 | -6.49, -6.41 | O |
| Example 5 | O | 10.8 | 20.9 | -0.53, -5.89 | O |
| Example 6 | O | 18.4 | 38.8 | 7.64, -4.45 | O |
| Example 7 | O | 9.6 | 20.0 | 0.24, -0.35 | O |
| Example 8 | O | 10.6 | 22.8 | 1.29, -0.90 | O |
| Example 9 | O | 10.6 | 22.9 | 1.30, -0.96 | O |
| Comparative Example 1 | X | -5.0 | -4.4 | -3.20, -2.45 | O |
| Comparative Example 2 | X | -5.6 | -12.6 | -9.90, -6.58 | O |
| Comparative Example3 | O | 14.4 | 35.8 | 8.09, -1.13 | O |
| Comparative Example 4 | O | 19.3 | 43.2 | 11.84, -3.15 | O |
| Comparative Example 5 | X | 0.0 | 20.0 | 0.00, 0.00 | — |

[Evaluation of Viewing Angle Properties when Attached to OLED Panel]

Viewing angle properties of the OLED panel to which the surface treatment layer and the optical film prepared above were attached were evaluated, and the results are described in the following Table 3.

In the following Table 3, DCI reproducibility was evaluated by attaching the optical film prepared according to each of the examples or the comparative examples to the OLED panel, measuring a color coordinate during an RGB monochromatic output using an ELABO-605L device of SP Tech. Co., Ltd., and then calculating an area of the portion overlapping with the DCI coordinate.

ΔDuv in the following Table 3 represents a difference between a Duv value at a viewing angle of 0 degrees and a Duv value at a viewing angle of 40 degrees during a 10,000 K white output, and was calculated after measuring a color using an ELABO-605L device of SP Tech. Co., Ltd. In addition, Δu'v' is a value representing a difference between a color coordinate at a viewing angle of 0 degrees and a color coordinate at a viewing angle of 40 degrees, and was calculated by the following Equation 3 after measuring a color using an ELABO-605L device of SP Tech. Co., Ltd.

$$\Delta u'v' = \sqrt{(u(40 \text{ degrees})' - u(0 \text{ degrees})')^2 + (v(40 \text{ degrees})' - v(0 \text{ degrees})')^2}$$ [Equation 3]

TABLE 3

| | DCI Reproducibility (%) | ΔDuv | Δu'v' (White) | Δu'v' (Green) | Δu'v' (Yellow) | Δu'v' (Cyan) |
|---|---|---|---|---|---|---|
| Example 1 | 98.8 | 0.00764 | 0.01032 | 0.01073 | 0.02404 | 0.00771 |
| Example 2 | 99.1 | 0.00689 | 0.01008 | 0.01063 | 0.02297 | 0.00685 |
| Example 3 | 99.3 | 0.00642 | 0.00971 | 0.01051 | 0.02167 | 0.00587 |
| Example 4 | 98.7 | 0.00908 | 0.01171 | 0.01053 | 0.02716 | 0.00788 |
| Example 5 | 99.2 | 0.00769 | 0.01104 | 0.01034 | 0.02517 | 0.00596 |
| Example 6 | 98.4 | 0.00530 | 0.01054 | 0.00997 | 0.02162 | 0.00336 |
| Example 7 | 99.1 | 0.00775 | 0.01029 | 0.01089 | 0.02454 | 0.00848 |
| Example 8 | 99.1 | 0.00744 | 0.01018 | 0.01078 | 0.02402 | 0.00791 |
| Example 9 | 99.1 | 0.00745 | 0.01018 | 0.01078 | 0.02402 | 0.00791 |
| Comparative Example 1 | 98.6 | 0.00837 | 0.01076 | 0.01083 | 0.02525 | 0.00871 |
| Comparative Example 2 | 98.4 | 0.00981 | 0.01216 | 0.01061 | 0.02815 | 0.00891 |
| Comparative Example 3 | 99.3 | 0.00583 | 0.00935 | 0.01041 | 0.02061 | 0.00512 |
| Comparative Example 4 | 96.6 | 0.00398 | 0.01022 | 0.00971 | 0.01921 | 0.00293 |
| Comparative Example 5 | 99.0 | 0.00658 | 0.00981 | 0.01077 | 0.02350 | 0.00647 |

According to Table 3, it was identified that, in Examples 1 to 3 and 7 to 9, color changes were smaller at the viewing angles of white, green, yellow and cyan compared to Comparative Example 1 that used the same amount of Solvent Black 28 but did not use the dye or pigment absorbing at least some of a wavelength of 490 nm to 510 nm.

In addition, it was identified that, in Examples 4 to 6, color changes were smaller at the viewing angles of white, green, yellow and cyan compared to Comparative Example 2 that used the same amounts of Solvent Black 28 and Pigment Blue 15 but did not use the dye or pigment absorbing at least some of a wavelength of 490 nm to 510 nm.

Comparative Examples 3 and 4 used a dye absorbing a wavelength of 500 nm, and had an increased content of the dye compared to Examples 1 to 9, and although color changes were reduced at the viewing angles, the transmission color became a>8.

Comparative Example 5 did not use a light absorbing dye or pigment at all.

The invention claimed is:
1. An optical film,
comprising a dye or pigment absorbing at least some of a wavelength of 490 nm to 510 nm;
having a transmission color of a D65 light source, a CIE standard illuminant, of −8<a*<8 and −8<b*<8, wherein a* indicates a direction the transmission color is leaned between red and green and b* indicates a direction the transmission color is leaned between yellow and blue; and
satisfying the following Equations 1 and 2,
wherein the dye or pigment is a compound represented by the following Chemical Formula 1:

$$T\%(500 \text{ nm}) < T\%(530 \text{ nm}),$$ [Equation 1]

$$[T\%(500 \text{ nm}) \times 1.8] < [T\%(460 \text{ nm}) + T\%(610 \text{ nm})]$$ [Equation 2]

wherein, in the Equations 1 and 2,
T % (A nm) is transmittance at a wavelength of A nm

[Chemical Formula 1]

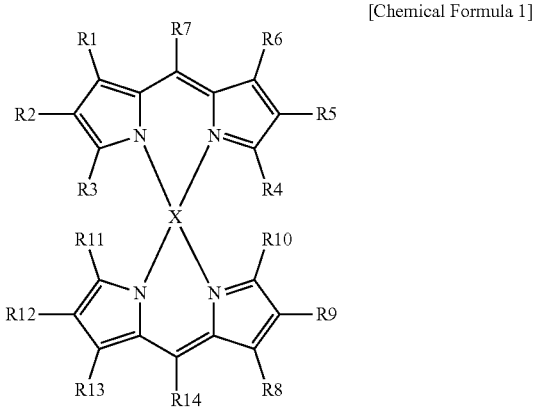

in the Chemical Formula 1,
X is Zn; Co; Ni or Pd;
R1 to R6 and R8 to R13 are the same as or different from each other, and each independently hydrogen; deuterium; a halogen group; a nitrile group; a nitro group; —OC(=O) R; —(C=O)NR'R''; —(C=O)OR'''; —(C=O)Rx; a substituted or unsubstituted alkyl group; a substituted or unsubstituted cycloalkyl group; a substituted or unsubstituted aryl group; a substituted or unsubstituted alkoxy group; a substituted or unsubstituted aryloxy group; a substituted or unsubstituted heteroaryloxy group; a substituted or unsubstituted alkylthio group; a substituted or unsubstituted arylthio group; a substituted or unsubstituted heteroarylthio group; or a substituted or unsubstituted heteroaryl group;
R7 and R14 are the same as or different from each other, and each independently hydrogen; a substituted or unsubstituted alkyl group; a substituted or unsubstituted aryl group; a substituted or unsubstituted heteroaryl group; a substituted or unsubstituted aryloxy group; a substituted or unsubstituted arylthio group; a substituted or unsubstituted heteroarylthio group; or a substituted or unsubstituted heteroaryloxy group;
R, R', R'', R''' and Rx are the same as or different from each other, and each independently hydrogen; a substituted or unsubstituted alkyl group; a substituted or unsubstituted cycloalkyl group; a substituted or unsubstituted heterocyclic group; or a substituted or unsubstituted aryl group, or R' and R'' bond to each other to form a ring; and
when R7 and R14 are hydrogen; a substituted or unsubstituted alkyl group; a substituted or unsubstituted aryl group; or a substituted or unsubstituted heteroaryl group and R2, R5, R9 and R12 are —C(=O)OR''', R''' is a substituted or unsubstituted aryl group; a substituted or unsubstituted cycloalkyl group; a substituted alkyl group; or a branched unsubstituted alkyl group having 3 to 30 carbon atoms.

2. The optical film of claim 1, wherein heat resistance reliability, moisture and heat resistance reliability and light resistance reliability of the optical film are each ΔY≤3% p,
the heat resistance reliability is a change in a transmission Y value of a D65 light source in a CIE XYZ color space measured after 500 hours at a wavelength of 380 nm to 780 nm and 80° C. from a transmission Y value of the optical film measured immediately after preparing the optical film, the change being expressed as a percentage;
the moisture and heat resistance reliability is a change in a transmission Y value of a D65 light source in a CIE XYZ color space measured after 500 hours at a wavelength of 380 nm to 780 nm, 60° C. and relative humidity of 90% from an initial transmission Y value measured immediately after preparing the optical film, the change being expressed as a percentage; and
the light resistance reliability is a change in a transmission Y value of a D65 light source in a CIE XYZ color space under a condition of a wavelength of 380 nm to 780 nm and 22,560,000 lux*hr expressed as a percentage.

3. The optical film of claim 1, wherein the transmission color of a D65 light source, a CIE standard illuminant, is −8<a*<8 and −7<b*<8, wherein a* and b* are as defined in claim 1.

4. The optical film of claim 1, which is an adhesive film.

5. The optical film of claim 1, further comprising a binder resin, and comprising the dye or pigment in 0.001 parts by weight to 5 parts by weight with respect to 100 parts by weight of the binder resin.

6. The optical film of claim 5, wherein the binder resin is a styrene-based resin or elastomer, an urethane-based resin or elastomer, a polyolefin-based resin or elastomer, a polyoxyalkylene-based resin or elastomer, a polyester-based resin or elastomer, a polyvinyl chloride-based resin or elastomer, a polycarbonate-based resin or elastomer, a polyphenylene sulfide-based resin or elastomer, a polyamide-based resin or elastomer, an acrylate-based resin or elastomer, an epoxy-based resin or elastomer, a silicone-based resin or elastomer, or a fluorine-based resin or elastomer, or a mixture thereof.

7. An adhesive optical filter comprising:
the optical film of claim 1; and
a surface treatment layer.

8. A display device comprising the optical film of claim 1.

9. The display device of claim 8, comprising a display panel, wherein the optical film is provided on the display panel.

10. The display device of claim 9, wherein the display panel is a spontaneous light emitting display panel or a non-spontaneous light emitting display panel.

11. The display device of claim 9, wherein the display panel is an OLED panel;
the display device is an OLED device comprising an OLED panel; and the optical film is provided on one surface of the OLED panel.

12. The display device of claim 11, wherein the OLED panel further comprises a white pixel.

13. A display device comprising the optical film of claim 2.

14. A display device comprising the optical film of claim 3.

15. A display device comprising the optical film of claim 5.

16. A display device comprising the optical film of claim 6.

* * * * *